(12) United States Patent
Schuehler et al.

(10) Patent No.: US 11,092,663 B2
(45) Date of Patent: Aug. 17, 2021

(54) APPARATUS AND METHOD FOR REPRESENTING USER INFORMATION RECEIVED BY AN ANTENNA APPARATUS WITH A DIRECTIONAL CHARACTERISTIC

(71) Applicant: Fraunhofer-Gesellschaft zur Foerderung der angewandten Forschung e.V., Munich (DE)

(72) Inventors: Mario Schuehler, Effeltrich (DE); Lars Weisgerber, Ebersbach-Neugersdorf (DE); Johannes Arendt, Erlangen (DE); Rainer Wansch, Baiersdorf (DE); Heinrich Milosiu, Erlangen (DE); Frank Oehler, Adelsdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/100,137

(22) Filed: Aug. 9, 2018

(65) Prior Publication Data
US 2018/0372830 A1    Dec. 27, 2018

Related U.S. Application Data

(63) Continuation of application No. PCT/EP2017/053151, filed on Feb. 13, 2017.

(30) Foreign Application Priority Data

Feb. 12, 2016 (DE) .......................... 102016202206.7
Jul. 20, 2016 (DE) .......................... 102016213234.2

(51) Int. Cl.
*G01S 3/04* (2006.01)
*G01S 13/86* (2006.01)
(Continued)

(52) U.S. Cl.
CPC ............... *G01S 3/046* (2013.01); *G01S 3/38* (2013.01); *G01S 7/04* (2013.01); *G01S 13/762* (2013.01);
(Continued)

(58) Field of Classification Search
CPC ... G01S 3/046; G01S 3/14; G01S 3/16; G01S 3/38; G01S 3/40; G01S 5/04; G01S 7/04;
(Continued)

(56) References Cited

U.S. PATENT DOCUMENTS 8,249,517 B1 * 8/2012 Whistler .............. H04B 17/318
455/67.14
10,503,937 B2 * 12/2019 Nikitin ................. H01Q 1/1257
(Continued)

FOREIGN PATENT DOCUMENTS

DE            165546 C     11/1905
DE      102009047199 A1    6/2011
(Continued)

OTHER PUBLICATIONS

Volmer, C. et al., "An eigen-analysis of compact antenna arrays and its application to port decoupling", IEEE Transactions on Antennas and Propagation; vol. 56; No. 2, Feb. 2008, pp. 360-370.

*Primary Examiner* — Stephen R Burgdorf
(74) *Attorney, Agent, or Firm* — Michael A. Glenn; Perkins Coie LLP

(57) ABSTRACT

The invention relates to an apparatus for representing user information including an antenna apparatus, a processing apparatus and a representation apparatus. The antenna apparatus receives signals of a transmitter in a scene with at least one directional characteristic relating to spatially different receive sensitivities. Alternatively or additionally, the antenna apparatus sends signals with at least one directional characteristic into a scene and receives signals of a trans- (Continued)

mitter from the scene. The processing apparatus processes the received signals with respect to the scene and determines representation data represented by the representation apparatus. Further, the invention relates to a respective method.

19 Claims, 46 Drawing Sheets

(51) Int. Cl.
| | |
|---|---|
| *G01S 13/88* | (2006.01) |
| *G01S 7/04* | (2006.01) |
| *H04B 17/318* | (2015.01) |
| *H04B 7/04* | (2017.01) |
| *H04B 5/00* | (2006.01) |
| *G01S 3/38* | (2006.01) |
| *G01S 13/76* | (2006.01) |
| *G06K 7/10* | (2006.01) |
| *G02B 27/01* | (2006.01) |

(52) U.S. Cl.
CPC .......... *G01S 13/867* (2013.01); *G01S 13/881* (2013.01); *G01S 13/886* (2013.01); *G06K 7/10099* (2013.01); *G06K 7/10356* (2013.01); *H04B 5/0062* (2013.01); *H04B 17/318* (2015.01); *G02B 27/017* (2013.01); *G02B 2027/0141* (2013.01); *H04B 7/04* (2013.01)

(58) Field of Classification Search
CPC ........ G01S 11/06; G01S 13/75; G01S 13/762; G01S 13/867; G01S 13/881; G01S 13/886; G01S 13/931; G02B 27/017; G02B 2027/0141; G06F 3/011; G06F 3/0346; G06K 7/10099; G06K 7/10356; G08C 17/02; H01Q 1/2225; H04B 5/0062; H04B 7/04; H04B 17/318; H04L 1/0002; H04Q 9/00; H04W 4/023
USPC ...................................................... 340/539.1
See application file for complete search history.

(56) References Cited

U.S. PATENT DOCUMENTS

| | | | |
|---|---|---|---|
| 2005/0280538 A1 | 12/2005 | Kawai et al. | |
| 2006/0020978 A1* | 1/2006 | Miyagawa | H04N 5/4401 725/72 |
| 2006/0022814 A1 | 2/2006 | Nogami et al. | |
| 2008/0191846 A1 | 8/2008 | Chang | |
| 2009/0224045 A1* | 9/2009 | Toda | G06K 7/10099 235/439 |
| 2010/0271181 A1 | 10/2010 | Nogami | |
| 2011/0205358 A1* | 8/2011 | Aota | G01S 19/23 348/143 |
| 2011/0273559 A1* | 11/2011 | Yagitani | G01R 29/0871 348/135 |
| 2013/0135146 A1 | 5/2013 | Ransom et al. | |
| 2013/0194077 A1* | 8/2013 | Vargas | G06K 7/10386 340/10.6 |
| 2013/0278393 A1* | 10/2013 | Zumsteg | G06K 7/10079 340/10.6 |
| 2014/0055490 A1* | 2/2014 | Mule | H04N 21/44218 345/633 |
| 2014/0347230 A1* | 11/2014 | Ohmae | G01S 3/04 343/703 |
| 2015/0084744 A1* | 3/2015 | Havens | G06K 7/10356 340/10.3 |
| 2015/0102963 A1* | 4/2015 | Marshall | G01S 3/046 342/449 |
| 2016/0013822 A1* | 1/2016 | Polehn | G01S 13/04 455/63.1 |
| 2016/0269132 A1* | 9/2016 | Clark | H04W 16/28 |

FOREIGN PATENT DOCUMENTS

| | | |
|---|---|---|
| DE | 102014223328 A1 | 5/2016 |
| EP | 2797330 A1 | 10/2014 |
| JP | 2006010345 A | 1/2006 |
| JP | 2006071380 A | 3/2006 |
| JP | 2009014684 A | 1/2009 |
| JP | 2009145177 A | 7/2009 |
| JP | 2009187250 A | 8/2009 |
| JP | 2014142721 A | 8/2014 |
| WO | 2015067982 A1 | 5/2015 |
| WO | 2015182752 A1 | 12/2015 |

* cited by examiner

| 0 dB | 0 dB | 0 dB | 0 dB | 0 dB | 0 dB | 0 dB | 0 dB |
|------|------|------|------|------|------|------|------|
| 0 dB | 0 dB | 0 dB | 0 dB | 0 dB | 0 dB | 0 dB | 0 dB |
| 0 dB | 0 dB | 0 dB | 0 dB | 0 dB | 0 dB | 0 dB | 0 dB |
| 0 dB | 0 dB | 0 dB | 0 dB | 0 dB | 0 dB | 0 dB | 0 dB |
| 0 dB | 0 dB | 20 dB | 40 dB | 40 dB | 40 dB | 20 dB | 0 dB |
| 0 dB | 20 dB | 40 dB | 40 dB | 40 dB | 40 dB | 40 dB | 40 dB |
| 30 dB | 40 dB | 30 dB | 30 dB | 30 dB | 30 dB | 40 dB | 30 dB |

Fig. 39

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 1 | 2 | 2 | 2 | 1 | 0 |
| 0 | 1 | 2 | 2 | 2 | 2 | 2 | 2 |
| 2 | 2 | 2 | 2 | 2 | 2 | 2 | 2 |

Fig. 40

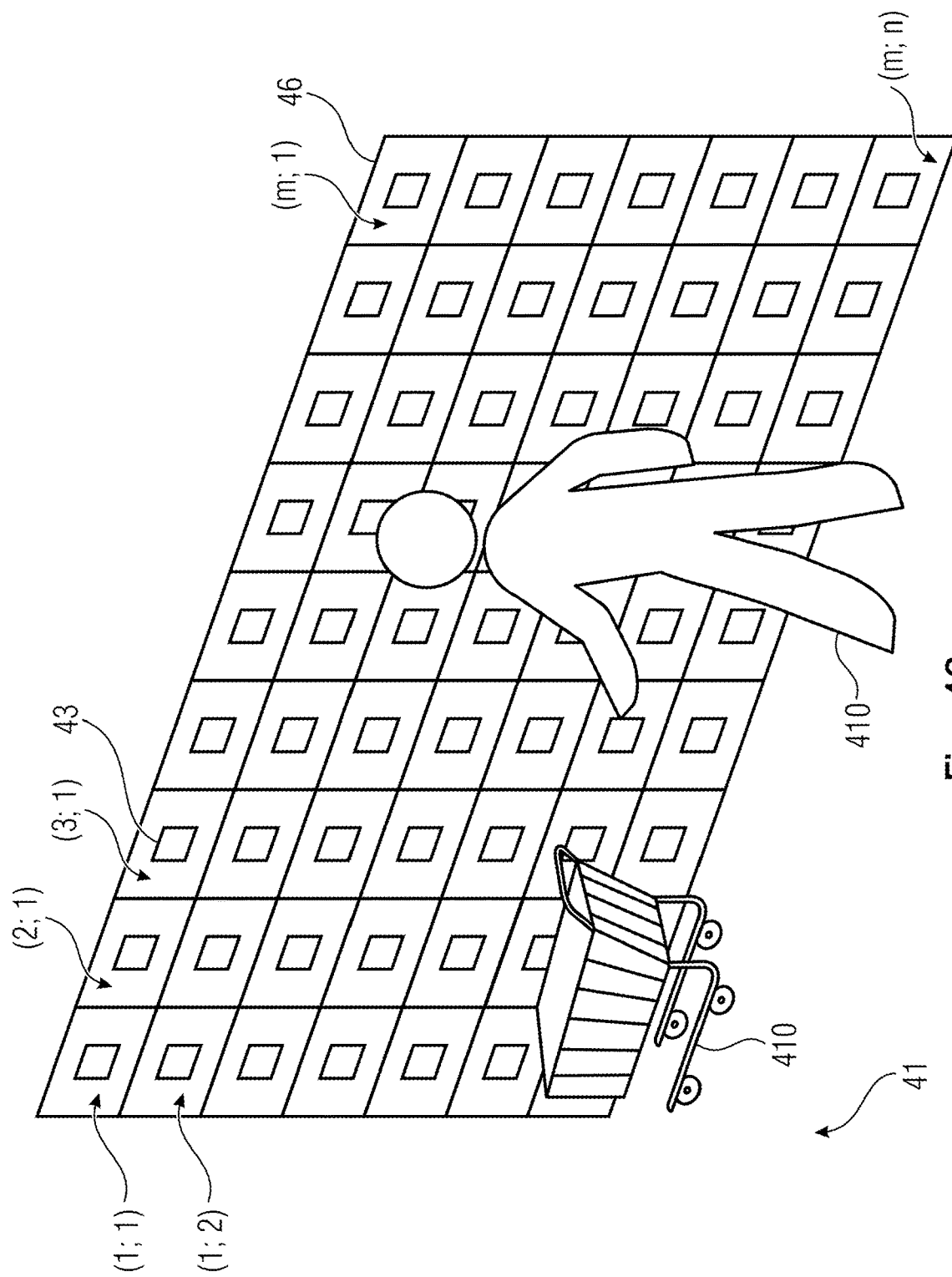
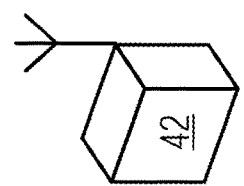
Fig. 42

| 0 dB | 0 dB | 0 dB | 0 dB | 0 dB | 0 dB | 0 dB | 0 dB |
|---|---|---|---|---|---|---|---|
| 0 dB | 0 dB | 0 dB | 0 dB | 0 dB | 0 dB | 0 dB | 0 dB |
| 0 dB | 0 dB | 0 dB | 0 dB | 0 dB | 0 dB | 0 dB | 0 dB |
| 0 dB | 0 dB | 0 dB | 0 dB | 0 dB | 0 dB | 0 dB | 0 dB |
| 0 dB | 0 dB | 20 dB | 40 dB | 40 dB | 40 dB | 20 dB | 0 dB |
| 0 dB | 20 dB | 40 dB | 40 dB | 40 dB | 40 dB | 40 dB | 40 dB |
| 30 dB | 40 dB | 30 dB | 30 dB | 30 dB | 30 dB | 40 dB | 30 dB |

| 0 dB | 0 dB | 0 dB | 0 dB | 0 dB | 0 dB | 0 dB | 0 dB |
|---|---|---|---|---|---|---|---|
| 0 dB | 0 dB | 0 dB | 0 dB | 0 dB | 30 dB | 0 dB | 0 dB |
| 0 dB | 0 dB | 0 dB | 0 dB | 0 dB | 30 dB | 0 dB | 0 dB |
| 0 dB | 0 dB | 0 dB | 0 dB | 10 dB | 30 dB | 0 dB | 0 dB |
| 0 dB | 0 dB | 20 dB | 0 dB | 0 dB | 30 dB | 0 dB | 0 dB |
| 30 dB | 30 dB | 0 dB | 0 dB | 0 dB | 30 dB | 0 dB | 0 dB |
| 30 dB | 30 dB | 0 dB | 0 dB | 0 dB | 30 dB | 0 dB | 0 dB |

| 0 dB | 0 dB | 0 dB | 0 dB | 0 dB | 0 dB | 0 dB | 0 dB |
|------|------|------|------|------|------|------|------|
| 0 dB | 0 dB | 0 dB | 0 dB | 0 dB | 0 dB | 0 dB | 0 dB |
| 0 dB | 0 dB | 0 dB | 40 dB | 40 dB | 0 dB | 0 dB | 0 dB |
| 0 dB | 0 dB | 0 dB | 40 dB | 40 dB | 0 dB | 0 dB | 0 dB |
| 0 dB | 0 dB | 0 dB | 40 dB | 40 dB | 0 dB | 0 dB | 0 dB |
| 0 dB | 0 dB | 0 dB | 40 dB | 40 dB | 40 dB | 0 dB | 0 dB |
| 0 dB | 30 dB | 30 dB | 40 dB | 40 dB | 40 dB | 0 dB | 0 dB |

· # APPARATUS AND METHOD FOR REPRESENTING USER INFORMATION RECEIVED BY AN ANTENNA APPARATUS WITH A DIRECTIONAL CHARACTERISTIC

CROSS-REFERENCE TO RELATED APPLICATIONS

This application is a continuation of copending International Application No. PCT/EP2017/053151, filed Feb. 13, 2017, which is incorporated herein by reference in its entirety, and additionally claims priority from German Applications Nos. 102016202206.7, filed Feb. 12, 2016, and 102016213234.2, filed Jul. 20, 2016, which are all incorporated herein by reference in their entirety.

The invention relates to an apparatus and a method for representing user information.

BACKGROUND OF THE INVENTION

The human eye perceives light in the wavelength range between approx. 380 nm (violet) and 780 nm (red). Electromagnetic signals such as those used for the communication of RFID (radio-frequency identification) tags or RFID transponders with RFID readers are therefore invisible to the human eye. For applications using radio systems, the "visualization" of the used waves may signify a gain in information. Depending on the application, it would be advantageous to see the electromagnetic spectrum from 1 Hz to 100,000 THz, for example.

A kind of extension of the wavelengths accessible to the human eye exists in the area of virtual reality and through special types of glasses or in the form of the so-called "augmented reality". In this case, information or graphics are superimposed on optical images or displayed in the field of vision of a user. For example, instrument landing systems (ILS) in aircrafts or navigation systems in vehicles display signals in so-called "head-up displays" (HUD).

For example, WO 2015/067982 A1 discloses glasses having an integrated antenna via which other mobile electronic devices nearby are detected and associated information is represented.

US 2013/0135146 A1 discloses means for aligning two antennas towards each other in a terrain. In this case, a representation of the main axes as well as the radiation pattern of the antennas is superimposed on a visual image of the terrain.

Objects in the field of view may be identified via camera images and barcodes or image detection algorithms. However, this involves good optical detectability, e.g., which is not the case with pallets having objects packed in boxes.

SUMMARY

According to an embodiment, an apparatus for representing user information may have: an antenna apparatus, a processing apparatus, a representation apparatus and a positioning apparatus, wherein the antenna apparatus is configured to receive signals of at least one transmitter in a scene with at least one directional characteristic relating to spatially different receive sensitivities and/or to transmit signals with at least one directional characteristic into a scene and to receive signals of at least one transmitter from the scene, wherein the processing apparatus is configured to process the received signals with respect to the scene and to determine representation data, wherein the positioning apparatus provides data about the at least one transmitter and/or about received signals originating from the at least one transmitter and includes the antenna apparatus and/or the processing apparatus, and wherein the representation apparatus is configured to at least represent the determined representation data.

Another embodiment may have a method for representing user information, wherein signals of a transmitter are received with at least one directional characteristic relating to spatially different receive sensitivities and/or signals are transmitted into a scene with at least one directional characteristic and signals of at least one transmitter are received from the scene, wherein the received signals are processed with respect to the scene and representation data are determined and wherein the representation data are represented.

According to another embodiment, an apparatus for representing user information may have: an antenna apparatus, a processing apparatus, a representation apparatus and a positioning apparatus, wherein the antenna apparatus includes several different directional characteristics and is configured to receive at least one signal each of at least one transmitter in a scene with several directional characteristics relating to spatially different receive sensitivities, wherein the processing apparatus is configured to process the received signals with respect to the scene and to determine representation data, and to determine, based on the at least one directional characteristic and based on at least one received signal, a signal distribution of the transmitter as representation data, and wherein the representation apparatus is configured to represent the signal distribution in order to allow visualization of the electromagnetic radio frequency signals that are received from the antenna apparatus, wherein the positioning apparatus provides data about the at least one transmitter and/or about received signals originating from the at least one transmitter and includes the antenna apparatus and/or the processing apparatus, wherein a signal processing apparatus is configured to process the signals received from the antenna apparatus and to determine one amplitude value each of a field strength of the received signal; and wherein a data processing apparatus is configured to determine, based on the directional characteristics and the amplitude values determined from the respectively allocated signals, information about the position of the transmitter.

Another embodiment may have a method for representing user information, wherein signals of a transmitter are received with different directional characteristics relating to spatially different receive sensitivities wherein one amplitude value each of a field strength of the received signals is determined, wherein information about the position of the transmitter is determined based on the directional characteristics and the amplitude values determined from the respectively allocated signals, wherein the received signals are processed with respect to the scene and representation data are determined and wherein, based on the different directional characteristics and based on at least one received signal, a signal distribution of the transmitter is determined as representation data, and wherein the signal distribution is represented in order to allow visualization of the electromagnetic radio frequency signals that are received from the antenna apparatus.

The apparatus at least comprises an antenna apparatus, a processing apparatus and a representation apparatus. The antenna apparatus is configured to receive signals of at least one transmitter in a scene. The antenna apparatus receives the signals with at least one directional characteristic relating to spatially different receive sensitivities. Thus, the antenna apparatus receives signals from different areas to a varying degree depending on the directional characteristic. This is accompanied by a directivity of the reception. Alternatively or additionally, the antenna apparatus is configured to transmit signals with at least one directional characteristic into a scene and to receive signals of at least one transmitter from the scene. In this alternative or additional configuration, the antenna apparatus transmits signals with at least one directional characteristic so that the signals essentially only arrive in the spatial area associated with the respective directional characteristic. Thus, signals are applied to only one spatial area in the scene. Depending on the configuration, receiving the signals originating from at least one transmitter takes place in an omnidirectional or directional manner via at least one directional characteristic accordingly relating to the receive sensitivity. The processing means is configured to process the received signals with respect to the scene and to determine representation data. In a configuration, the representation data refers to, e.g., the determined position of the transmitter and, in another configuration, refers to the spatial distribution of the received signals. In a configuration, in particular, data describing the respectively used directional characteristic is available to the processing apparatus. For example, this is at least one data set which, with respect to positions relative to the antenna apparatus, comprises a measure for the receive sensitivity of the antenna apparatus for the used directional characteristic. Lastly, the representation apparatus is configured to at least represent the determined representation data. In this way, the representation data is made accessible to a user and represents information for him/her.

The apparatus comprises a positioning apparatus that provides data about the at least one transmitter, or about received signals originating from the at least one transmitter, and transmits the same to the apparatus. The positioning apparatus comprises the antenna apparatus and/or the processing apparatus. In the following, different variations of the positioning apparatus are described and explained.

Depending on the configuration, an antenna apparatus is configured in a single-part or in a multi-part manner. In a configuration, in the multi-part variation, the antenna apparatus consists of several antenna elements used individually or mutually for transmitting and/or receiving signals.

In this case, the scene refers to the area or space in which at least the transmitter is located.

In a configuration, the apparatus comprises a capturing apparatus configured to capture visual images of the scene. In a configuration, this is a camera. Furthermore, the representation apparatus is configured to superimpose at least the determined representation data on a representation of at least one captured visual image. For example, the representation apparatus is a monitor or a display to superimpose the representation data on the visual image of the scene. This provides the viewer with a spatial reference to make better use of the representation data. In other words: the superimposition allows the user to see with different frequencies, or to apply information resulting from the evaluation of several frequency ranges.

In a configuration, the antenna apparatus is configured according to a configuration that is disclosed in DE 10 2014 223 328 A1.

Particularly in the case in which the antenna apparatus, the capturing apparatus or the representation apparatus are not static, but are moved, for aligning the respective data, or for the mutual representation, the positions relative to each other, or to the scene, have to be known.

According to a configuration, the apparatus therefore comprises at last one position sensor. Accordingly, the representation apparatus is configured to represent the representation data depending on data of the position sensor.

In a configuration, in particular, several position sensors are present and associated with the different apparatuses so that their respective position and/or orientation may be determined.

In a configuration, the position sensor is associated with the representation apparatus and therefore allows determining the position of the representation apparatus. Furthermore, the representation apparatus is configured to represent the representation data depending on an orientation of the representation apparatus relative to the scene.

In a configuration, the representation apparatus is configured in the form of glasses. Thus, the representation data is projected into these glasses. Since the user may orientate the glasses differently towards the scene, e.g., a position sensor, which, e.g., may be fixed on or in the glasses, serves for displaying the representation data in accordance to the orientation of the glasses and therefore also into the direction into which the user directs his/her view.

In a configuration, the position sensor is associated with the capturing apparatus. The representation apparatus is configured to represent the representation data depending on an orientation of the capturing apparatus relative to the antenna apparatus. In a configuration, in particular, the antenna apparatus is stationary, the position sensor providing information to the capturing apparatus with respect to which area of a scene the respective captured images of the capturing apparatus originate from.

In a configuration, the representation apparatus is configured to represent an optical element based on information determined from the received signals. For example, the optical element is an icon indicating the position of the transmitter. Alternatively or additionally, it is a designation of the transmitter or of the indication that further information is available.

In a configuration, the representation apparatus is configured to represent the determined information based on a distance between the transmitter and the representation apparatus and/or based on an orientation between the transmitter and the representation apparatus and/or based on information transmitted by the transmitter. In this configuration, e.g., a flashing icon whose flashing frequency increases with a decreasing state is used for the transmitter. Thus, it is easier to clarify if an approach towards the transmitter occurs. Alternatively or additionally, the determined information is represented depending on an orientation between the transmitter and the representation apparatus. For example, this refers to a direction from the representation apparatus to the transmitter or vice versa or, e.g., refers to an orientation of the representation apparatus, or the transmitter. Furthermore, alternatively or additionally, the determined information is represented based on information transmitted by the transmitter.

In a configuration, a—particularly external—database is provided, in which data or information is stored which the processing apparatus accesses. In a configuration, this serves for evaluating the received signals, or for generating the representation data.

In a configuration, the processing apparatus is configured to determine a signal distribution of the transmitter as representation data based on the at least one directional characteristic and based on at least one received signal. The representation apparatus is accordingly configured to represent the signal distribution. Thus, this configuration enables a visualization of the electromagnetic radio-frequency signals received by the antenna apparatus. In this case, the signal representation results from the radiation characteristic of the transmitter and the distribution of the receive sensitivity of the antenna apparatus. Alternatively, the signal distribution results from the directional characteristic for sending out the signals, wherein, in a configuration, the signal distribution additionally results from the directional characteristic for receiving the signals. In a configuration, the signal distribution refers to the distribution of the signal strengths of the received signals in the space, and, in alternative or additional configuration, the signal distribution includes a determined change of the signal strength in the space.

In a configuration, the signal distribution is determined from several received signals and the respectively used directional characteristics.

According to a configuration, for better detectability, the representation apparatus is configured to represent, e.g., the signal distribution or the signal strength radiated by the transmitter or a signal strength change in the space with a color code or a gray-scale code or signal strength lines. In this case, the signal strength lines show the spatial course of signal strengths of the received signals in the form of contour lines on maps, each line being connected to a selected signal strength.

The following configurations refer to obtaining the data to be represented—particularly with respect to the position of a transmitter or with respect to the distribution of received signals. The configurations may be combined with each other in different ways.

In particular, apparatuses for obtaining data are described herein, which may be referred to as positioning apparatuses. In this case, the components of the positioning apparatuses may be combined with each other individually or, e.g., with a separate antenna apparatus. Therefore, e.g., the positioning apparatus may partially include an antenna apparatus or may alternatively only serve for evaluating the signals received with a separate antenna apparatus. In a configuration, the positioning apparatuses may also be used independently of the apparatus for representing user information.

In a configuration of a first variation, the apparatus comprises a positioning apparatus. The antenna apparatus comprises several different directional characteristics, wherein the directional characteristics each refer to a quantity of spatially different receive sensitivities of the antenna apparatus. A regulating apparatus influences the antenna apparatus such that at least one of the directional characteristics of the antenna apparatus is activated. The antenna apparatus receives at least one signal originating from the transmitter, wherein this occurs with the active directional characteristic. Furthermore, a data processing apparatus processes the at least one received signal and the quantity of spatially different receive sensitivities associated with the activated directional characteristic into a quantity of weighted receive values. Furthermore, the data processing apparatus determines the information about the position of the transmitter at least from the quantity of weighted receive values. In a configuration, the data processing apparatus and the antenna apparatus belong to the positioning apparatus.

In this case, the directional characteristics refer to the spatial distribution of the receive sensitivities. Thus, signals are not captured uniformly from all spatial directions, but there are areas from which the antenna apparatus receives signals. This is accompanied by the fact that, in receiving the signals with a selected, or activated, directional characteristic, there is a connection between the position of the transmitter and the received signal. This connection is used by the data processing apparatus, which is configured to process the received signal and data about the directional characteristic that is used upon reception and is therefore activated, or the quantity of spatially different receive sensitivities. The data processing apparatus determines from the received signal and the data about the distribution of the receive sensitivities a quantity of weighted receive values. Then, from the quantity of the weighted receive values, the information about the position of the at least one transmitter may be determined. In this case, the regulating apparatus serves the purpose that at least one directional characteristic of the antenna apparatus is activated. In a configuration, several directional characteristics are activated such that superimposing directional characteristics occur.

In a configuration, the amplitudes and the phases of the signals are available for evaluating the received signals. In an alternative configuration, only the amplitudes of the signals are processed.

According to a configuration, the control apparatus acts on the antenna apparatus in such a way that several different directional characteristics of the antenna apparatus are activated. In a configuration, in particular, the directional characteristics are activated successively. In this case, the antenna apparatus receives at least one signal of the transmitter for each activated directional characteristic. The data processing apparatus processes the received signals and the quantity of spatially different receive sensitivities which is associated with the respectively activated directional characteristic into a quantity of weighted receive values which is associated with a respectively activated directional characteristic. In addition, the data processing apparatus processes the quantities of weighted receive values associated with the different directional characteristics with each other.

The following configurations are dedicated to the processing, by the data processing apparatus, of the data of the received signals and the respectively activated directional characteristics.

In a configuration, the data processing apparatus processes with each other data that describes the received signals, and the quantities of spatially different receive sensitivities of the respectively activated directional characteristics present in the form of a matrix to obtain the quantities of weighted receive values also in the form of matrices. In a configuration, the data of the received signals and the matrices associated with the directional characteristics are multiplied with each other.

According to a configuration, the data processing apparatus adds up at least one group of the quantities of the weighted receive values that are associated with different directional characteristics. In a configuration, adding the quantities of the weighted receive values results in accumulation points, which make it possible to identify the position of the transmitter. In a configuration, the group refers to a part of the determined quantities of the weighted receive values and is therefore a partial group or a subgroup. In an alternative configuration, the group refers to all quantities of the weighted receive values available to the data processing apparatus.

In a configuration, the data processing apparatus determines a difference between at least two groups of quantities of the weighted receive values. In a configuration, at least one of the two groups of the quantities of the weighted receive values comprises only one quantity of the weighted receive values and therefore only the data of the receive signal with an activated directional characteristic.

According to a configuration, the two groups are overlapping. In this configuration, at least one mutual quantity of receive values may be found in both groups. In an alternative configuration, the two groups are disjointed so that the groups only contain respectively different quantities of weighted receive values.

According to a configuration, the antenna apparatus is a multibeam antenna. A multibeam antenna comprises several beams or at least several main beams with respect to the receive sensitivity (and therefore also for the transmitting characteristics, or corresponding receive sensitivities). In this case, the beams are associated with different directional characteristics. This is accompanied by the fact that the directional characteristics each have a main direction or a main area that is associated with the respective beam, or the main beam. Or in other words: with each activated directional characteristic, signals are mainly received from a spatial area in which the respectively associated (receive) beam is located.

According to a configuration, the directional characteristics of the antenna apparatus configured as multibeam antenna differ from each other in the direction of the beams. In a configuration, the beams are particularly the main beams that are given by a main direction of the respective directional characteristic.

According to a configuration, the antenna apparatus configured as multibeam antenna comprises for each switchable directional characteristic an individual signal output. According to a configuration, the antenna apparatus receives signals with several directional characteristics and it is possible through the antenna apparatus itself or a through a subsequent component to separate the overall simultaneously received signals with respect to their respective directional characteristics so that individual signals result which are each associated with a directional characteristic. In a configuration, activing the directional characteristic is selecting the characteristic and evaluating the signal received with the activated directional characteristic. Alternatively, activing refers to electronically activating so that signals may only be received by the antenna apparatus with one directional characteristic.

According to a configuration, only the signal of a signal output of the antenna apparatus is available to the data processing apparatus per activated directional characteristic. Thus, in this configuration, the data processing apparatus only processes a received signal that is associated with the respectively activated directional characteristic. In a configuration, the received signals are processed after all directional characteristics have been activated.

According to a configuration, the signals of several signal outputs of the antenna apparatus are available to the data processing apparatus per activated directional characteristic. Thus, in this configuration, the data processing apparatus not only processes the signal of an activated and therefore particularly selected directional characteristic, but also the signals that are associated with other directional characteristics.

According to a configuration, the data processing apparatus adds up a group of the quantities of the weighted receive values and determines the information about the position of the transmitter from at least one accumulation area of the received signals. Therefore, it is being determined from which spatial area or from which direction relative to the antenna apparatus signals predominantly originate.

According to a configuration, the data processing apparatus determines the presence of several transmitters from a difference between at least two groups of the quantities of the weighted receive values. For example, if there are two accumulation areas, this shows the presence of two transmitters.

In a configuration, an intermediate result for the information about the position of the transmitter is determined by the data processing apparatus and, based thereon, the directional characteristics covering spatial areas matching the intermediate results are activated for further steps.

According to a configuration, the antenna apparatus sends out at least one signal so that a signal originates from the transmitter. In this configuration, the transmitter is animated to transmit at least one signal. According to a configuration, the transmitter obtains energy for sending out its own signal from the signal sent out by the antenna apparatus. In this configuration, e.g., the transmitter is a RFID tag. In alternative configuration, the signal originating from the transmitter is a reflection signal that results from the reflection of the signal originating from the antenna apparatus at the transmitter.

According to a configuration, the antenna apparatus and the data processing apparatus are configured to receive and process signals actively generated by the transmitter as signals originating from the transmitter. In a configuration, the transmitter actively generates signals by sending out signals on its own. In a further configuration, the transmitter is activated by the signal of the antenna apparatus and then actively sends out signals. In a configuration, actively generating also means receiving and sending out signals with certain changes, e.g., shifting the frequency or applying information.

According to a configuration, the antenna apparatus and the data processing apparatus are configured to receive and to process signals reflected by the transmitter as signals originating from the transmitter. In this configuration, the transmitter therefore is, e.g., an object that is radiated with RADAR signals and that reflects the signals accordingly.

According to a configuration, the data processing apparatus determines an uncertainty of the determined information about the position of the transmitter depending on a beam width of the beams of the activated directional characteristics of the antenna apparatus configured as multibeam antenna.

A further apparatus for determining the data to be represented via the above-described apparatus follows. The following configurations may also be combined with the previous ones. The same applies vice versa.

Thus, in a configuration, the apparatus for representing the user information includes a positioning apparatus according to a second variation. The antenna apparatus comprises several different directional characteristics that respectively refer at least to a quantity of spatially different receive sensitivities of the antenna apparatus. Thus, the antenna apparatus does not receive the signals in a spatially homogenous manner, but, depending on the directional characteristic, from different spatial areas. The antenna apparatus is configured to receive at least one signal from the transmitter with different directional characteristics, respectively. Since each directional characteristic is connected to its own sensitivity distribution, the signals of the transmitter are also received as different receive signals. In a configuration, the reception with the different directional characteristics takes place in a temporally offset manner and, in another configuration, takes place simultaneously. In a configuration, it is assumed that the transmitter sends out the signals with essentially the same signal strength, respectively. A signal processing apparatus is configured to process the signals received by the antenna apparatus and respectively determine an amplitude value of field strength of the received signals. Finally, a data processing apparatus is configured to determine, based on the directional characteristics and the amplitude values determined from the respectively associated received signals, the information about the position of the transmitter. In a configuration, the antenna apparatus forms part of the positioning apparatus. Subsequently, the determined data is accordingly represented by the above-described apparatus for representing user information. In a configuration, the positioning apparatus includes the antenna apparatus and the signal processing apparatus.

Thus, signals are received with different directional characteristics. For each of the received signals, an amplitude value is determined that is associated with the corresponding signal and therefore also to the respective directional characteristic. In a configuration, the directional characteristics are connected to a direction of a beam so that signals may also be received primarily from this direction. Then, based on data of the directional characteristics and the respective amplitude value, information about the position of the transmitter is determined.

In a configuration, a control apparatus is provided and configured to switch different directional characteristics for receiving signals originating from the transmitter. Thus, the data processing apparatus is configured to determine the information about the position of the transmitter based on the switched directional characteristics and the associated determined amplitude values. In a configuration, switching the directional characteristics signifies that only the signals of the switched directional characteristic reach the signal processing apparatus. In an alternative or additional configuration, the antenna apparatus is interfered with such that signals may only be received with the switched directional characteristic.

In a configuration, the control apparatus also serves for switching the directional characteristics via which an excitation signal is sent out. For example, this is entailed with passive transmitters, e.g., RFID transponders. Thus, in a configuration, the directional characteristics also go along with a spatially different radiation distribution.

According to a configuration, the data processing apparatus is configured to determine, from the determined amplitude values in the form of vectors and the data about the directional characteristics, a statement about a direction of the transmitter relative to the antenna apparatus as information about the position of the transmitter. In this configuration, it is at least being determined in which direction the transmitter is positioned relative to the antenna apparatus. A receive vector is constructed from the amplitude values and the data about the respective directional characteristic.

According to a configuration, the antenna apparatus is configured such that the directional characteristics each comprise a global maximum that is located in a distinct sector in an irradiation area associated with the antenna apparatus, which is determined by a pair of an azimuth angle and a co-elevation angle. In this configuration, a maximum—particularly with respect to the receive sensitivity—of the directional characteristics is associated with a sector or area around the antenna apparatus, respectively. This means that each directional characteristic receives from the sector associated with it the signals in the strongest degree. In a configuration, this also applies for sending out signals via the antenna apparatus. In this case, the sector is defined by two angles.

According to a configuration, the antenna apparatus is configured such that the directional characteristics each comprise an auxiliary maximum respectively located in a sector different to the sector in which the global maximum is located, and comprising a specifiable level distance to a level of the global maximum. In this configuration, smaller auxiliary maximums with respect to the receive sensitivity are also provided, which are located in other sectors. In this case, the auxiliary maximums each comprise a specifiable level distance to the level of the global maximum. In this case, the level is an arbitrarily definable measure for the receive characteristic, or, depending on the configuration, also for the transmitting characteristics of the antenna apparatus.

According to a configuration, the antenna apparatus is configured such that the directional characteristics each comprise an auxiliary maximum located in the same sector as the global maximum and comprising a specifiable level distance to a level of the global maximum. In this configuration, the auxiliary maximums are located in the same sector as the respective global maximum. Thus, the risk of reception from neighboring sectors is further reduced and, therefore, the unambiguity of determining the information about the position of the transmitter is also increased.

According to a configuration, the signal processing apparatus is a RFID reader that generates a "received signal strength indication" value as an amplitude value of the field strength of the received signals. In this configuration, in particular, the transmitters are RFID transponders so that the signal processing apparatus is therefore also a RFID reader.

According to a configuration, the signal processing apparatus is configured to identify the transmitter. For example, with RFID transponders, this takes place via the identification data transmitted in the response signals.

According to a configuration, a signal source is configured to generate an excitation signal. Furthermore, the control apparatus is configured to switch one directional characteristic for the radiation of the excitation signal, respectively. In an alternative configuration, the excitation signal is emitted in an omnidirectional manner without the control apparatus. In a configuration, the excitation signal provides the transmitter with the entailed energy to be able to send out its own signals. Alternatively, the excitation signal is reflected by the transmitter so that the transmitter is purely passive. In an alternative case, signals are therefore only (passively) reflected—e.g., as with radar.

According to a configuration, the control apparatus is configured to switch the directional characteristic switched for radiating the excitation signal as a directional characteristic for receiving the signal originating from the transmitter. In this configuration, the excitation signal is transmitted with a directional characteristic and the receive signal is received with the same directional characteristic. Therefore, the excitation signal particularly applied to a spatial area, and the signal is essentially received only from this spatial area.

A further variation is an active transmitter that sends out signals on its own. These signals are received by the antenna apparatus and are subsequently used for determining the directional information. Therefore, in a variation, the apparatus is only receiving.

According to a configuration, the antenna apparatus comprises several antenna elements. In a configuration, each antenna element is connected to a directional characteristic. In a configuration, the antenna elements are parts of a patch antenna or, alternatively, dipole antennas, monopole antennas, monopole-type antennas, chip antennas or loop antennas.

According to a configuration, the antenna apparatus comprises a feed network that causes different directional characteristics of the antenna apparatus. For example, the feed network, or beam forming network, is configured as a Butler matrix.

According to a configuration, the feed network is configured to output in a divided manner signals received by the antenna apparatus according to the directional characteristics. According to a configuration, the antenna apparatus simultaneously receives signals with different directional characteristics and the feed network outputs all received signals respectively associated with the directional characteristics. Thus, it is effectively a kind of spatial spectral decomposition.

According to a configuration, the antenna apparatus is configured as a multibeam antenna. A multibeam antenna comprises several directional characteristics, each of which is characterized by a beam. In a configuration, the beams are directed in different directions.

The following are some configurations of a third variation of the positioning apparatus. These configurations may also be partially combined with the previously-described configurations.

Thus, in a configuration, the apparatus for representing user information includes a positioning apparatus according to a third variation. In a configuration, the antenna apparatus forms part of the positioning apparatus and is alternatively a separate component. The antenna apparatus is configured to receive signals originating from the transmitter. The antenna apparatus comprises at least one excellent directional characteristic. In this case, the excellent directional characteristic refers to a quantity of spatially different receive sensitivities of the antenna apparatus. The excellent—alternatively also referred to as "special" or "selected"—directional characteristic comprises at least one sensitivity minimum that is associated with a spatial detection area. Furthermore, a data processing apparatus is configured to evaluate at least the signals received by antenna apparatus with the excellent directional characteristic with respect to the position of the transmitter relative to the detection area. In a configuration, the positioning apparatus comprises the antenna apparatus and the data processing apparatus.

In this case, the directional characteristic refers to spatially different receive sensitivities. This means that, with this direction characteristic, the antenna apparatus receives signals from different spatial areas to a varying degree. In the excellent directional characteristic, it is even intended that there is a minimum with respect to the reception of signals in a spatial detection area. This means that the signals of a transmitter located in this detection area are received by the antenna apparatus only to a small degree or not at all. Thus, if the transmitter transmits its signals with the same output power and if it moves through the detection area, the field strength of the received signals will significantly decrease or even approach zero. Thus, the data processing apparatus is configured to evaluate the received signals regarding which position the transmitter is located relative to the detection area. In the simplest case, a minimum of the field strength of the received signal indicates that the transmitter is located in the detection area. With larger field strength, the transmitter is located outside of the detection area.

Thus, in a configuration, the use of historical data, i.e., stored measurement values, is provided for positioning so that the point in time at which the transmitter has passed the detection area is determined from the decrease and the subsequent increase of the signal amplitude.

In a configuration, the antenna apparatus comprises several (at least two) different directional characteristics that respectively refer to a quantity of spatially different receive sensitivities of the antenna apparatus. In this case, one of the directional characteristics is the excellent directional characteristic with said sensitivity minimum. Furthermore, the apparatus comprises a control apparatus that is configured to switch the directional characteristics for receiving signals originating from the transmitter.

In a configuration, in particular, the control apparatus switches, i.e., activates, the excellent directional characteristic. In an alternative configuration, the antenna apparatus comprises only one directional characteristic, which is therefore also the excellent directional characteristic.

The following configuration refers to the fact that, in particular, a further directional characteristic may exist beside the excellent directional characteristic.

In this configuration, the control apparatus is configured to switch at least one comparison directional characteristic of the antenna apparatus. In this case, the comparison directional characteristic is a further directional characteristic that comprises a sensitivity maximum in the spatial detection area. Thus, with this comparison directional characteristic, the received signals of the transmitter comprise higher signal amplitude if the transmitter is located in the detection area, and lower amplitude if the transmitter is located outside of the detection area. Finally, the data processing apparatus is configured to inspect the information about the position of the transmitter relative to the detection area based on the signals received by the antenna apparatus with the comparison directional characteristic. Thus, the actual determination of the position of the transmitter occurs with the signals measured with the excellent directional characteristic. These results are inspected with the signals that were received with the comparison directional characteristic. Thus, it is checked if the respective statements about the positions matched each other.

In a configuration, the data processing apparatus is configured to evaluate signals received by the antenna apparatus at different points of time with respect to the position of the transmitter relative to the detection area. In this configuration, signals are received at different points in time and the temporal course of the signals, or the data determined therefrom, is evaluated with respect to the position of the transmitter. For example, it may be interpolated at which point in time the transmitter has passed the detection area. Since the detection area is connected to a sensitivity minimum, a case results in which the amplitude of the received signals decreases and then increases. This means that the transmitter has to be located in the detection area between the decrease and the increase.

In a configuration, the transmitter only moves in one direction relative to the detection area. In a configuration, the movement direction is parallel to an axis on which the antenna elements of the antenna apparatus are located. Furthermore, according to a configuration, the transmitter moves on an axis perpendicular to the detection area.

If the transmitter only moves on a known path relative to the detection area, the evaluation of the signals is simplified. In particular, a sequence of changes of the signals caused by the movement of the transmitter may be inferred for the directional characteristics. In turn, this allows the position of the transmitter to be inferred from the signals. For example, for the above-mentioned form of the excellent directional characteristic, the sequence of a decrease in amplitude and then an increase in amplitude results. This is provided that the transmitter essentially sends out the signals with the same field strength.

If another transmitter follows the above-mentioned transmitter in a scenario, it may occur that the signals of the further transmitter are received, however, since it is spatially located behind the first-mentioned transmitter, its signals are received with a different receive sensitivity which may therefore also cause a different signal amplitude that differs from the values expected for the first transmitter. For example, the signal amplitude jumps, whereas previously there had actually been a decrease in the signal amplitude. Therefore, a distinction can be made between several transmitters.

In a further configuration, information data about the transmitter is determined from the received signals. This configuration is based on the fact that, e.g., RFID transponders also send out identification data with the response signals. Thus, this configuration allows separating between the signals of different transmitters by identifying the transmitters through their own signals, respectively.

According to a configuration, the positioning apparatus comprises a data storage. In this case, the data processing apparatus is configured to store data associated with the signals received at different points in time in the data storage. Furthermore, the data processing apparatus is configured to determine from the data stored in the data storage the point in time at which the transmitter is located in the detection area and/or passes the detection area. A previously mentioned scheme for the course of the signal amplitude is as follows: decrease in amplitude, reaching a minimum, increase in amplitude. This applies in a case in which only a receive minimum is present. With an assumed constant velocity of the transmitter, the point in time of the passage may possibly also be extrapolated.

According to a configuration, the excellent directional characteristic comprises several sensitivity minimums associated with different spatial detection areas. In this configuration, due to the plurality of sensitivity minimums, the directional characteristic makes it possible that different detection areas may be monitored. With this, on the one hand, the position of the transmitter may be limited more precisely, i.e., if it is located between two detection areas, for example. Furthermore, statements about the position of the transmitter may be verified. This applies particularly in connection with the evaluation of signals received at different points in time.

In a configuration, a signal processing apparatus is present. In this case, the signal processing apparatus is configured to process the signals received by the antenna apparatus and to respectively determine an amplitude value of field strength of the received signal. Evaluating the received signal may be simplified with this configuration since each signal has associated therewith only value. In this case, the data processing apparatus is accordingly configured to process the amplitude values of the received signals.

According to a configuration, the signal processing apparatus is a RFID reader that generates a "received signal strength indication" value as an amplitude value of the field strength of the received signals, respectively.

In an alternative or additional configuration, data that allows the identification of the transmitter is determined from the received signals.

In a configuration, the positioning apparatus comprise a signal source that is configured to generate an excitation signal. The antenna apparatus is configured to radiate the excitation signal. In a configuration, the signal source forms part of the signal processing apparatus and, in an alternative configuration, is a separate component. In a configuration, in particular, the signal source is associated with the signal processing apparatus configured as a RFID reader.

According to a configuration, the detection area is a plane. In a configuration, in particular, the detection area extends only across one plane. In this case, it is detected if the transmitter passes a plane.

In a configuration, the antenna apparatus is configured as a multibeam antenna. A multibeam antenna comprises different directional characteristics, respectively characterized by a beam or main beam. These beams are at least partially differently orientated in the space so that different spatial areas are also measured with different receive sensitivity.

According to a configuration, the antenna apparatus comprises several antenna elements. In a configuration, the antenna elements are components of a patch antenna and, in an alternative configuration, are individual dipole antennas, monopole antennas, monopole-type antennas, chip antennas or loop antennas.

In a configuration, the antenna apparatus comprises two antenna elements. In this case, the control apparatus is configured to switch the two antenna elements alternately in the odd mode and in the even mode. In a configuration, the two antenna elements are configured in the substantially same way and therefore comprise the same characteristics with respect to receiving signals. The different feed of the antenna elements leads to different directional characteristics.

In a configuration, with a feed of the antenna elements in the even mode, a sensitivity maximum results in a plane that stands perpendicular on a connection axis between the two antenna elements. Feeding in the odd mode generates a directional characteristic with a minimum, or a zero point, in the plane that stands perpendicular on the connection axis.

Thus, according to a configuration, the antenna elements are arranged such that the affected plane is located in the detection area. This is accompanied by the fact that the directional characteristic resulting from the feed in the odd mode is at the same time the excellent characteristic, and that the directional characteristic that is achieved with the feed in the even mode is the comparison directional characteristic.

According to a configuration, the antenna apparatus comprises a feed network. In this case, the feed network is configured to cause different directional characteristics of the antenna apparatus. This refers to transmitting and receiving signals. In a configuration, the feed network is particularly configured such that it outputs for each directional characteristic the respectively received signal, insofar as the antenna apparatus receives signals simultaneously with several directional characteristics.

Configurations of a fourth variation of the positioning apparatus as part of the apparatus for representing user information follow. The following configurations partially allow for a combination with the above-mentioned configurations.

In a configuration, the apparatus includes a positioning apparatus according to a fourth variation. The antenna apparatus comprises several different directional characteristics, the directional characteristics each referring to a quantity of spatially different receive sensitivities of the antenna apparatus. Furthermore, the antenna apparatus comprises signal outputs, the directional characteristics being associated with the signal outputs. Furthermore, a regulating apparatus is configured to connect a signal output of the antenna apparatus to an information reading apparatus and further signal outputs of the antenna apparatus to a data processing apparatus. In this case, the information reading apparatus is configured to determine data from received signals, which is transmitted with the signals. Furthermore, the data processing apparatus is configured to evaluate received signals with respect to their physical characteristics. In a configuration, the positioning apparatus comprises the antenna apparatus, the regulating apparatus, the information reading apparatus and the data processing apparatus.

The antenna apparatus comprising several directional characteristics signifies that the antenna apparatus receives signals with spatially different sensitivities depending on a selected directional characteristic, respectively. Or in other words: depending on the directional characteristic, signals are advantageous from different spatial areas. The directional characteristics are associated with the signal outputs. A regulating apparatus connects a signal output to an information reading apparatus and connects further signal outputs to the data processing apparatus. The information reading apparatus and the data processing apparatus differ at least in that the information reading apparatus is configured to determine data from the signal supplied to the same, which is transmitted with the signal. Thus, the transmitter emits signals that also carry information, e.g., for identifying the transmitter or in the form of measurement values or, e.g., in the form of forwarded data. Depending on the type of transmitter, e.g., the information reading apparatus is therefore a RFID reader for a RFID transponder as a transmitter or a satellite receiver for satellite signals with a satellite as a transmitter. The same applies to mobile phone communications. The data processing apparatus serves for determining the physical characteristics of the signals. In a configuration, the data processing apparatus also allows to extract data from the signals. In an alternative configuration, the data processing apparatus does not allow to extract data from the signals so that, in this configuration, the data processing apparatus involves less intelligence, or may be configured in a simpler manner. Thus, in the latter configuration, the data processing apparatus only serves for determining the physical quantities of the received signals. For example, this is the signal amplitude of the phase of the received signals. Based on this physical data, the information about the position of the transmitter may then be determined, e.g., using a triangulation.

The antenna apparatus and the evaluation of the additional received signals overall provides the direction information about the transmitter as an addition to the evaluation of the transmitter signals with respect to the transmitted data, or information.

In a configuration, the information reading apparatus is associated with the data processing apparatus, and, in a further configuration, is comprised by the data processing apparatus.

In a configuration, the positioning apparatus comprises two information reading apparatuses that are accordingly connected to the signal outputs of the antenna apparatus by the regulating apparatus.

In a configuration, in particular, the antenna apparatus is configured such that the antenna apparatus receives signals with several directional characteristics. In a configuration, the antenna apparatus comprises several antenna elements that are associated with different directional characteristics and that enable continuously receiving signals.

In a configuration, a signal output of the antenna apparatus is associated with each directional characteristic.

According to a configuration, the information reading apparatus is configured to determine, from the received signals, the data transmitted with the signals, and to evaluate the received signals with respect to their physical characteristics. In this configuration, the information reading apparatus extracts information, or data, from the received signals and furthermore determines at least one statement about physical characteristics of the signal. For example, if the information reading apparatus is a RFID reader, not only is the transmitted data determined, but a RSSI value is generated for the signal amplitude.

According to a configuration, the data processing apparatus is configured to evaluate the received signals only with respect to their physical characteristics. Thus, the data processing apparatus may not determine, from the received signals, information transmitted therewith. Again considering the above example of the RFID transponder, the RFID data sent out are solely electromagnetic signals for the data processing apparatus, not carrying any information.

According to a configuration, the antenna apparatus comprises several antenna elements. In this case, the antenna elements each comprise a directional characteristic. Finally, the signal outputs are connected to different antenna elements. This is a variation by which the signals associated with the associated directional characteristics separately reach the signal outputs. In a configuration, the antenna elements are elements of a patch antenna. In alternative configurations, they are dipole antennas, monopole antennas, monopole-type antennas, chip antennas or loop antennas.

According to a configuration, the antenna apparatus comprises a feed network and the feed network causes different directional characteristics of the antenna apparatus. Thus, the feed network serves for generating the directional characteristics.

According to a configuration, the feed network is configured to separate signals received with the antenna apparatus into the individual directional characteristics. Thus, in a configuration, in particular, a Butler matrix that serves for separating the received signals into the individual directional characteristics is realized in the feed network.

According to a configuration, the antenna apparatus is configured as a multibeam antenna. The directional characteristics are characterized by at least one significant beam with respect to the receive sensitivity.

According to a configuration, at least one of the directional characteristics differs from the others with respect to the orientation of the beams.

Thus, the antenna apparatus of the above-mentioned configurations enables switching different directional characteristics, or receiving signals with different directional characteristics, each comprising a beam. In a configuration, in particular, the beams are orientated in different directions. Thus, the multibeam antenna enables receiving from respectively different spatial areas that mainly differ from each other in the orientation of their (main) beams. As a result of the reduced spatial area and the knowledge about the orientation of the beams, the information about the position of the transmitter may be determined.

A configuration generally exploits that, upon reception, amplitude information and phase information is obtained using a multibeam antenna that is excited by a feed network (such as a Butler matrix) and its signaled paths. Feed networks such as Butler matrices are usually used in n*m or n*n multibeam antennas. In this case, the antenna elements or the actual antenna comprise n signal outputs that are led to the feed network and are led by the feed network to m signal outputs.

According to a configuration, the directional characteristics partially overlap. In an alternative configuration, at least several beams of the different directional characteristics are without overlap.

According to a configuration, the regulating apparatus is configured to alternately connect the information reading apparatus to different signal outputs of the antenna apparatus. In this configuration, since the signal outputs are connected to different directional characteristics, signals from different spatial areas are supplied to the information reading apparatus.

According to a configuration, the data processing apparatus is configured to evaluate the received signals with respect to the direction of the transmitter. In this configuration, it is at least being determined in which direction the transmitter is positioned relative to the antenna apparatus. In a further configuration, the position or at least the spatial area of the transmitter is being determined.

According to a configuration, the positioning apparatus comprises a signal source and the signal source is configured to generate an excitation signal that the antenna apparatus radiates. Insofar as the transmitters are passive components, such as RFID transponders, they receive from the signal source a wakeup signal, or the involved energy to be able to send out signals. In a configuration, in particular, the signal source performs part of the information reading apparatus. In a configuration, the information reading apparatus transmits the excitation or wakeup signal with the same directional characteristic with which the response signals that are supplied to the information reading apparatus are received. Thus, the transmitters from which the response signals are also primarily received are activated.

According to a configuration, the transmitter is a radio-frequency identification transponder. Thus, the transmitter is a RFID transponder or RFID tag and, accordingly, the information reading apparatus is a RFID reader that, in particular, also comprises the signal source in order to activate the RFID transponder. Insofar as the information reading apparatus sends out the activation signal with a directional characteristic, solely the RFID transponders within the associated spatial area are activated.

According to a configuration, the transmitter is a satellite. Accordingly, the information reading apparatus is a satellite receiver that receives the satellite signals and extracts data transmitted therewith.

According to a configuration, the regulating apparatus is configured to alternately connect the information reading apparatus to different signal outputs of the antenna apparatus and further signal outputs of the antenna apparatus to the data processing apparatus. Thus, a respective signal output is connected to the information reading apparatus and respectively remaining signal outputs are connected to the data processing apparatus.

The following configurations refer to a fifth variation of the positioning apparatus. Here, combinations of the following configurations with the previous configurations may be realized.

In a configuration, the apparatus comprises a positioning apparatus according to a fifth variation. In this case, the positioning apparatus enables a communication with communication apparatuses. Here, the communication apparatuses are the above-described transmitters. The positioning apparatus comprises a transmitting apparatus, a receiving apparatus and a control apparatus. The receiving apparatus is configured to receive signals. The control apparatus is configured to specify a spatial area into which the transmitting apparatus sends out signals.

The transmitting apparatus sends out signals that are particularly destined for the communication apparatuses. The receiving apparatus receives signals from the communication apparatuses. Here, the control apparatus is present, specifying to the transmitting apparatus a spatial area into which signals are sent out. In a configuration, specifying the spatial area for sending out the signals takes place via selecting a directional characteristic or a superimposition of directional characteristics via which the signals are sent out into the selected spatial area. For example, if a directional characteristic of a transmitting antenna is connected to a beam shape, the signals are sent out into this beam, or the associated spatial area. According to a configuration, the receiving apparatus is configured to receive signals from selectable receive areas.

The following configurations refer to signals that are sent out by the transmitting apparatus.

According to a configuration, the transmitting apparatus sends out an activation signal in an omnidirectional manner. Thus, in this configuration, at least one signal, i.e., the activation signal, is not solely sent out into one spatial area. Here, the activation signal is sent out in an omnidirectional manner so that it may reach as many communication apparatuses as possible. This builds upon the fact that for the start it is not known if and where communication apparatuses are located in the surrounding area of the positioning apparatus. Sending out in an omnidirectional manner depends on the available antenna apparatuses.

According to an alternative configuration, the control apparatus is configured to specify an activation area into which the transmitting apparatus sends out an activation signal. Thus, in this configuration, a spatial area—the activation area—is specified, into which the activation signal is sent out. Thus, an advantageous direction is specified.

Depending on the configuration, the activation signal is a signal to determine if communication apparatuses are present and to prepare a communication with the same. Depending on the configuration of the communication apparatuses, the activation signal allows to switch the communication apparatuses from a passive state into an active state (cf. disclosure of DE 10 2009 047 199 A1) or allows to supply to the communication apparatuses the energy that is needed for a communication (in the sense of RFID tags).

In the previous configuration, the activation signal originating from the apparatus, or particularly from the transmitting apparatus, causes triggering the communication, however, in the following configuration, it is shown that the wish for communication may also originate from the communication apparatuses.

In order to limit the number of communication apparatuses that are to react on an activation signal, in a configuration, the transmitting apparatus is configured to send out an activation signal with a wakeup identifier for at least one communication apparatus to be activated.

Thus, the activation signal contains the statement which communication apparatus, or which communication apparatuses, is/are effected, or are to be activated.

In a configuration, the control apparatus is configured to specify to the receiving apparatus different receive areas for receiving signals. Similar to transmitting signals into selected spatial areas, in this configuration, the signals are solely received from respective spatial areas. In other words: in this configuration, the receiving apparatus only listens to signals from certain areas.

In a configuration, the receive areas are specified such that they each are subareas of the activation area.

In a configuration, the receiving apparatus comprises an antenna apparatus. Here, the antenna apparatus comprises several directional characteristics that refer to spatially different receive sensitivities. Furthermore, the receiving apparatus is configured to associate the received signals with the directional characteristics. Thus, the receiving apparatus receives signals from certain spatial areas depending on the respective directional characteristic. Therefore, by selecting the directional characteristic, it may be specified from which spatial area signals are to be received. Accordingly, in a configuration, this also applies to the connection between the directional characteristics and the spatial areas for transmitting signals.

In a configuration, the association between the received signals and the directional characteristics takes place due to the fact that signals are only received with one selected directional characteristic. In an alternative configuration, signals are received with several directional characteristics, which are divided by a corresponding network—e.g., by realizing a Butler matrix—into signals associated with the respective directional characteristics.

The following configurations refer to the actual communication between the positioning apparatus and the communication apparatuses that particularly take place after the objects and their position have been identified. The position data may be represented according to the invention.

In a configuration, the control apparatus is configured to specify a communication area into which the transmitting apparatus sends out a communication signal. By limiting the communication area, less energy is involved for sending out the signals, and it may also be avoided that communication apparatuses that are not concerned receive the signal.

In a further configuration, an initiation signal originates from a communication apparatus, which means that the communication apparatus wants to communicate with the apparatus. In a configuration, in the case in which the receiving apparatus receives an initiation signal from a communication apparatus, the control apparatus is configured to specify a communication area. The communication area is specified depending on a position of the communication apparatus that sent out the initiation signal. Then, the transmitting apparatus sends out a communication signal into the communication area.

The following configuration refers to the fact that, via the directional characteristics, a certain number of fields or areas is scanned with respect to the objects, or communication apparatuses, located therein. In this case, response signals are to be received from all areas, if possible. For example, this builds upon the fact that an activation signal causing response signals from the communication apparatuses is sent out by the transmitting apparatus. Thus, in order to realize localization as effectively and energy-efficiently as possible, one activation signal should be sufficient to determine the positions of all communication apparatuses. Thus, it is an object to pass through all areas as quickly as possible.

Thus, according to a configuration, the receiving apparatus is configured to receive signals only for a specifiable period, e.g., referred to as $T_{VD}$. The period is specified by the control apparatus, for example.

Thus, in a configuration, the period $T_{VD}$ is specified depending on a data rate, e.g., herein denoted with $1/T_b$, with which the communication apparatuses send out their signals and, in particular, their response signals upon an activation signal. In a configuration, the period $T_{VD}$ is proportional to the reciprocal of the data rate. Thus, with a data rate of $1/T_b$ the period $T_{VD}$ is proportional to $T_b$. This signifies that, with a higher data rate, the period for receiving signals from a receive area decreases accordingly. Here, $T_b$ is the bit duration.

Additionally or alternatively, according to a configuration, the period $T_{VD}$ is specified depending on a number of the receive areas from which the receiving apparatus receives signals. In a configuration, the period $T_{VD}$ is anti-proportional to the number of receive areas. For example, if the number of the receive areas is given via the product M*N, the period $T_{VD}$ is anti-proportional to M*N, or proportional to 1/(M*N). This means that with an increasing number of the receive areas, the duration during which the receiving apparatus receives signal from the areas decreases. According to a configuration, in order to accelerate the process, more than one receiving apparatus is to be used.

In a configuration, the period $T_{VD}$ results from both above-mentioned dependencies so that the period $T_{VD}$ is particularly proportional to $T_b/(M*N)$.

In a configuration, the specifiable period $T_{VD}$ for receiving the signals is shorter than the bit duration $T_b$. In a further configuration, the specifiable period is much shorter than the bit duration. In an alternative or additional configuration, the specifiable period $T_{VD}$ is shorter than the bit duration $T_b$ divided by the number of receive areas. Thus, in a configuration, if n fields are queried, the period is shorter or significantly shorter than the bit duration divided by the number n of the fields. This means: $T_{VD} < T_b/n$, or $T_{VD} \ll T_b/n$. Thus, with two fields, the specifiable period is shorter than half of the bit duration. This enables to quickly sense several fields within a data bit of the duration $T_b$. This also results in the impression of a simultaneous communication between several objects and the central radio unit.

In a configuration, the receiving apparatus is configured to determine, from at least one received signal, an identifier concerning the communication apparatus from which the received signal originates. In this configuration, the communication apparatuses respectively transmit information in the response signal which enables determining the identity of the communication apparatus, or the associated object.

The following configurations refer to the transmitting apparatus or the receiving apparatus which, depending on the configuration, have a similar structure or different configurations.

Thus, according to a configuration, the transmitting apparatus comprises several different selectable directional characteristics. Here, the directional characteristics each refer to a quantity of spatially different transmitting characteristics. Thus, one spatially differently distributed transmitting field is formed per directional characteristic. Or in other words: the signals are each emitted differently into the space.

According to an alternative or additional configuration, the receiving apparatus comprises several different selectable directional characteristics. Here, the directional characteristics respectively refer to a quantity of spatially different receive sensitivities. In this configuration, the receiving apparatus receives signals from different spatial areas to a varying degree.

In a further configuration, the transmitting apparatus and/or the receiving apparatus comprises an antenna apparatus. Here, the antenna apparatus is configured as a multi-beam antenna. A multibeam antenna comprises several directional characteristics that are each characterized by a beam. In this case, the beams are each directed into different spatial directions. Therefore, this is also the main direction into which signals are transmitted and from which signals are received. Thus, each directional characteristic is associated with a spatial area. In a configuration, the transmitting apparatus and the receiving apparatus use the same antenna apparatus.

In a configuration, the transmitting apparatus and the receiving apparatus are configured as one component. Thus, in this configuration, both apparatuses are essentially configured as one unit, which may therefore also be referred to as a central radio unit.

In an alternative configuration, the transmitting apparatus and the receiving apparatus are separate units that are also located at separate positions.

In a configuration, the communication apparatus comprises a transmission apparatus and a detection apparatus. The transmission apparatus is configured to send out signals. The detection apparatus is configured to receive signals. Furthermore, the transmission apparatus is configured to send out signals such that the signals allow determining at least one identifier with respect to the communication apparatus. Thus, the communication apparatus sends out signals that enable an identification of the communication apparatus, or an object connected therewith.

In a configuration, the communication apparatus is a RFID tag. In an alternative or additional configuration, the communication apparatus is configured according to the disclosure of the unexamined application DE 10 2009 047 199 A1.

In a configuration, the transmission apparatus is configured to send out an initiation signal to initiate a communication with an apparatus for communication. In this configuration, the communication apparatus is not only purely passive and reacts to a signal reaching the same, but the communication apparatus triggers a communication by sending out an initiation signal.

In a configuration, the communication apparatus is configured to send out at least one response signal after receiving an activation signal.

In a further configuration, the communication apparatus switches from a passive state into an active state after receiving an activation signal. Thus, the communication apparatus is activated by a received signal.

In a configuration, the communication apparatus receives energy through the activation signal in order to send out a response signal or to, e.g., execute a measurement with a sensor.

In a configuration, the communication apparatus comprises at least one sensor. In this case, the transmission apparatus is configured to send out a signal with a measurement value of the sensor. For example, the sensor determines temperature, pressure, connectivity, pH value, throughput or level of filling. Then, the measurement value is sent out by the transmission apparatus.

In a configuration, the positioning apparatus according to the fifth variation carries out the following steps:

An activation signal is sent out into an activation area by the positioning apparatus. In a configuration, the activation area is given by the omnidirectional emission of the activation signal and therefore by the configuration of the antenna apparatus used for sending out and its radiation characteristics. In another configuration, the activation area results from at least one directional characteristic of the antenna apparatus used for sending out, which is accompanied by a certain spatial distribution of the signals sent out.

After receiving the activation signal by at least one communication apparatus, at least one response signal is transmitted therefrom.

The response signals are received by the positioning apparatus. Receiving the response signal contains the fact that, through the reception, a statement about the position or at least the direction of the communication apparatus sending out is possible relative to the used antenna apparatus. In a configuration, this takes place by using receive areas that are associated with directional characteristics of the antenna apparatus used for the reception. Thus, in a configuration, different directional characteristics are used for the reception.

Subsequently, in particular, a communication area is selected by using the associated direction characteristic. In this communication area, a communication signal is transmitted by the apparatus to the at least one communication apparatus located in the communication area. Subsequently, further signals may be received from the communication area.

The following discussions refer to a positioning apparatus according to a sixth variation.

In a configuration, the apparatus comprises a positioning apparatus according to a sixth variation. Here, the positioning apparatus enables a detection of at least one object. The positioning apparatus comprises at least one transmitting apparatus, at least one receiving apparatus and at least one evaluation apparatus. The transmitting apparatus is configured to send out signals. The receiving apparatus is configured to receive signals. Furthermore, the evaluation apparatus is configured to compare the signals sent out by the transmitting apparatus with the signals received by the receiving apparatus and to generate a comparison result. Furthermore, the evaluation apparatus is configured to at least determine from the comparison result if the object is located between the transmitting apparatus and the receiving apparatus. In a configuration, the signals are electromagnetic (radio) signals. In a configuration, the transmitting apparatus and/or receiving apparatus are configured as a transmitting and receiving apparatus, or as a transmitting/receiving apparatus. Depending on the configuration, the antenna apparatus of the inventive apparatus for representing user information is included in the transmitting apparatus and/or the receiving apparatus of the sixth variation of the herein-described positioning apparatus.

Thus, the positioning apparatus comprises components with which signals are sent out and received. From the comparison of the respective signals, it is at least being determined if an object is located between the transmitting apparatus and the receiving apparatus and therefore in the path of the signals sent out.

According to a configuration, the evaluation apparatus is configured to determine an attenuation factor as a comparison result from the signals sent out by the transmitting apparatus and the signals received by the receiving apparatus. In this configuration, it is being determined by which factor the signals sent out are attenuated. In this case, an attenuation of 100% means that the signal was not able to pass through the space. Accordingly, an attenuation of 0% means that the space between the transmitting and receiving apparatus is transparent, or free of an object, for the signals. Subsequently, this attenuation factor enables further statements about an object in addition to the fact if an object is present at all. For example, this is the determination or classification at least of a material of the object.

According to a configuration, the positioning apparatus comprises several receiving apparatuses at different positions. Furthermore, the evaluation apparatus is configured to generate, for the signals received by the receiving apparatuses, a comparison result associated with the respective receiving apparatus and/or the position of the respective receiving apparatus. In a configuration, the evaluation apparatus is configured to determine at least one statement about a characteristic of the object from the positions of the receiving apparatus and the associated comparison results. In this case, the statement refers to the presence of the object or to material characteristics or the contour of the object etc. In this configuration, the signals are received by the individual receiving apparatuses at different locations. Thus, the signals sent out also pass through different spatial areas and therefore allow for statements about the presence of an object in the associated spatial areas or further statements about the object or possibly objects. Thus, the evaluation apparatus generates a comparison result for each receiving apparatus and uses the same in connection with data about the respective positions of the receiving apparatus to generate at least one further statement about the object—in addition to the statement about its presence. In a configuration, the position of the receiving apparatus refers to a surface element.

According to a configuration, the evaluation apparatus is configured to determine an attenuation factor for each of the signals received by the receiving apparatuses. Thus, one attenuation factor is determined per location of the receiving apparatus.

According to a configuration, the evaluation apparatus is configured to determine an amplitude factor for each of the amplitudes of the received signals. In a configuration, the so-called RSSI value of the received signals is being determined. This is the "receive signal strength indicator", which is a value for the field strength of the received signals.

According to a configuration, the evaluation apparatus is configured to determine the attenuation factor from the respective amplitude factor and a calibration factor associated with the respective receiving apparatus. For example, the respective calibration factor is determined through a calibration process in which—without an object—it is being determined with which amplitude a signal sent out by the transmitting apparatus is received by the receiving apparatus.

According to a configuration, the evaluation apparatus is configured to determine a contour of the object from the attenuation factors and the positions of the receiving apparatuses. This configuration uses the fact that an expanded object usually prevents the passage of signals for several receiving apparatuses, or weakens the signals. Thus, e.g., at least a contour of the object may be inferred from the quantity of receiving apparatuses simultaneously covered by the object and the knowledge about their positions.

According to a configuration, the evaluation apparatus is configured to, based on the determined contour of the object and based on contour data—stored particularly for the evaluation apparatus or in the same—classify the object. In this configuration, the evaluation apparatus comprises reference data, or special contour data, that allows associating the object with at least one class or one group of objects.

According to configuration, the evaluation apparatus is configured to determine a statement about a material of the object from at least one determined attenuation factor or, accordingly, from several determined attenuation factors. In this configuration, in particular, signals that may pass the object at least in an attenuated manner and that are not entirely blocked in their path by the object are evaluated.

According to a configuration, the transmitting apparatus is configured to send out at least one signal in an omnidirectional manner. In this configuration, the transmitting apparatus transmits in an omnidirectional manner into the space.

In a configuration, the transmitting apparatus is configured to emit at least one signal in one of several specifiable spatial areas. In this configuration, the transmitting apparatus enables the emission of at least one signal into one of several specifiable spatial areas. In a variation, the transmitting apparatus enables sending out signals using different directional characteristics, e.g., by using different antenna elements. Alternatively, the transmitting apparatus comprises a special directional characteristic and the transmitting apparatus is mechanically differently orientated. In a configuration, the above-mentioned directional characteristics consist of the fact that the transmitting apparatus sends out the signals in a beam-shaped manner so that the signals mainly reach into the spatial area into which the respective beam or main beam is directed.

According to a configuration, the transmitting apparatus is configured to emit signals into several different spatial areas. In this configuration, the transmitting apparatus directs the signals into one of several spatial areas, respectively. By alternately emitting the signals into different spatial areas, respectively, the overall space around the transmitting apparatus is applied with the signals in areas.

According to a configuration, the evaluation apparatus comprises a signal evaluation apparatus. In a configuration, several signal evaluation apparatuses are present. Here, the at least one signal evaluation apparatus is configured to generate the comparison results.

Furthermore, the signal evaluation apparatus is associated with the receiving apparatus. Furthermore, the receiving apparatus is configured to generate a response signal depending on the comparison result.

In a further configuration, the evaluation apparatus comprises several signal evaluation apparatuses for several receiving apparatuses. The signal evaluation apparatuses are configured to generate comparison results. In particular, at least one signal evaluation apparatus is associated with the receiving apparatuses, respectively, so that the at least one signal evaluation apparatus determines the comparison result for the signal received by the associated receiving apparatus. Furthermore, the receiving apparatuses are configured to generate a response signal depending on the comparison result, respectively.

In both above-mentioned configurations, the receiving apparatus, or receiving apparatuses, each comprise(s) a signal evaluation apparatus that respectively generates a comparison result. In addition to evaluating with respect to the object, the comparison result is used as a criterion with respect to the fact if the receiving apparatus or the receiving apparatuses generate(s) a response signal. Thus, the evaluation of the received signals is carried out in a decentralized manner via the individual signal evaluation apparatuses. In a configuration, for the signal evaluation apparatuses to compare the transmitted signals with the received signals, reference data from calibrations is present. In an alternative or additional configuration, data about the signals transmitted by the transmitting apparatus is stored in the signal evaluation apparatuses. Therefore, in this configuration, the receiving apparatus is also a transmitting apparatus for sending out, or generally outputting, the response signal. In a configuration, the response signal is sent out wirelessly and, in an alternative configuration, is transmitted in a wired manner.

By having the output of the response signal dependent on the comparison result, the amount of data and, in particular, the energy demand on the receiving apparatus side, which is therefore also a transmitting apparatus, may be reduced. The advantage is that not every response signal is output in general, but only particular ones.

Thus, according to a configuration, the receiving apparatus outputs the response signal only in the presence of a specifiable condition. Thus, for the response signal to be output, at least one specifiable condition has to be fulfilled.

In a configuration, accordingly, in the presence of a multitude of receiving apparatuses with signal evaluation apparatuses, the receiving apparatuses output the response signals only in the presence of a specifiable condition. In a configuration, the conditions are the same for all receiving apparatuses. In an alternative configuration, the condition differs at least for one receiving apparatus when compared to the conditions for the other receiving apparatuses.

A specifiable condition for outputting the response signal is the fact that a comparison result is actually present, i.e., that the receiving apparatus has actually received a signal.

According to a configuration, the specifiable condition is that an attenuation factor determined as a comparison result is larger than a specifiable attenuation limit. Thus, in this configuration, the response signals are only output if a minimum attenuation factor has been exceeded. Depending on the application case, a certain attenuation possibly occurs without the presence of the object. Depending on the specific characteristics of the receiving apparatuses, they possibly comprise a limited accuracy upon reception, or when processing the received signals. Therefore, since there is a certain base variation, a lower limit is specified for the attenuation. In other configurations, the quantity of detectable objects may be limited by specifying the lower limit.

According to a configuration, the specifiable condition at least consists of the fact that the comparison result differs from a previous comparison result above a specifiable development limit value. In this configuration, the response signals are only output if the comparison signal differs from a previous value above a specifiable factor in the form of a development limit value. Thus, if the comparison result does not change or stays below the development limit value, the response signal is not output. This means that solely sufficiently clear changes of the received signal and therefore changes in the space in front of the receiving apparatus are signaled by the response signal. This configuration also contributes to a reduction of the signals to be transmitted, or a reduction of the energy demand of the receiving apparatuses.

According to a configuration, at least one receiving apparatus serves as transmitting apparatus. Thus, in this configuration, it is at least one receiving/transmitting apparatus. In a configuration, this enables outputting the response signals. In an alternative or additional configuration, the signals twice pass through the space in which the object is located, or may be located. For example, this occurs for identifying the material characteristics of the object.

According to a configuration, at least one receiving apparatus is configured to output signals. Thus, in this configuration, it is a receiving/transmitting apparatus.

In a configuration, the above-mentioned configuration allows the receiving apparatus to output the response signals as signals, and in a configuration, particularly as radio signals. In a configuration, the receiving apparatus output as response signals a value for the amplitude of the received signals. In a further configuration, the determined attenuation factor is output as response signal. In an additional configuration, the difference between a value of a currently received signal and the corresponding value of a previously received signal is output as response signal.

In a further configuration, the receiving apparatuses also serve as transmitting apparatuses so that the signals crossing the room in which the object may be located originate from them. Thus, in this configuration, a total of two transmitting/receiving apparatuses are provided, which are arranged such that the space in which the object may be located is between them.

According to a configuration, at least one receiving apparatus is configured to change from a passive state into an active state after receiving a signal. Thus, the described receiving apparatus is awakened by the received signal. For example, such receiving apparatuses are disclosed in the unexamined application DE 10 2009 047 199 A1.

According to a configuration, at least one receiving apparatus comprises an energy storage. For example, the energy storage is a battery or a rechargeable battery.

According to a configuration, at least one receiving apparatus is configured to receive a signal from a specifiable spatial area. In this configuration, the receiving apparatus has the possibility to receive signals solely from a specifiable spatial area. Thus, the receiving apparatus, so to speak, only listens into one direction such that only one object located in this spatial area may affect the transmitted signals and therefore also the received signals.

Thus, a selective reception of the signals takes place.

In a configuration, the transmitting apparatus sends the signals out into selected spatial areas, and the receiving apparatus receives signals only from selected spatial areas. By selectively transmitting and receiving, the space between the two positioning apparatuses is sampled in portions, so to speak.

In a configuration, the at least one receiving apparatus allows receiving from one of several specifiable spatial areas. In this configuration, the receiving apparatus scans, so to speak, the space around itself and receives signals only from the selected spatial areas.

According to a configuration, the positioning apparatus comprises a holding apparatus and several receiving apparatuses are located at different positions of the holding apparatus. In a configuration, the holding apparatus is a wall element in or at which the receiving apparatuses are located.

According to a configuration, the transmitting apparatus is configured to emit signals with different frequencies. In a configuration, the different frequencies serve for determining the materials of the object.

According to a configuration, the transmitting apparatus is configured as a multibeam antenna. In this configuration, the transmitting apparatus is a multibeam antenna. Thus, there are several directional characteristics of the transmitting apparatus that are each characterized by a beam, or a main beam. This accompanied by the fact that the transmitting apparatus emits the signals mainly in the direction of the selected or switched beams.

In a configuration, the receiving apparatus is also a multibeam antenna having different selectable beams. In a configuration, this antenna type allows the receiving apparatus to receive signals selectively from the spatial areas that are associated with the beams. In a further configuration, the signals are alternately received with different beams.

According to a configuration, the transmitting apparatus comprises several different directional characteristics and the directional characteristics each refer to a quantity of spatially different transmission characteristics (or transmission sensitivities). Thus, the directional characteristics signify that the signals are sent out into different spatial areas to a varying degree.

The above-described configurations of the positioning apparatus according to the sixth variation, or, possibly, also according to a combination of the variations allow to determine information that, according to the invention, is represented via the representation apparatus of the apparatus, or made accessible to the user. However, further positioning apparatuses may also be combined with the apparatus according to the invention.

Furthermore, the invention solves the object through a method for representing user information.

The method includes at least the following steps: signals of a transmitter are received with at least one directional characteristic referring to spatially different receive sensitivities.

Alternatively or additionally, signals are transmitted into a scene with at least one directional characteristic and signals of at least one transmitter are received from the scene. The received signals are processed with respect to the scene, and representation data is determined. The representation data is represented—particularly for the user.

Processing the received signals includes, e.g., evaluating or further processing the signals using the digitalization of the signals or calculating measurement quantities of the signals with data with respect to the associated directional characteristic, respectively.

Accordingly, above discussions and configurations with respect to the apparatus also apply to the method according to the invention. Vice versa, method steps may also be realized by configurations of the apparatus so that the discussions with respect to the method also apply to the apparatus. In particular, there is a multitude of possibilities to configure and to further develop the apparatus according to the invention and the method according to the invention. On the one hand, reference is made to the patent claims, on the other hand, to the following descriptions of embodiments in combination with figures.

BRIEF DESCRIPTION OF THE DRAWINGS

Embodiments of the present invention will be detailed subsequently referring to the appended drawings, in which:

FIG. 39 shows an example for a matrix with determined path attenuations $ATTEN_{i,j}$, FIG. 40 shows an example for the discretized path attenuations of FIG. 39, FIG. 42 shows the positioning apparatus of FIG. 41 with a person having a shopping trolley as an object.

DETAILED DESCRIPTION OF THE INVENTION

Figure 1:
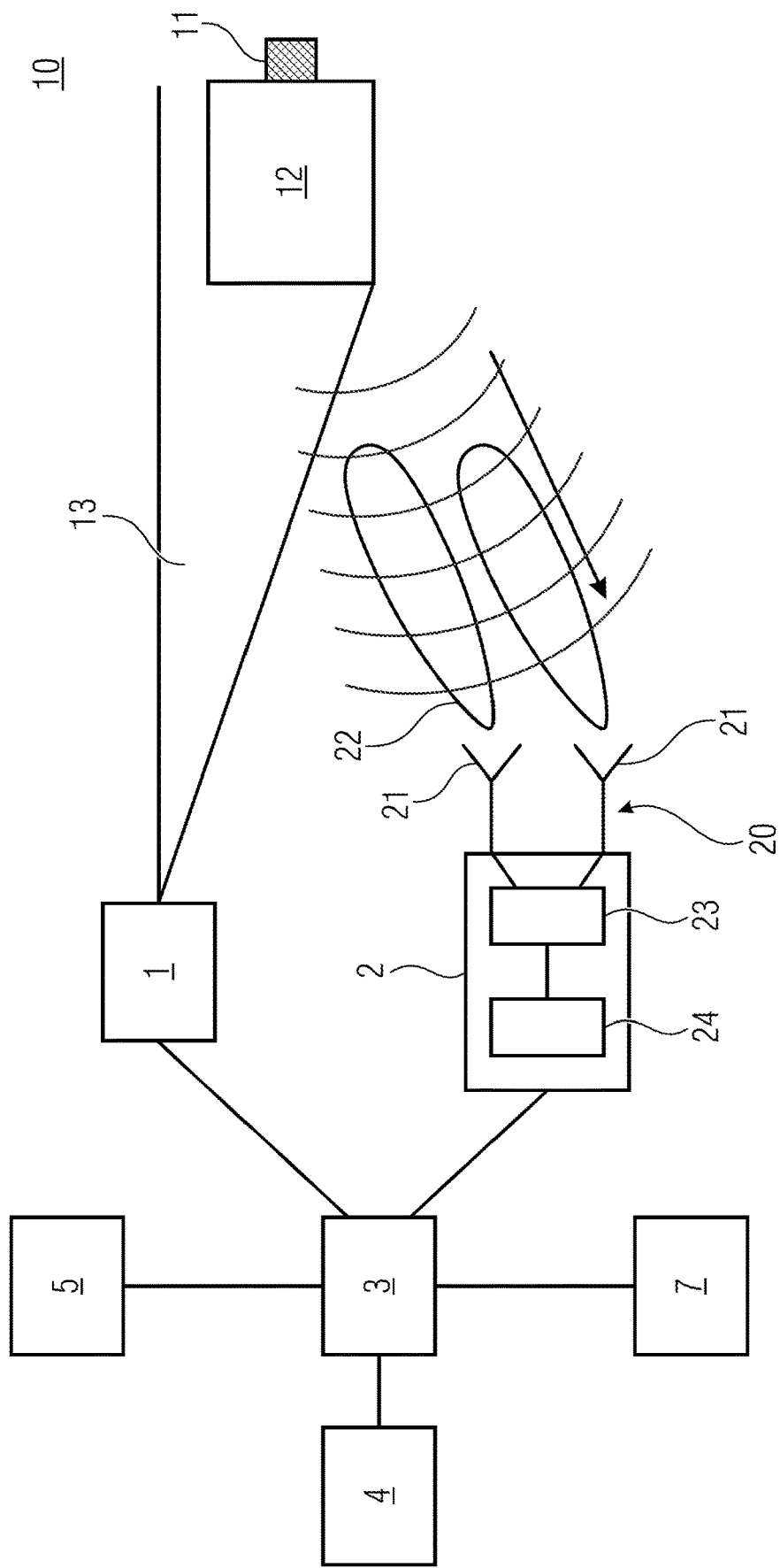
FIG. 1 shows a schematic structure of an inventive apparatus as a block diagram.

FIG. 1 shows a schematic structure of an example of an apparatus for representing user information.

An optical capturing apparatus 1, e.g., configured as a camera, detects a visual image of a scene 10. An object 12, e.g., a carton, having a transmitter 11 attached thereto is located in the scene 10. Here, the transmitter 11 is an RFID transponder that reacts with a response signal to a request signal of an RFID reader.

In a configuration, the transmitter 11 may be switched through an activation signal from a passive state into an active state, wherein the implementation of the transmitter 11 is according to the unexamined application DE 10 2009 047 199 A1.

In a further configuration, it is an active transmitter that sends out signals on its own. For example, a communication with a radio unit is initiated via these signals so that, through signals sent out by the radio unit, the transmitter may obtain energy for the further communication.

In the exemplary block diagram, it can be recognized that the transmitter 11 is located on the side of the object 12 facing away from the capturing apparatus 1 so that the transmitter 11 would not be recognizable for purely visual applications.

Thus, the positioning apparatus 2 is provided to receive the radio-frequency electromagnetic signals of the transmitter 11 (here, these are the response signals of the RFID transmitter; in an alternative configuration (not illustrated), the same are reflected radar signals).

The positioning apparatus 2 comprises an antenna apparatus 20 here having two antenna elements 21—e.g., in the form of patch antennas or dipole antennas—and a feed network 23 connected to the antenna elements 21 and providing different directional characteristics 22 with which the signals of the transmitter 11 are received. Here, the directional characteristics 22 refer to spatially different receive sensitivities of the antenna apparatus 20.

Here, as an example, the antenna apparatus 20 is a multibeam antenna. Thus, the directional characteristics 22 are each characterized by a beam having a main direction or a main axis.

In the illustrated configuration, the feed network 23 allows operating with two variations: in one variation, only one directional characteristic 22 is respectively used for receiving signals. Successively, signals are received with different and therefore active, or switched, directional characteristics 22. In an alternative configuration, signals are simultaneously received with several directional characteristics 22 and, through the feed network 23—e.g., configured as Butler matrix or alternatively as eigenmode network, the individual receive signals respectively associated to the directional characteristics 22 may be obtained.

The signal processing apparatus 24 processes the received signals and therefore provides the same in digital form for further processing.

In the illustrated configuration, the signal processing apparatus 24 determines the physical quantities such as the magnitude of the field strength and/or its phase from the received signals to be able to completely describe the signals. Both values of the received signals in combination with data about the respectively associated directional characteristic, i.e., used for the reception, allow determining weighted receive values. The data about the directional characteristics are used in the form of matrices, for example.

Then, statements about the position of the transmitter 11 may be determined from all weighted receive values: e.g., if signals are received with two directional characteristics only from the direction of the respectively associated beam, the transmitter 11 is located in the area in which both beams overlap.

In a configuration, the weighted receive values are processed with each other. Thus, weighted receive values present in the form of matrices are added, for example. The superimposition—e.g., of all or only of groups—of the weighted receive values may subsequently be graphically represented, for example.

In an alternative configuration, the signal processing apparatus 24 is configured as RFID reader and therefore generates only one value for the field strength (the so-called RSSI, "receive signal strength indicator") for the received signals, respectively. In this variation, with the different directional characteristics and the respectively connected amplitude values, a kind of receive vector is determined for the received signals. In a configuration, the unit vectors of this vector result from the axes of the beams of the directional characteristics.

By having the directional characteristics 22 associated with different spatial areas, the position of the transmitter 11 or at least the direction in which the transmitter 11 is located relative to the antenna apparatus 20 may be inferred from the received signals. Further realizations of the positioning apparatus 2 are described based on a few following illustrations. Here, processing the received signals—or their digital representation—and the data about the directional characteristics takes place in the processing apparatus 3.

The processing apparatus 3 also obtains the visual images of the capturing apparatus 1.

Based on the orientation of the capturing apparatus 1 and the orientation of the positioning apparatus 2, or the directional characteristics 22 of the antenna apparatus 20 with respect to each other and to the position of the scene 10, the data is combined and represented via the representation apparatus 4.

In an alternative configuration, the processing apparatus 3 is directly integrated into the representation apparatus 4.

Furthermore, for representing the data, an external data base 5 providing the additional data or information about the transmitter 11 is accessed. In the illustrated example, this builds upon the fact that the transmitter 11 also sends out data that enables identification. This data or the indication that such data exists is then additionally displayed during the representation via the representation apparatus 4. For example, the representation apparatus 4 is a screen or a smart phone.

Furthermore, a control apparatus 7 is present which allows selecting an area 13 of the scene 10 that is captured by the capturing apparatus 1. Here, the control apparatus 7 is connected to the processing apparatus 3 so that the selected area 13 is accordingly considered when superimposed by the data determined via the positioning apparatus 2.

Alternatively or additionally, when selecting the area 13, the area 13 is inspected in the field of view of the antenna apparatus 20 with an increased resolution by the directional characteristics.

In a configuration, a position sensor is provided for aligning the visual images and the measurement data, or the representation data of the positioning apparatus 2. In particular, this applies in the case in which the position, or orientation, of the capturing apparatus 1 or the positioning apparatus 2 is not static but variable.

In a configuration (not illustrated), the capturing apparatus 1, e.g., in the form of a camera unit, is fixed to the antenna apparatus 20, and, in a configuration, covers the field of view of the antenna apparatus 20. In an alternative configuration (not illustrated), the capturing apparatus 1 is integrated into the representation apparatus 4. In this case, the field of view of the representation apparatus 4 is aligned with the field of view of the antenna apparatus 20, or the positioning apparatus 2. In a configuration, this takes place via the evaluation of position sensors, in part present in tablets or smart phones.

Figure 2:
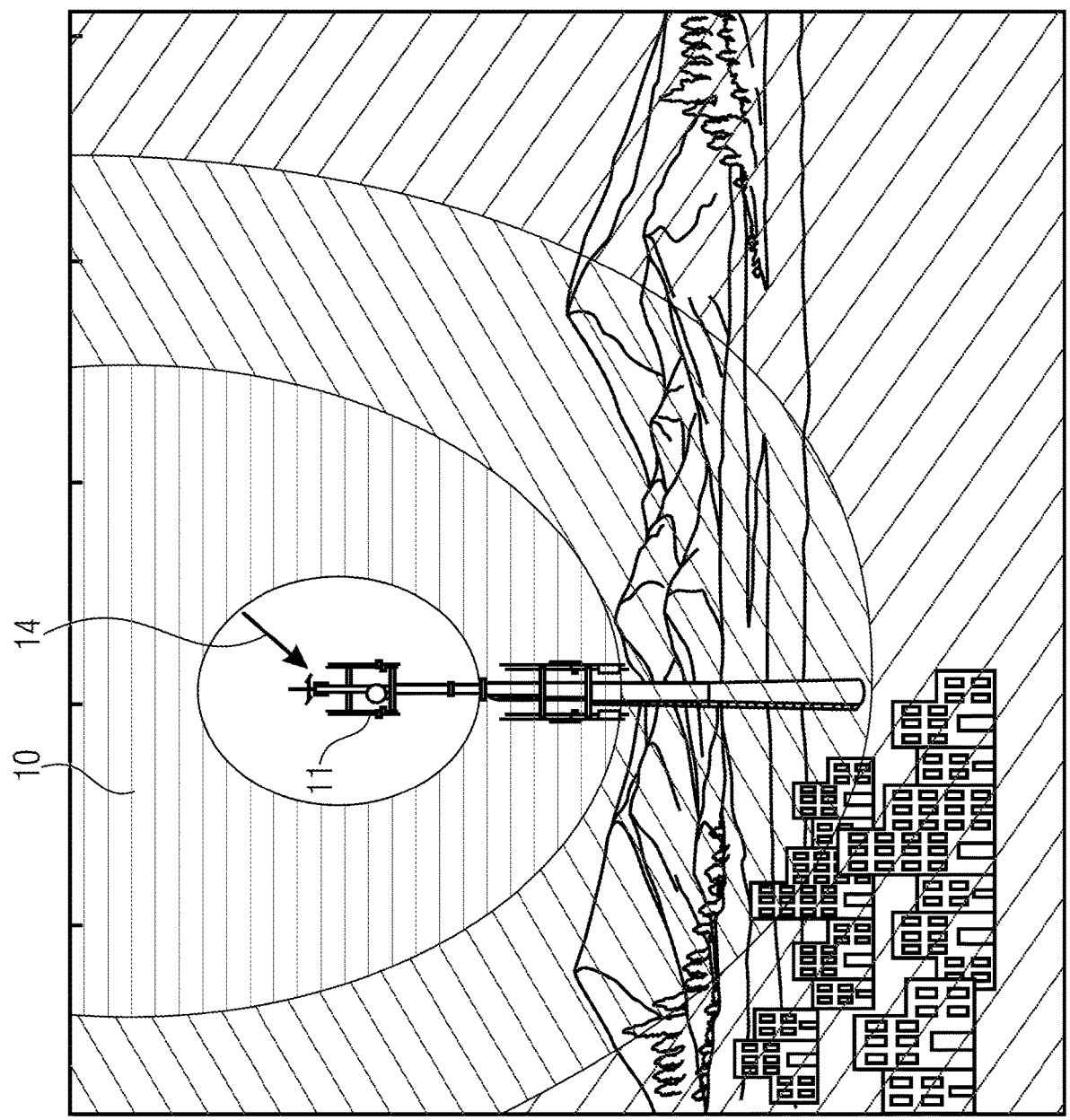
FIG. 2 shows a schematic clarification of a visualization by the inventive apparatus.

FIG. 2 schematically shows a variation of a visualization of the received signals, or the representation data determined therefrom. Here, the treated data is placed over the visual image, i.e., the camera image. Instead of using a color code, three areas around a radio tower functioning as the transmitter 11 are hatched in a different manner. Thus, this is an embodiment to visualize signals with visually invisible frequencies for a viewer.

The hatchings indicate areas with different field strengths of the received signals. In a variation, the measurement quantities of the received signals (amplitude and phase) are processed with the data about the respectively used directional characteristics—i.e., the spatial distribution of the receive sensitivities. This results in weighted receive data, e.g., present in the form of a matrix, respectively. If the signals received with different directional characteristics are processed together, e.g., by adding up the weighted receive data, this data about the transmitting characteristics of the transmitter 11 results. Here, this representation data is superimposed onto the visual image of the scene 10.

Additionally, an optical element 14 in the form of an arrow is added, directing the attention to the transmitter 11.

In a configuration (not illustrated herein), several representation apparatuses are supplied with the representation data of a positioning apparatus 2.

In a further implementation (not illustrated herein), a traffic participant is provided with a transmitter so that his/her position is represented to a further participant. For example, the transmitter located at a school bag is displayed in the field of view of a driver of a vehicle.

Figure 3:
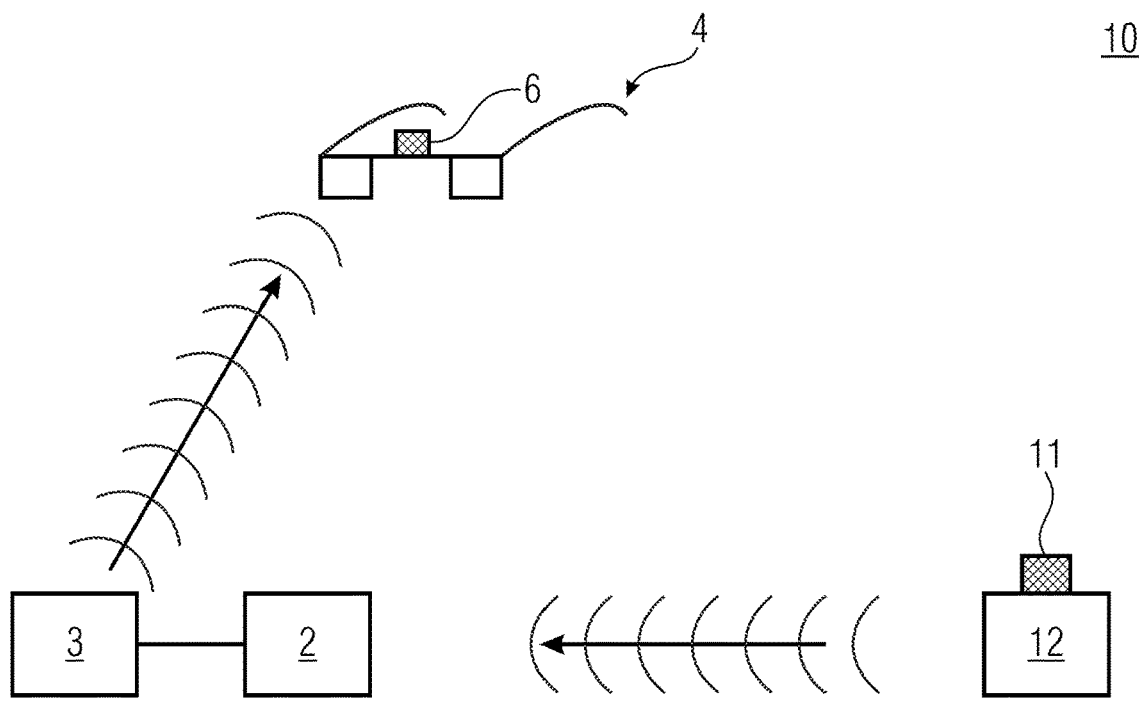
FIG. 3 shows a schematic illustration of a further configuration of the inventive apparatus.

FIG. 3 shows an alternative configuration in which the representation apparatus 4 is configured as a pair of glasses. Thus, the capturing apparatus 1 is omitted.

A position sensor 6 that allows determining the orientation of the representation apparatus 4 relative to the scene 10 is located at the representation apparatus 4 so that the corresponding projection of the representation data is carried out.

The positioning apparatus 2 receives signals from the transmitter 11 and is connected to the processing apparatus 3 that, communicates the determined information to the representation apparatus 4 according to the orientation of the representation apparatus 4, e.g., via radio communication or via the Ethernet (WLAN).

In the example shown, since the pair of glasses 4 is facing away from the transmitter 11, a representation via the transmitter 11 would accordingly not occur or only a lateral indication that the transmitter 11 is located outside of the field of view, or in which direction it is located relative to the representation apparatus 4.

Figure 4:
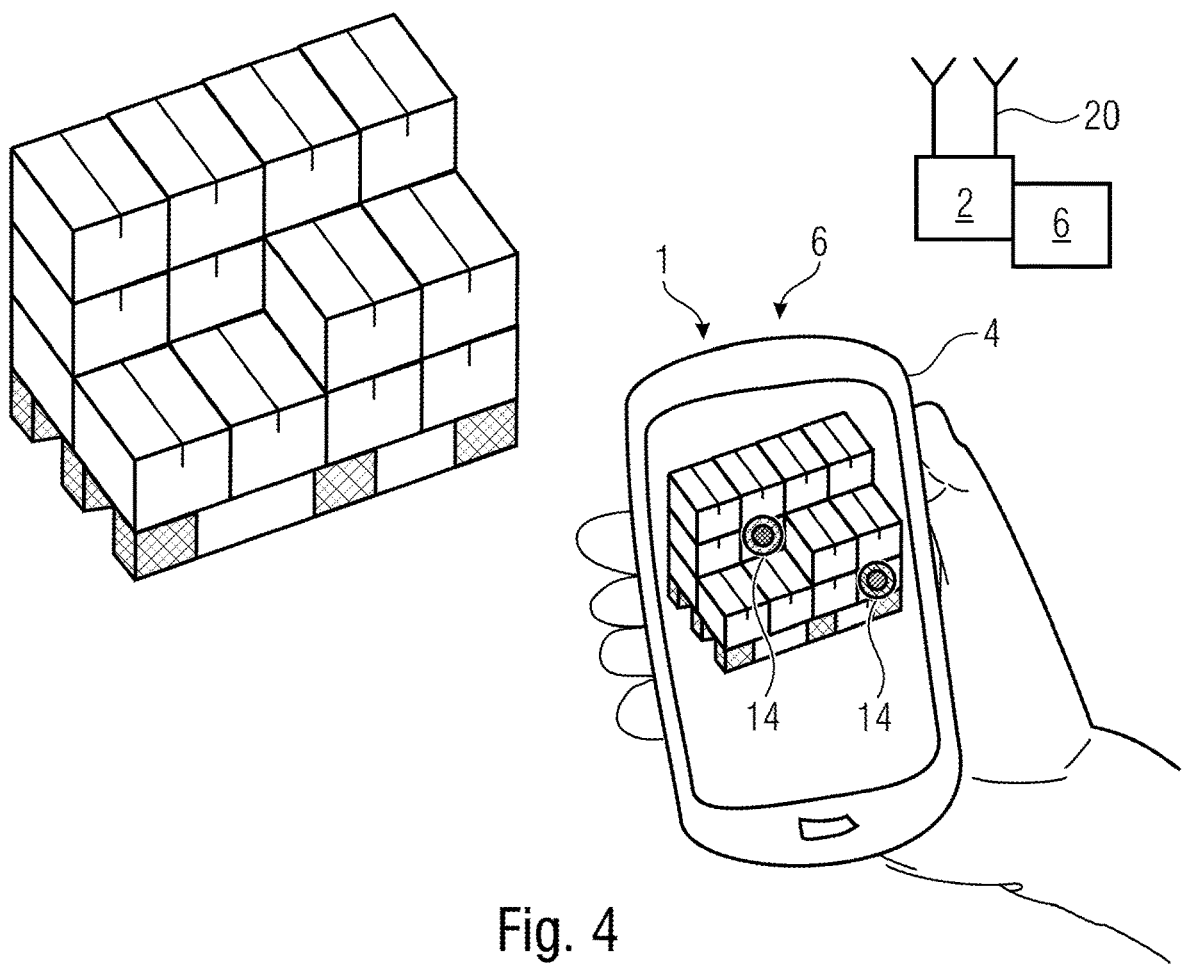
FIG. 4 shows an illustration of an alternative configuration of part of an inventive apparatus.

FIG. 4 shows an example in which optical elements 14 (so-called icons) for the found transmitters that are supposedly located in the represented cartons are indicated on a representation apparatus 4. Thus, the representation data is superimposed onto the visual image.

In this case, the capturing apparatus 1 is the camera present in the smartphone.

Representing the additional information builds upon the fact that the transmitters allow identification through their transmitted signals. For example, this occurs with RFID tags that send out identification data upon a request signal. For this configuration, e.g., the wakeup or request signal originates from the positioning apparatus 2.

In a further configuration, the representation of the transmitters changes, e.g., depending on a distance of the representation unit 4, or of the viewer, whose hand is illustrated herein. For example, this takes place through decreasing or increasing circles or color changes during representation of the determined information. Thus, in a configuration, the representation takes place in a dynamic manner.

For example, if a transmitter, or a special RFID tag, is searched for, its position is separately illustrated with the optical element. If the position is stored in a database, displaying may also take place if the RFID tag is not located in the receive range of the antenna apparatus.

In the illustrated configuration, the capturing apparatus 1, i.e., the camera unit of the smart phone, is offset from the positioning apparatus 2, or in particular from its antenna apparatus 20. The position sensors 6 of the positioning apparatus 2, which uses the same to inform about the position and orientation of the antenna apparatus 20, and of the representation apparatus 4 allow converting the representation data to represent the correct position of the transmitter depending on the position of the viewer.

In an application, interfering transmitters are detected in the field of view. Through the visualization, a user may detect the position of a radio transmitter at an unexpected location. For example, signals in the GPS/Galileo band may be detected due to their position (not on a satellite position) and field strength (much stronger than the expected signal).

In a further configuration, aircrafts or drones (an example of UAVs, i.e., unmanned, uninhabited or unpiloted aerial vehicles) may be localized since they usually send out a multitude of signals. The localization in the field of view is of interest for air traffic controllers, ground staff at the airfield, drone pilots or model airplane pilots.

In the following, different configurations of the positioning apparatus are described which, depending on the configuration, may be used as part of the above-described apparatus for representing user information.

Figure 5:
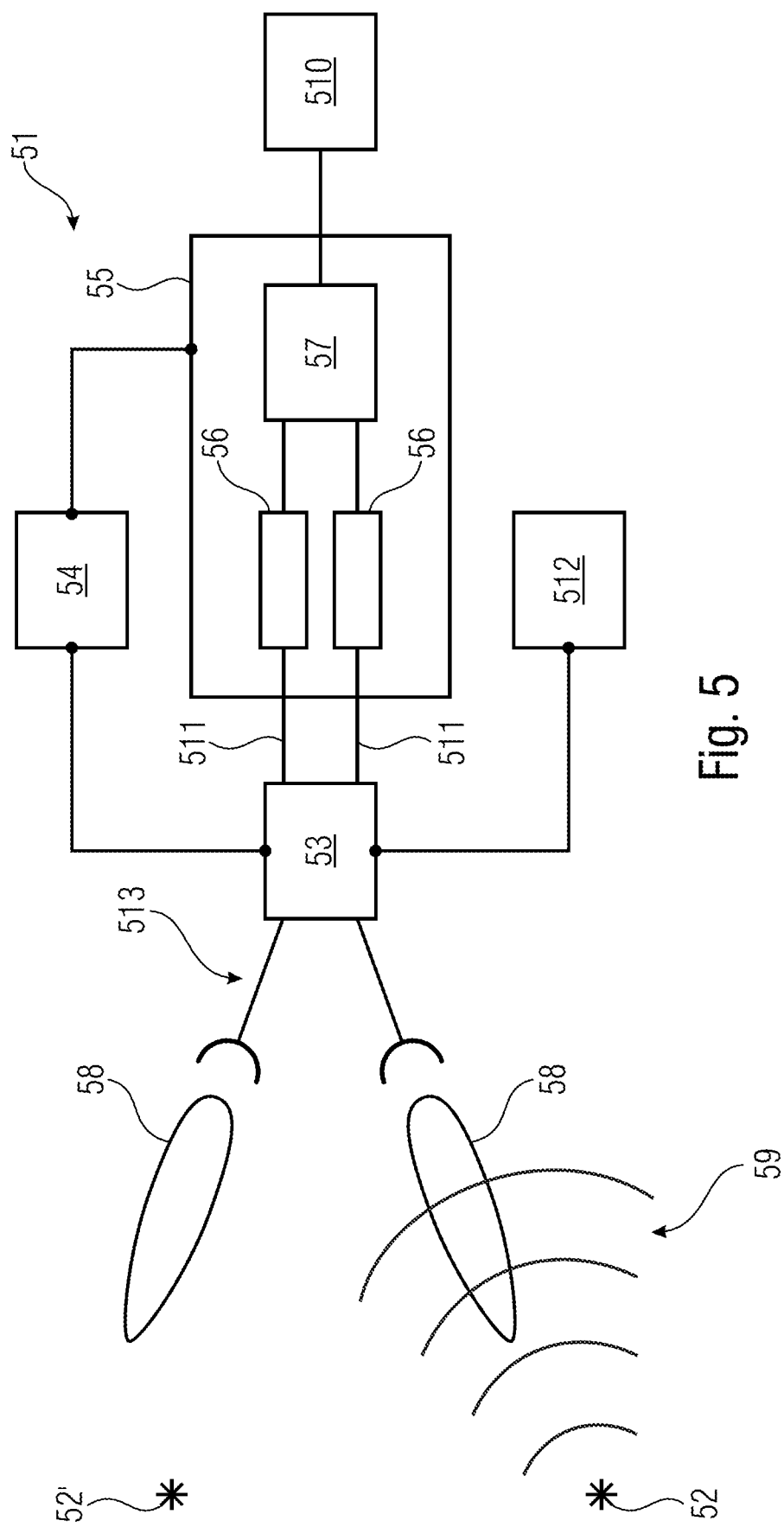
FIG. 5 shows a schematic illustration of a first variation of a positioning apparatus.
Figure 6:
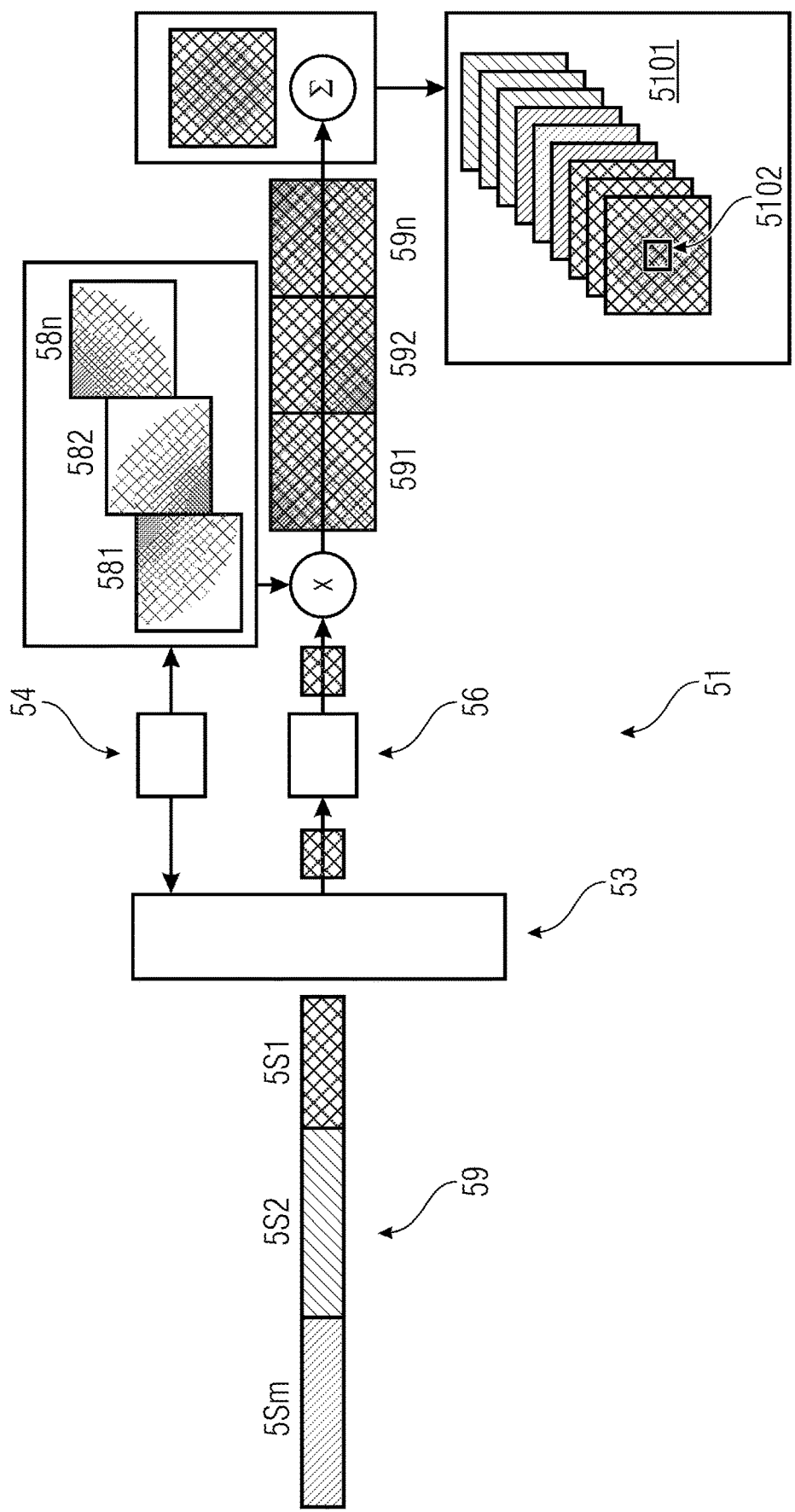
FIG. 6 shows a schematic diagram for clarifying the method with a configuration of the positioning apparatus of FIG. 5.
Figure 7:
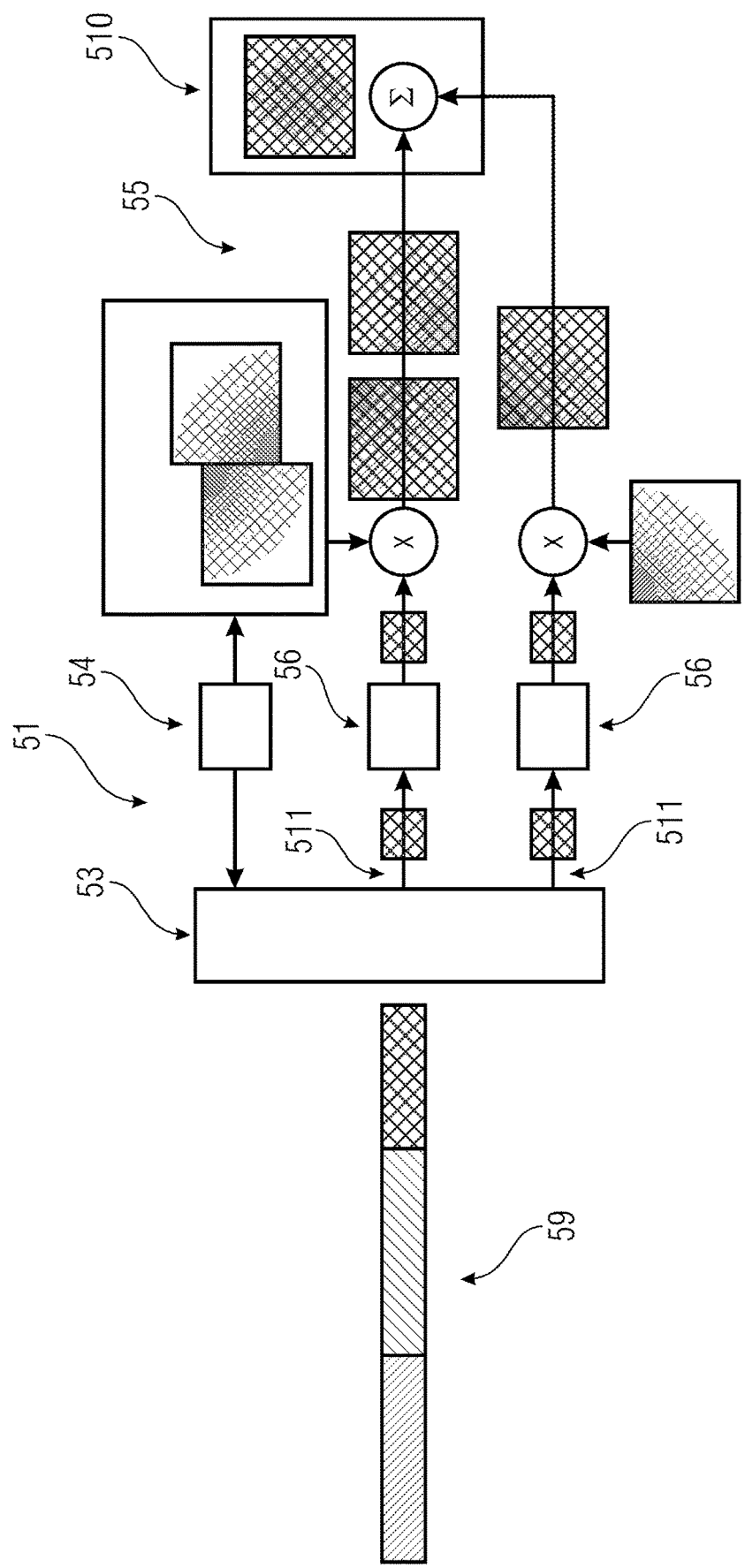
FIG. 7 shows a schematic diagram of a further configuration of the first variation of the positioning apparatus.

In FIGS. 5-7, configurations of a first variation of the positioning apparatus for determining data are shown that are represented via the above-mentioned apparatus.

FIG. 5 shows an application of a positioning apparatus 51 for determining information about a position of a transmitter 52, 52'. The information, or data, obtained therewith is then represented with the above-described apparatus.

In the example of FIG. 5, the positions of two different transmitters 52, 52' (e.g., RFID transponder or radio transmitter in general) are determined, i.e., localized. For this, the positioning apparatus 51 comprises an antenna apparatus 53 having several antenna elements 513, two of which are exemplarily illustrated. Controlling the antenna apparatus 53 takes place via a regulating apparatus 54 also connected to a data processing apparatus 55.

Here, two ADCs 56 converting the signals received by the antenna apparatus 53 into a digital form and each being associated with a receive path are located in the data processing apparatus 55. In an alternative configuration (not illustrated), the ADCs form part of the antenna apparatus 53 (which may alternatively also be referred to as receiver) so that the data processing apparatus 55 directly receives the digital signals. Then, the digital signals are processed by a computing apparatus 57.

The antenna apparatus 53 comprises several specific directional characteristics 58. The regulating apparatus 54 activates the directional characteristic 58 for receiving the signals 59 originating from the transmitters 52, 52' (e.g., by active generation or by reflection).

The antenna apparatus 53 comprises signal outputs 511, each being associated with a specific directional characteristic 58. Furthermore, the antenna apparatus 53 is configured such that the signal received with the respectively associated directional characteristic 58 is output at each signal output 511. Here, this takes place via a Butler matrix, for example. In an alternative configuration, an eigenmode network is generated.

Thus, in a configuration, the data processing apparatus 55 simultaneously receives the received signals from several directional characteristics, i.e., from several signal outputs 511.

In an alternative configuration, e.g., wherein only one receive path is needed, the data processing apparatus 55 only receives the signal received with one directional characteristic, wherein, in a configuration, switching between the directional characteristics occurs according to a specified scheme.

In a configuration, switching between the directional characteristics takes place according to a kind of intermediate evaluation. For example, a direction from which the received signals originate to a higher degree is determined so that, in the following measurements, the directional characteristics referring to this determined direction are advantageous.

The data processing apparatus 55 (e.g., realized as DSP or FPGA and possibly part of the antenna apparatus 53) evaluates the received signals such that it accesses the data describing the directional characteristics. In particular, the directional characteristics consist of the fact that the antenna apparatus 53 comprises a respectively associated receive sensitivity. Depending on the directional characteristic, there are spatially distributed areas having a higher, or lower, sensitivity for receiving signals. In a configuration, the data about the sensitivities, e.g., determined by measurements and/or theoretical observations, are stored for further processing such that they may be interpreted as matrices. In a configuration, the directional characteristics are each particularly characterized by a beam specifying the main direction.

For example, the data processing apparatus 55 processes the digitalized received signals and the directional characteristics with each other by multiplying the data accordingly, i.e., by mapping the received signals onto the directional characteristics and therefore obtaining weighted receive values. With the sensitivities of the directional characteristics gathered as matrices, one matrix with the weighted receive values results per directional characteristic. In this case, e.g., the multiplication takes place via accessing previously stored tables or value pairs. Alternatively, in a configuration, signals are received for individual directional characteristics at different points in time. This allows improving the measurement accuracy in motionless transmitters and possibly also allows detecting a movement of a transmitter.

In order to determine the positions of the transmitters 52, 52', the weighted receive values are processed with each other. Thus, in a configuration, the matrices and the weighted receive values are added. In a further configuration, at least two groups (or subgroups) of the weighted receive values are respectively added up, and, subsequently, the difference between the two sum matrices is formed. With this, e.g., the signals of the two transmitters 52, 52' located at different positions may be separated from each other. For the mutual processing, the weighted receive values refer at least partially to the same spatial areas around the positioning apparatus 51.

In a configuration, the weighted receive values are represented using a specifiable color scale (or with a scale of gray tones as in FIG. 7) onto a visualization apparatus 510, e.g., a screen, a smart phone, a tablet, a handheld or a pair of glasses for virtual reality. For further examples, see the previous discussions. Thus, this corresponds to the representation apparatus 4 of the configuration illustrated in FIG. 1.

The method illustrated in FIGS. 5-7 for determining information about a position of at least one transmitter therefore includes at least the following steps:

A directional characteristic of the antenna apparatus which refers to a certain distribution of the spatial sensitivity of the antenna apparatus is activated. The respectively associated distribution of the sensitivity is known, e.g., by previous calibration measurements or by theoretical knowledge about the antenna apparatus and its characteristics. Here, activating a directional characteristic signifies that the signals received via the activated directional characteristic are available to an evaluation, or further processing, or are registered, for example.

With the activated directional characteristic, a signal of the transmitter is received and is processed with the data about the directional characteristic so that weighted receive values result. In a configuration, the sensitivity distribution is described by a matrix that is multiplied with the data of the received signal.

At least one signal is received and evaluated with respect to the different directional characteristics, respectively. Finally, the information about the position of at least one transmitter is determined from the resulting weighted receive values. Depending on the configuration, the information refers to, e.g., a direction or a position relative to the positioning apparatus, or relative to the antenna apparatus. Possibly, the information also refers to the relative position of two transmitters towards each other or to the change in position etc.

In the illustrated example, the positioning apparatus 51 comprises a signal source 512 serving for generating excitation signals, query signals or so-called request signals, for example. The signals of the signal source 512 are emitted with a selected directional characteristic towards the transmitters 52, 52'. In a configuration, the respectively activated characteristic results from the fact that several directional characteristics used for receiving the signal and associated with the antenna elements are mutually activated and therefore superimposed.

Emitting the excitation signals also allows measuring passive transmitters, or their positions, by activating them through the excitation signal to emit signals, or in that they obtain the energy needed therefore. In particular, the latter refers to the case in which the transmitters are RFID tags. In a further configuration, the transmitters emit the signals via reflection. For example, this is the case in a radar application. This means that the signal source 512 generates radar signals and that the transmitters 52, 52' act as reflectors.

Optionally, a data storage and/or an regulating unit, (e.g., a server PC) are present. Therefore, a server and, possibly, further clients may affect the data processing apparatus 55 via control data.

FIG. 6 highlights the principle of information determination based on a configuration, in particular with respect to the evaluation.

A transmitter (not illustrated herein) transmits signals 5S1, 5S2 . . . 5Sm, which are interpreted as symbols herein. The signals 5S1, 5S2 . . . 5Sm are received by a multibeam antenna 53. The regulating unit 54 activates the beams of the multibeam antenna 53, or activates the different directional characteristics, according to a specified pattern. In a configuration, the pattern for switching between the directional characteristics takes place randomly. In another configuration, excellent directions are provided so that the beams pointing in these excellent directions are activated.

The signals 59 from the controlled beam are demodulated and digitalized by a receive path.

The digitalized signals are respectively multiplied with the directional characteristic 581, 582 . . . 58n associated with the beams selected by the regulating unit 54 (cf. the multiplication symbol and the upper box with three directional characteristics). Thus, a matrix with weighted receive values 591, 592 . . . , 59n results, respectively.

The matrices 591, 592, . . . 59n are added up (illustrated by a sum symbol Z) and are stored in a storage 5101, for example.

In an alternative configuration, a subquantity (or group) of the matrices is added up. Furthermore, different subquantities of the matrices may be formed and added up. This allows detecting multi-paths of the signals or detecting several radio signals, or transmitters.

Thus, in a configuration, a subquantity U1 is formed from the matrices 591 and 592. A further subquantity U2 is formed from the matrices 591, 592 and 593 etc. The comparison between the added up subquantities may give some indication on the number of the radio transmitter, or radio transponders and the presences of multi-paths. The subquantities of groups may overlap or may not overlap.

In the illustrated example, the desired signal 5102 is taken from the stored matrices.

Alternatively, at least one matrix of the weighted received values is given to a visualization unit as a receive value matrix. A visual direction determination takes place via a colorization of the matrix values. Optionally, the maximum of the matrix may also be searched for and then marked. Optionally, a desired field of the matrix may be digitally further processed and may be given to a further processing unit via a digital-to-analog converter.

FIG. 7 shows a parallel processing of several receive paths—i.e., paths for receiving signals from the antenna to the evaluation apparatus—when using a multibeam antenna 53 with several outputs 511.

Here, parallel processing several receive paths is possible by using a multibeam antenna 53 with several (here two) outputs 511 and advantageously several receive paths.

If several outputs 511 of the multibeam antenna 53 and therefore several receive paths are available, several paths may be processed in the data processing apparatus 55. In particular, this refers to the case in which the multibeam antenna 53, even if only one directional characteristic is activated, may also output the signals received with the other directional characteristics. For this, e.g., the Butler matrix is realized in the antenna apparatus 53.

In a configuration, the evaluation is limited to the multiplication of the received signals with the data of the respective directional characteristic. In a configuration, only these weighted receive values are added up so that there is hardly any processing demand in this case. In particular, no complex data is involved.

In a configuration that further reduces the processing demand, the amount of data to be processed is reduced by evaluating, from the data present in the form of matrices, only selected partial areas corresponding to the desired directions.

In a configuration, the antenna apparatus comprises several individual antennas that are connected to the receive unit via a switching matrix.

FIGS. 8 to 11 show configurations of a second variation the positioning apparatus.

Figure 8:
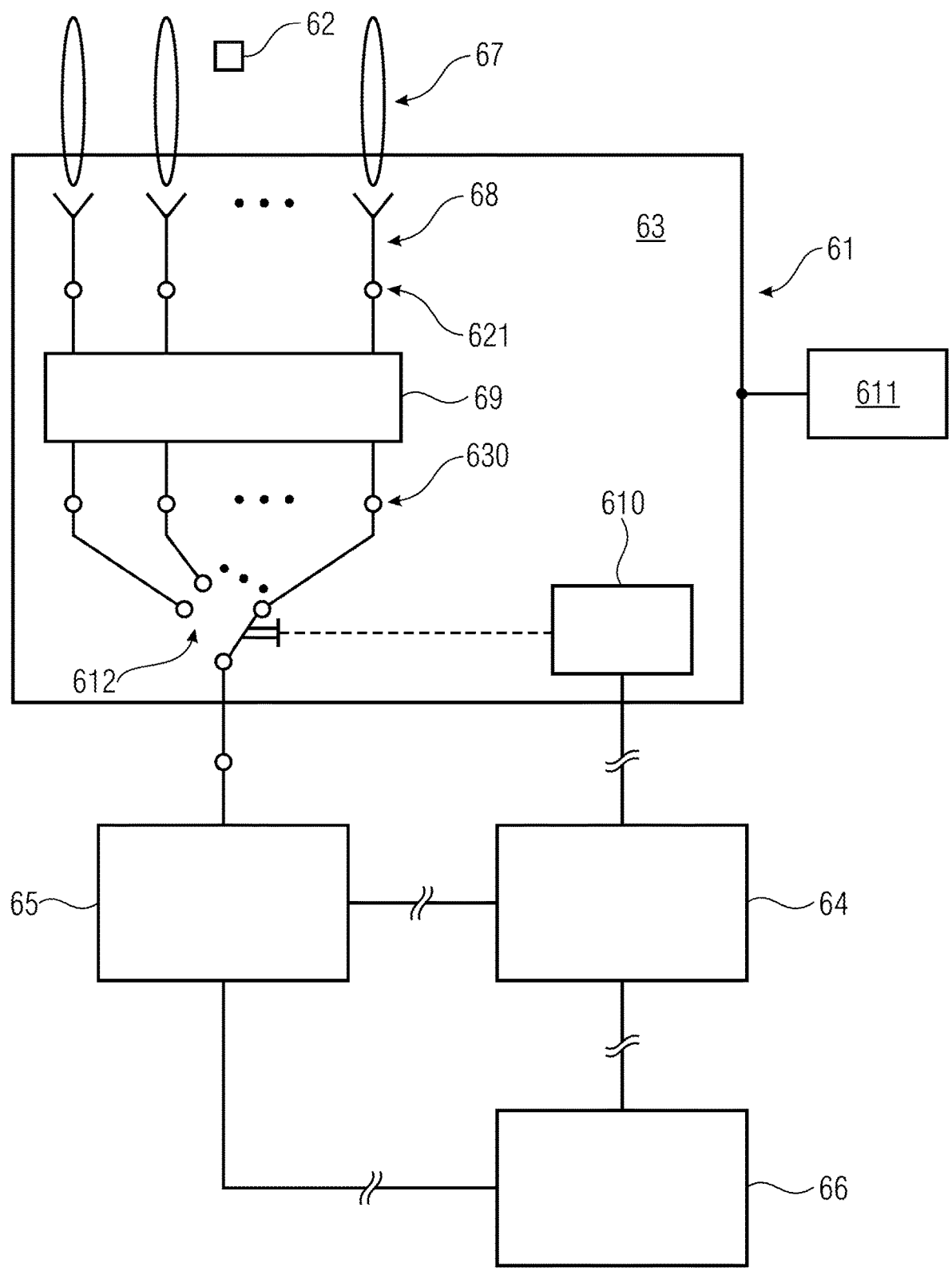
FIG. 8 shows a schematic illustration of a second variation of a positioning apparatus.

FIG. 8 shows an application of the positioning apparatus 61 for determining the position of a transmitter 62.

For this purpose, the positioning apparatus 61 comprises an antenna apparatus 63 comprising several antenna elements 68, a control apparatus 64, a signal processing apparatus 65 as well as a data processing apparatus 66. Here, the antenna apparatus 63 is a multibeam antenna.

The control apparatus 64 acts on the antenna apparatus 63 in order to specify which directional characteristic 67 is to be switched so that the signal received via this directional characteristic is supplied to the signal processing apparatus 65. The signals received by the antenna apparatus 63 are output associated to the individual directional characteristic 67 by the feed network 69. Here, a directional characteristic 67 and one of the n antenna inputs 621 (an alternative term is output port) of the feed network 69 is associated with each of the n antenna elements 68 of the antenna apparatus 63. The m signal inputs 620 of the feed network 69 are each individually connected via the illustrated switch 612 to the signal processing apparatus 65 so that only the received signal of this individual directional characteristic is further processed. With this, a certain directional characteristic $\vec{C}_k$ may be selected, or switched.

Alternatively, several signal processing apparatus 65 (not illustrated herein) are present, which each evaluate a signal received with a directional characteristic. Thus, such a configuration allows a parallel evaluation of signals connected to several directional characteristics. In particular, according to this configuration, the feed network 69 is implemented as a Butler matrix, for example. Or in general: the feed network 69 provides for each directional characteristic with which the antenna apparatus 63 has received signals the respectively corresponding separated signals.

Thus, in this configuration, the feed network 69 outputs at the m signal inputs 620 the signals received via an associated directional characteristic 67, respectively. The n antenna elements 68 are connected to n antenna inputs 621 of the feed network 69.

However, in the illustrated configuration, a single signal processing apparatus 65 is sufficient, for which one directional characteristic 67 is respectively switched by creating a connection between the signal input 620 of the respectively desired directional characteristic 67 and the signal processing apparatus 65. Thus, the signal inputs 620 serve for outputting the received signals. The characteristic as signal input 620 results from the fact that they serve as inputs for the excitation signals.

The signal processing apparatus 65 determines an amplitude value of the field strength of the signals from the received signals, respectively. Thus, a measure for the signal strength is generated. Simultaneously, only one value results per measurement, or per switched directional characteristic.

In a configuration, in particular, the signal processing apparatus 65 is configured to extract, from the respectively received signal, information that the transmitter applied to the signal originating from the same. For example, the information is measurement values which the transmitter 62 transmit or, e.g., at least an identifier of the transmitter 62.

In particular, the signal processing apparatus 65 reduces the received signals only to the amplitude value so that the complex signals—with magnitude and phase—are reduced to a measurement value. The information transmitted with the signal is to be considered separately from the physical characteristics.

Thus—using a control logic 610 that is part of the antenna apparatus 63—several directional characteristics 67 are switched and the amplitude value is determined, respectively. Based on the determined amplitude values and the knowledge about the sensitivity distribution of the directional characteristics 67, the position of the transmitter 62 is subsequently determined. For this, the data processing apparatus 66 is used, which possibly also comprises a data storage, e.g., storing the data about the directional characteristics.

Through their beam shape, the directional characteristic 67 respectively comprise a main direction. Thus, through the different directional characteristics 67, signals are received from different directions and areas so that the position of the transmitter 62 may ultimately be determined via the amplitude values and the associated distributions of the receive sensitivities of the directional characteristics—i.e., from the data associated with the directional characteristics and describing the same with respect to their receive sensitivities.

Considering an example in which the transmitter 62 is in an area from which signals may only be received with a directional characteristic 67. Thus, a signal may only be received with this directional characteristic, or an amplitude value that does not equal zero results only with this directional characteristic. Thus, the direction in which the transmitter is located relative to the antenna apparatus 63 may be inferred from the amplitude values.

In a configuration, if a quantity for the field strength to be expected by the transmitter 62 is known, the determined amplitude value also allows a statement about the distance to the antenna apparatus, insofar as the receive sensitivity decreases with an increasing distance, for example.

Furthermore, the positioning apparatus 61 comprises a signal source 611 for transmitting excitation signals towards the transmitter 62 using the different directional characteristics. By this, the transmitter 62 may purely passive, e.g., by being an RFID tag that reacts to the excitation signal with a response signal. Or, e.g., it is a radar application in which the signals originating from the transmitter 62 are reflection signals. In a configuration (not illustrated), the signal source 611 forms part of the signal processing apparatus 65, which is a RFID reader, for example.

For the application with a RFID tag as the transmitter 62, the signal processing apparatus 65 is a conventional RFID reader. Such a RFID reader 65 evaluates a signal originating from a RFID tag by extracting the data that the RFID tag transmits, e.g., identification data, and by generating a so-called "received signal strength indicator" (RSSI) value that is an indicator for the field strength of the received signals.

In the following, the technical foundations of the second variation of the positioning apparatus are again described.

A total spatial area in which the transmitter 62 may be located and which is covered by the directional characteristics of the antenna apparatus 63 is assumed.

The total spatial area, or irradiation area $\Omega$, is given as follows:

$$\Omega = \left\{ \vec{\omega} = \begin{pmatrix} \phi \\ \theta \end{pmatrix} : \phi_l \leq \phi \leq \phi_u \ \& \ \theta_l \leq \theta \leq \theta_u \right\} \tag{1}$$

Here, $\varphi$ is the azimuth angle and $\theta$ is the co-elevation angle. The angles have a lower limit $\varphi_l$ and $\theta_l$ and an upper limit $\varphi_u$ and $\theta_u$, respectively. Spatial sectors $\Omega_{i,j}$ with which a directional characteristic $\vec{C}_k$ of the antenna apparatus respectively corresponds are formed, respectively.

In a configuration, the directional characteristics $\vec{C}_k$ are characterized in that they comprise their global maximum in an associated sector. Furthermore, up to a certain specifiable level distance there are no further maximums in any of the remaining sectors below the global maximum.

Sector $\Omega_{i,j}$ is given by the definition:

$$\Omega_{ij} = \left\{ \vec{\omega} = \begin{pmatrix} \phi \\ \theta \end{pmatrix} : \phi_{l,i} \leq \phi \leq \phi_{u,i} \ \& \ \theta_{l,j} \leq \theta \leq \theta_{u,j} \right\} \subset \Omega \tag{2}$$

wherein $i = 1, \ldots \mu$ and $j = 1, \ldots \nu$. (3)

Wherein the following applies:

$$\Omega = \bigcup_{(i)} \bigcup_{(j)} \Omega_{ij} \tag{4}$$

From the connection (3), the number of the sectors of $\mu^*\nu$ may be inferred.

Figure 9:
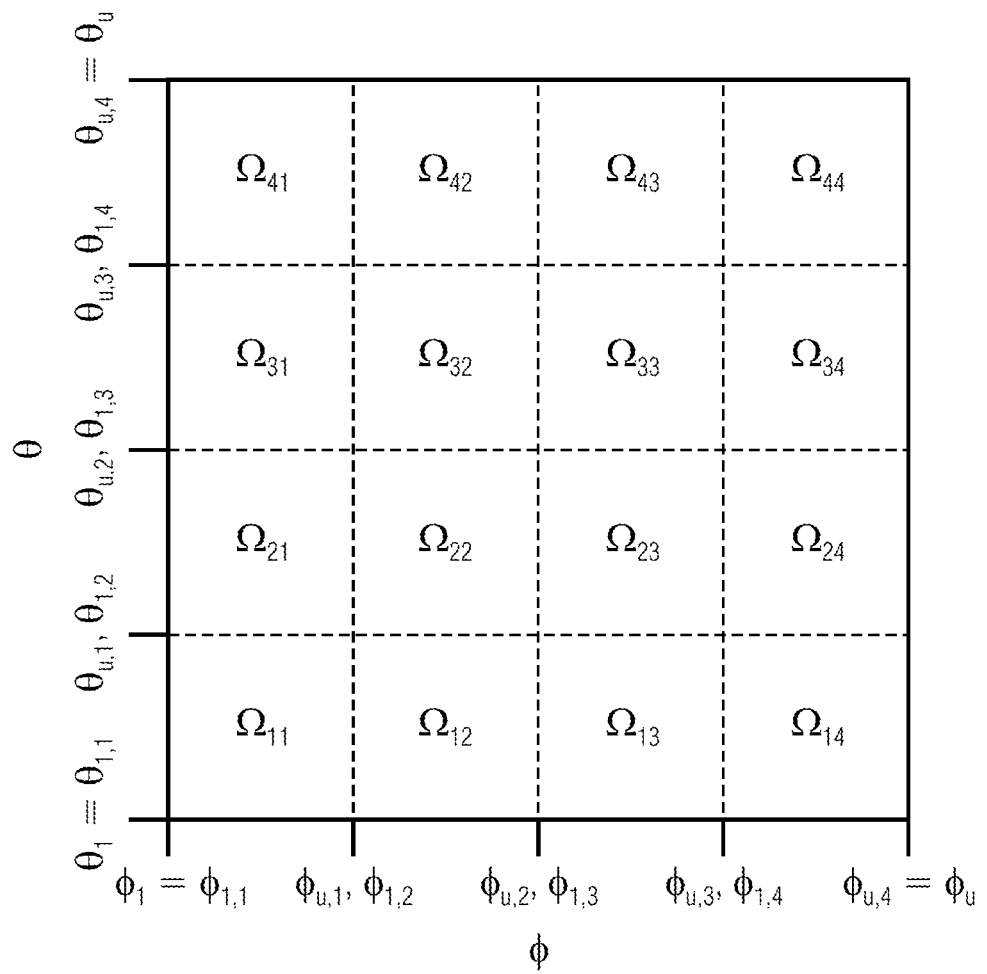
FIG. 9 shows an outline of an irradiation area and its split into 16 sectors for the second variation.

FIG. 9 exemplarily shows the division of the irradiation are $\Omega$ (according to the definition (1)) into 16 sectors $\Omega_{i,j}$ (according to the definition in (2)), wherein $\mu=\nu=4$.

The following directional characteristic is associated with sector $\Omega_{i,j}$:

$$\vec{C}_k = \vec{C}_k(\vec{\omega}) = \vec{C}_k(\phi, \theta) = \begin{pmatrix} C_k^{(co)} \\ C_k^{(cross)} \end{pmatrix} \tag{5}$$

wherein $k = \nu^*(j-1) + i$, with the co-polarized component $C_k^{(co)}$ and the cross-polarized component $C_k^{(cross)}$.

The directional characteristic comprises its global maximum magnitude in the interval $\varphi_{1,i} \leq \varphi \leq \varphi_{u,i}$ and $\theta_{1,j} \leq \theta \leq \theta_{u,j}$.

Here, the association between (i, j) and k in the association (5) may be arbitrarily selected, as far as the following applies: max{k}=μ*v. An alternative association is: k=μ*(i−1)+j.

The directional characteristics are set by a corresponding feed network 69. Each signal input (alternative term: input port) 620 of the feed network 69 corresponds to a certain directional characteristic 67, as is illustrated in FIG. 8 for a multibeam antenna.

In particular, the directional characteristics $\vec{C}_k$ are so-called port directional characteristics. In a configuration, the feed network 69 is an eigenmode network. In a further configuration, the feed network 69 is realized as a Butler matrix whose signal inputs 620 correspond to feed vectors that are orthogonal towards each other. Alternatively, it is a network 69 that generates feed vectors that are arbitrarily orientated towards each other.

Figure 10:
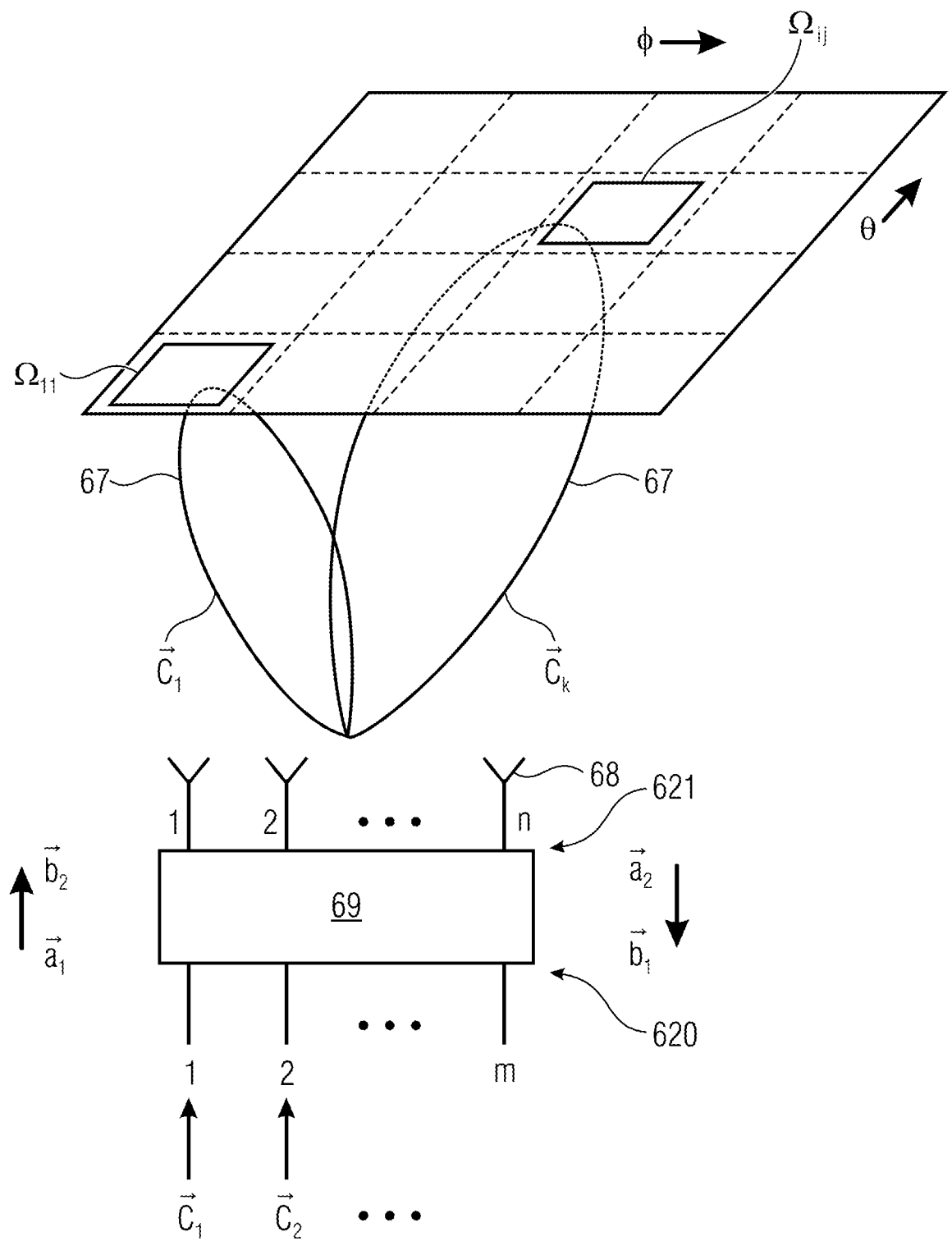
FIG. 10 shows an outline of the association of the directional characteristics with the sectors of the irradiation area of the second variation.

In FIG. 10, each port at the input (i.e., each signal input) 620 of the antenna apparatus 63, or the feed network 69, corresponds to a directional characteristic $\vec{C}_k$ according to equation (5) leading to a radiation maximum in sector $\Omega_{ij}$ (according to equation (2)).

Here, the exemplarily multibeam antenna as antenna apparatus 63 comprises n antenna elements that are connected to the n antenna inputs 621 of the feed network 69 and are excited, or switched, via the m signal inputs 620.

In connection with FIG. 10 (cf. the two vectors on the left side with the arrow pointing upwards), sending out signals via the antenna apparatus, or its antenna elements 68, is described in the following.

$$\vec{a}_{1,k} = \begin{pmatrix} 0 \\ \vdots \\ 1 \\ \vdots \\ 0 \end{pmatrix} \quad (6)$$

is the input vector that only excites the k-th input port 620 (lower level of the feed network 69). With the stray matrix of the feed network 69

$$\tilde{S} = \begin{pmatrix} \tilde{S}_{11} & \tilde{S}_{12} \\ \tilde{S}_{21} & \tilde{S}_{22} \end{pmatrix} \quad (7)$$

the excitation vector at the output of the network (upper level with the antenna elements 68) results in $$\vec{b}_{2,k} = \vec{q}_k = \tilde{S}_{21} \vec{a}_{1,k} \quad (8)$$

with the vector $\vec{q}_k$ causing the directional characteristic $\vec{C}_k$.

If several signal inputs 620 (an alternative term is ports) are simultaneously fed, a weighted superimposition of the directional characteristics associated with the ports 620 occurs. Thus, for emitting the excitation signals, the directional characteristics are combined with each other.

In the example of FIG. 10 (left side) the input vector $\vec{a}_1$ of equation (8) is proportionally divided to the feed vectors $\vec{q}_i$ as the vector of the excitation signal.

The reception case is described based on the vectors located on the right side (connected by the schematic arrow pointing downwards) of FIG. 10, wherein the input vector $\vec{a}_2$ is split into its portions of the individual directional characteristics 67 according to equation (9).

If a signal is received from a certain direction, the vector $\vec{a}_2$ is present at the upper level of the feed network 69.

Since the network 69 is passive in the configuration described herein, $\tilde{S}_{12} = \tilde{S}_{21}^T$ applies.

Thus, $\vec{a}_2$ transforms itself to the lower level of the feed network 69 in the form of $$\vec{b}_1 = \tilde{S}_{12} \vec{a}_2 = \tilde{S}_{21}^T \vec{a}_2 = \begin{pmatrix} \vec{q}_1^T \\ \vdots \\ \vec{q}_k^T \\ \vdots \\ \vec{q}_m^T \end{pmatrix} \vec{a}_2. \quad (9)$$

Here, the term $\vec{q}_k^T \vec{a}_2$ corresponds to the projection of the vector of the receive signals of the antenna elements 68 onto the vector $\vec{q}_k$ leading to the directional characteristic $\vec{C}_k$. Thus, $\vec{a}_2$ is split into its portions that occur in the individual $\vec{C}_k$.

It is assumed that the vectors $\vec{q}_k$ and $\vec{q}_l$ with (k, l)=1, . . . m and k unequal l are orthogonal in pairs. Furthermore, a signal is to be received from the main radiation direction of the characteristic $\vec{C}_k$. Thus, $\vec{a}_2 = c \vec{q}_k^*$ applies with any real constant c>0 that is to be understood as a quantity for the receive amplitude.

Then, $\vec{b}_1 = c \vec{a}_{1,k}$ results. Thus, a signal corresponding to the directional characteristic $\vec{C}_k$ is only present at the antenna input 621. The remaining characteristics $\vec{C}_l$ (l≠k) contain no signal portions.

Thus, by means of the signal $\vec{b}_1$ describing the receive signal $\vec{a}_2$ split according to the individual directional characteristics, the direction of incidence of the respectively received signals may be inferred.

In a configuration, the method for identifying according to the second variation is as follows:

A directional characteristic $\vec{C}_k$ is switched. In a configuration, in particular, one of the input ports 620 of the feed network 69 is selected and connected to the signal processing apparatus 65, and also to the signal source 611.

The antenna apparatus 63 sends out an excitation signal or query signal about the received directional characteristic.

The transponders 62 (or RFID tags as examples for the herein-described transmitters) reached, or excited, or awakened with the directional characteristic, transmit back a response signal which contains, among other things, the identification of the transponder.

The response signal is received via the antenna apparatus and the part of the signal that corresponds to the selected directional characteristic $\vec{C}_k$ is available to the reader as a configuration of the signal processing apparatus 65.

The reader 65 evaluates the response signal and makes available the identification of the transponder and a quantity for the strength of the received signal (RSSI value).

With this, the transponder (or generally the transmitter) may be associated with the currently selected (or switched) directional characteristic.

This process is performed for several directional characteristics 67. Thus, the signal portions in the individual $\vec{C}_k$ are read out successively and the transponder signals and the amplitude amounts can be assigned to the directional characteristics. Thus, all in all, a vector for the position of the transmitter is constructed. The values of the entries result from the magnitudes of the field strengths of the respectively received signals and the base vectors result from the allocated directional characteristics, e.g. the respective direction of the beam.

Figure 11:
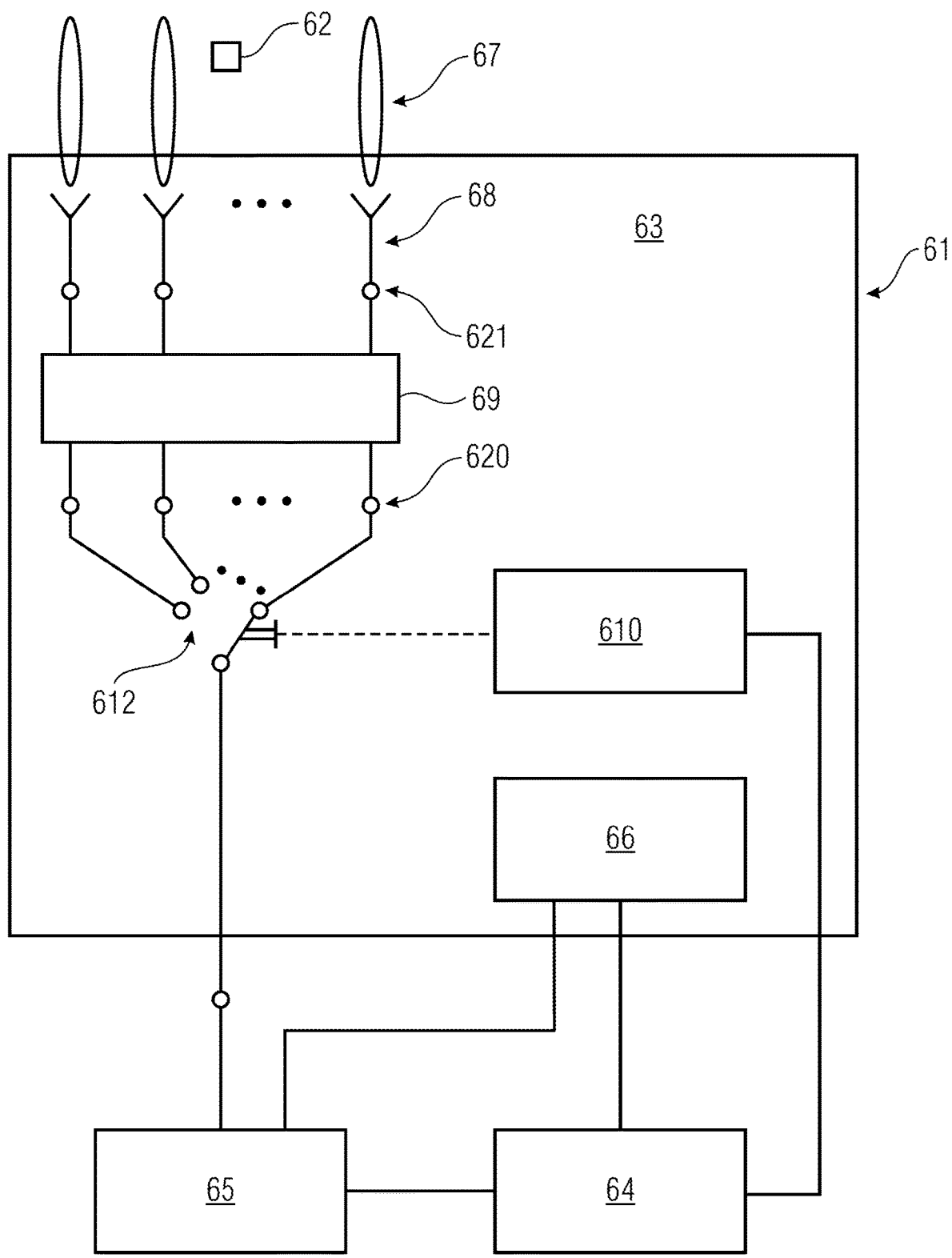
FIG. 11 shows a schematic illustration of an alternative configuration of the positioning apparatus of the second variation.

FIG. 11 shows an alternative configuration of the positioning apparatus 61 of the second variation. Here, the antenna apparatus 63 is also configured as multi-beam antenna and comprises the control logics 610 and the data processing apparatus 66.

A consideration of the evaluation of the received signals and the determination of the information about the position of the transmitter 62 will follow.

In order to determine the direction of the transponders (or generally transmitters and independent of whether the same are active or passive transmitters), it would be easier when the response signals (or generally the received signals) are in a complex form, i.e. with amount and phase. A common RFID reader (or RFID receiver), however, only provides amplitudes in the form of RSSI values. With the division of the irradiation area $\Omega$ into the individual sectors $\Omega_{ij}$ according to equations (2) and (4), the complex signals at the antenna elements 68 can be inferred, as will be discussed below.

Instead of the complex signals $\vec{b}_1$ (cf. equations (9) and FIG. 10), according to the above-described identification of the transmitter and RFID tag, respectively, the amplitudes of the individual components of $\vec{b}_1$. Thus, the following vector is obtained:

$$\hat{\vec{b}}_1 = \begin{pmatrix} \hat{b}_{1,1} \\ \vdots \\ \hat{b}_{1,k} \\ \vdots \\ \hat{b}_{1,m} \end{pmatrix} = \begin{pmatrix} |\vec{q}_1^T \vec{a}_2| \\ \vdots \\ |\vec{q}_k^T \vec{a}_2| \\ \vdots \\ |\vec{q}_m^T \vec{a}_2| \end{pmatrix} \tag{10}$$

Like $\vec{b}_1$, vector $\hat{\vec{b}}_1$ also depends on the direction of incidence of the receive signal. By the unique allocation of a directional characteristic $\vec{C}_k$ to a specific irradiation area $\Omega_{ij}$, however, a unique vector of RSSI values $\vec{b}_1$ is to be allocated to each direction of incidence.

For a specific direction of incidence $\vec{\omega}_0$, $\hat{\vec{b}}_1(\vec{\omega}_0)$ results only for $\vec{\omega} = \vec{\omega}_0$ and for none of the other directions of incidence. Thus, the phase of the signals is inherently hidden in the individual directional characteristics. Thus, an image of the form $$f: \hat{\vec{b}}_1(\vec{\omega}) \mapsto \vec{b}_1(\vec{\omega}) \tag{11}$$

or $$f: \hat{\vec{b}}_1(\vec{\omega}) \mapsto \vec{a}_2(\vec{\omega}) \tag{12}$$

can be defined.

In order to be able to perform the allocation between $\hat{\vec{b}}_1(\vec{\omega})$ and $\vec{b}_1(\vec{\omega})$ and/or $\vec{a}_2(\vec{\omega})$, the possible complex vectors for different angles of incidence have to be determined first. Thus, the directional characteristic and its spatial distribution of the receive sensitivity (or normally also their characteristics with respect to the spatial distribution of the transmitter) have to be determined. This can be performed by simulation or measurement of the array where the vectors for all angles of incidence are included across the irradiation area $\Omega$ according to the definition in (1). Here, the irradiation area is cycled in a discrete manner, such that finally a countable (finite) quantity of known angles of incidence $\vec{\omega}_l$ and hence vectors $\vec{b}_1^{(s)}(\vec{\omega}_l)$ and $\vec{a}_2^{(s)}(\vec{\omega}_l)$, respectively, result. The superscript of (s) indicates that these are the vectors determined for discrete angles of incidence. Basically, these are steering vectors.

Thus, the allocation to the complex vector corresponds to a search where in the sense of the smallest square error the complex vector $\vec{b}'^{(s)}_1 = \tilde{S}^T \vec{a}'^{(s)}_2$ is determined, for which the norm $$\|\hat{\vec{b}}_1 - \hat{\vec{b}}_1^{(s)}(\vec{\omega}_l)\| \tag{13}$$

with the vector:

$$\hat{\vec{b}}_1^{(s)}(\vec{\omega}_l) = \begin{pmatrix} |b_{1,1}^{(s)}(\vec{\omega}_l)| \\ \vdots \\ |b_{1,k}^{(s)}(\vec{\omega}_l)| \\ \vdots \\ |b_{1,m}^{(s)}(\vec{\omega}_l)| \end{pmatrix} = \begin{pmatrix} |\vec{q}_1^T \vec{a}_2^{(s)}(\vec{\omega}_l)| \\ \vdots \\ |\vec{q}_k^T \vec{a}_2^{(s)}(\vec{\omega}_l)| \\ \vdots \\ |\vec{q}_m^T \vec{a}_2^{(s)}(\vec{\omega}_l)| \end{pmatrix} \tag{14}$$

becomes minimum.

This means:

$$\left\|\hat{\vec{b}}_1 - \hat{\vec{b}}'^{(s)}_1\right\| = \min_l \left\|\hat{\vec{b}}_1 - \hat{\vec{b}}_1^{(s)}(\vec{\omega}_l)\right\| \tag{15}$$

As can be seen from equation (14), on the one hand, vectors $\vec{a}_2^{(s)}(\vec{\omega}_l)$ can be measured at the antenna bases and the vectors $\vec{b}_1^{(s)}(\vec{\omega}_l)$ can be determined arithmetically via the scattering matrix $\tilde{S}_{21}^T$. Thus, it is sufficient to determine the directional characteristics of the individual antenna elements in the array without the feed network. On the other hand, the port directional characteristics of the array, i.e. with feed network, can be measured and hence the vectors $\vec{b}_1^{(s)}(\vec{\omega}_l)$ can be determined directly.

The angle of incidence $\vec{\omega} \in \{\vec{\omega}_l\}$ results directly from the complex vector $\vec{b}'^{(s)}_1$ and $\vec{a}'^{(s)}_2$, respectively, or from any directional estimation algorithm applied to the vector. It is further possible to determine a time average across several successive angles of incidence that are determined across several switching cycles. This reduces the variance of the estimated angle and hence the measurement uncertainty. In practice, existing secondary maxima of the directional characteristics are normally to be limited to a specific maximum level with respect to the level of the main maximum normally in order to be robust against possible uncertainties by superimposed noise. Otherwise, ambiguities in determining the direction can occur.

For obtaining unambiguousness of functions (11) and (12), one configuration provides the usage of a multi-beam antenna whose directional characteristics comprise a unique global maximum and, across the sectors, no symmetries in the form of a further global maximum within the irradiation area. The combination of a typical or common RFID reader with a respective multi-beam antenna allows inferring the complex-valued receive signal without having to interfere with the reader.

FIG. 11 shows an exemplary architecture of the respective setup of the positioning apparatus 61 by which the available directional characteristics $\vec{C}_k$ according to the above-described process can be read out and the angle of incidence of the identified tags (or transmitter) 62 can be determined. Apart from the antenna elements 68 and the feed network 69, the multi-beam antenna 63 includes a radio-frequency switch (RF switch) 612 and control logic 610.

With the help of the control logic 610, the desired port directional characteristic $\vec{C}_k$ is set via the RF switch 612 (cf. definition (5)). Via an RF signal connection, the RF signal to be transmitted is provided as excitation signal by the external RFID reader 65 (thus comprising the signal source 611 of FIG. 8) and the receive signal is provided for the external RFID reader 65. A control apparatus 64 external to the antenna apparatus 63 allows the control of the reader 65 and the multi-beam antenna 63. The direction of incidence of the transponder signals is determined according to equation (13). The RSSI values as well as the transponder identification originate from the RFID reader 65.

FIG. 12 to FIG. 23 show configurations of a third variation of the positioning apparatus 71. Here, individual components and configurations can also be transferred to the above configuration and the above configurations can also represent supplements for the following configurations.

Figure 12:
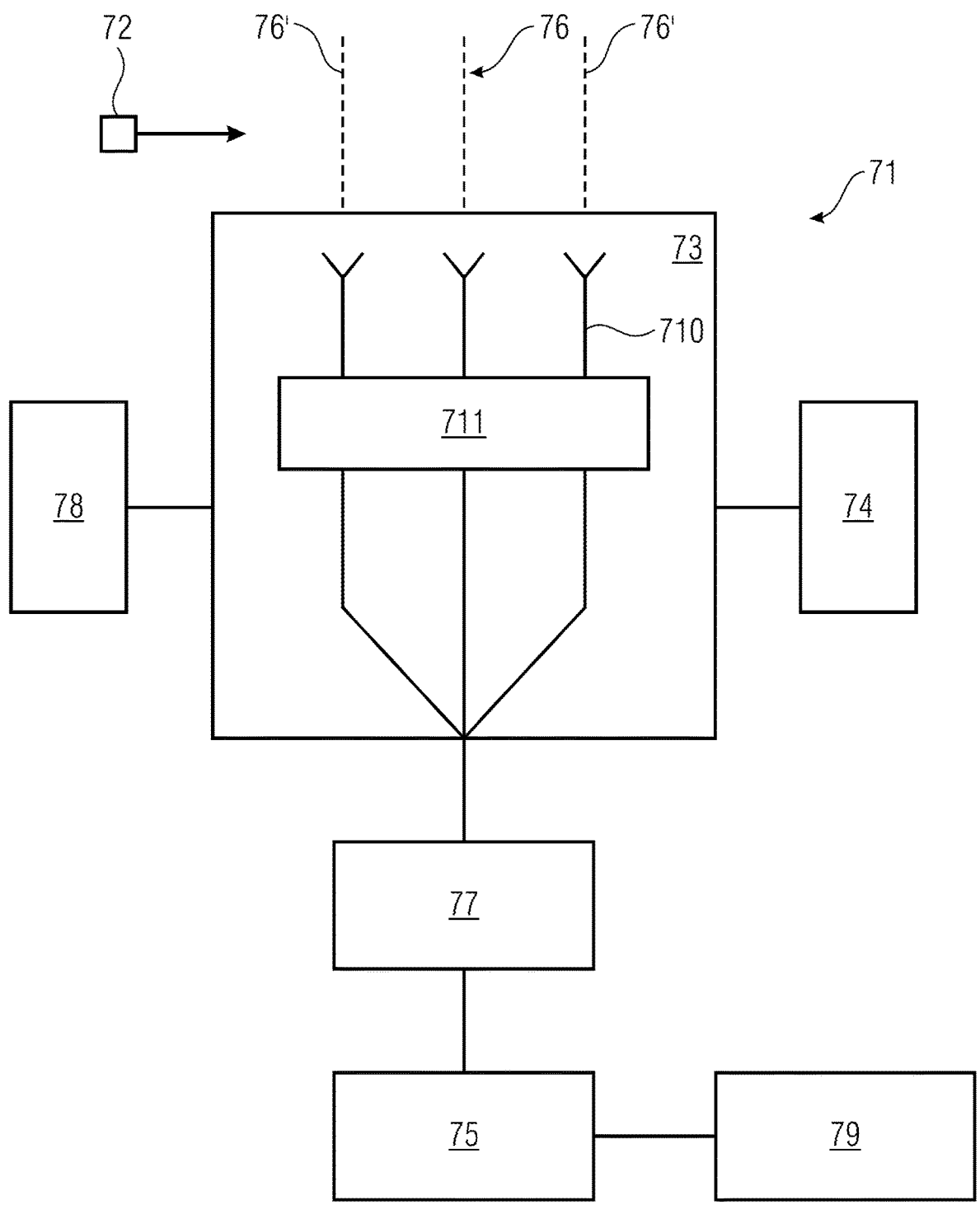
FIG. 12 shows a schematic illustration of a third variation of the positioning apparatus.

FIG. 12 shows the usage of a third variation of a positioning apparatus 71 that allows, among others, an indication whether and when a transmitter 72 passes a detection area 76.

For this, the positioning apparatus 71 comprises an antenna apparatus 73 comprising at least one excellent directional characteristic. The directional characteristic relates to a spatial distribution of the sensitivity of the antenna apparatus 73 for receiving signals, that here originate in particular from the transmitter 72.

In the illustrated configuration, the antenna apparatus 73 comprises several directional characteristics. For this, in the exemplary configuration, three antenna elements 710 are used that are controlled by a control apparatus 74 via the network 711. In one configuration, the antenna apparatus 73 is a patch antenna. Alternatively, the antenna elements 710 are dipole antennas, monopole antennas, monopole-type antennas, chip antennas or loop antennas. One of the directional characteristics is the already stated excellent directional characteristic to which the definition area 76 is allocated.

In an alternative configuration (not illustrated), the antenna apparatus 73 comprises only a single directional characteristic which is hence also the excellent directional characteristic. In the following, the illustrated implementation comprising several switchable characteristics will be discussed.

For switching the different directional characteristics for sending out an excitation signal and for receiving the signals originating from the transmitter 72, respectively, the feed network 711 is provided. In the example, the feed network 711 presents a realization of a Butler matrix (in an alternative configuration, an eigenmode network is used) and provides the signals at its output in the manner as they have been received with the individual directional characteristics. Thus, switching the directional characteristics means that the signal that has been received with the switched directional characteristic is supplied to an evaluation or is evaluated specifically. In a further configuration (not illustrated), switching the directional characteristics means that by direct interaction with the antenna apparatus 73 only the switched directional characteristic exists, i.e. that the antenna apparatus 73 can receive signals only with the switched directional characteristic.

Processing the received signals and the resulting data is performed by the data processing apparatus 75. In the shown example, the data processing apparatus 75 is connected to a signal processing apparatus 77 that determines one amplitude value of the field strength each for the received signals.

If the transmitter 72 is an RFID tag, accordingly, the signal processing apparatus 77 is configured such that the same generates a so-called "received signal strength indication" (RSSI) value as amplitude value. In a further accompanying configuration, the signal processing apparatus 77 is also configured to extract information from the received signals, e.g. an identification identifier or measurement data. Thus, the signal processing apparatus 77 is exemplarily an RFID reader.

Additionally, in the shown embodiments, for the application in transmitters 72 based on RFID tags, a signal source 78 generating excitation signals is provided. Depending on the application case with individual directional characteristics or essentially omnidirectional, the excitation signals are output via the antenna apparatus 73. Here, the excitation signals are so-called request signals by which the transmitter 72 in the form of an RFID tag is asked to establish data communication and via which the transmitter 72 possibly receives the energy necessitated for the communication. In one configuration, for sending out the excitation signals, directional characteristics are combined, such that superpositions for sending out the signals result. Vice versa, the feed network 711, as already stated above, allows the separation into the individual directional characteristics in the received signals.

In an alternative configuration (not illustrated), the signal source 8 is a component of the signal processing apparatus 77. This corresponds to the common configuration of RFID readers in conventional technology that generate the activation signals themselves.

In that the antenna apparatus 73 serves to receive and transmit signals, this also results in the fact that the directional characteristics do not only relate to the spatial distribution of sensitivity, but also to the transmitting characteristics of the antenna apparatus 73.

Finally, the data processing apparatus 75 is connected to data storage 79 in order to store data about the trajectory of the transmitter 72. With the history data regarding the respectively determined positions of the transmitter 72, the trajectory of the transmitter 72 is determined and, when several transmitters are present, ambiguities are canceled out and the signals are allocated to the transmitters. For this, corresponding plausibility considerations are provided.

The selected directional characteristic has a detection area 72, perpendicular to which the transmitter 72 moves in the shown example. Here, the transmitter 72 moves parallel to the antenna elements 710 and perpendicular to the detection area 76. The characteristic of the detection area 76 is that the sensitivity of the antenna apparatus 73 is at a minimum in this spatial area. Thus, in the positioning apparatus 71, a signal minimum is used to determine whether the transmitter 72 passes the allocated detection area 76. Thus, when no transmitter 72 exists at this location, no or only a very weak signal is received by the antenna apparatus 73 in the detection area 76.

Here, the antenna apparatus 73 comprises three detection areas 76, 76' where the respective receive minimum is located and which the transmitter 72 passes successively. Thereby, the reliability of detecting the passage of the central detection area 76 can be increased.

The reliability of the measurement is in particular increased by the fact that the control apparatus 74 adjusts different directional characteristics that each comprise different sensitivities and location allocations, such that measurement inaccuracies and ambiguities can be compensated.

In one configuration, the antenna apparatus 73 has at least one further directional characteristic comprising a sensitivity maximum in the detection area 76. This means the antenna apparatus 73 is very sensitive for receiving signals with this other directional characteristic. Thus, in this configuration, the signals of the excellent directional characteristic and the comparative characteristic are evaluated together for increasing the measurement accuracy.

Figure 13:
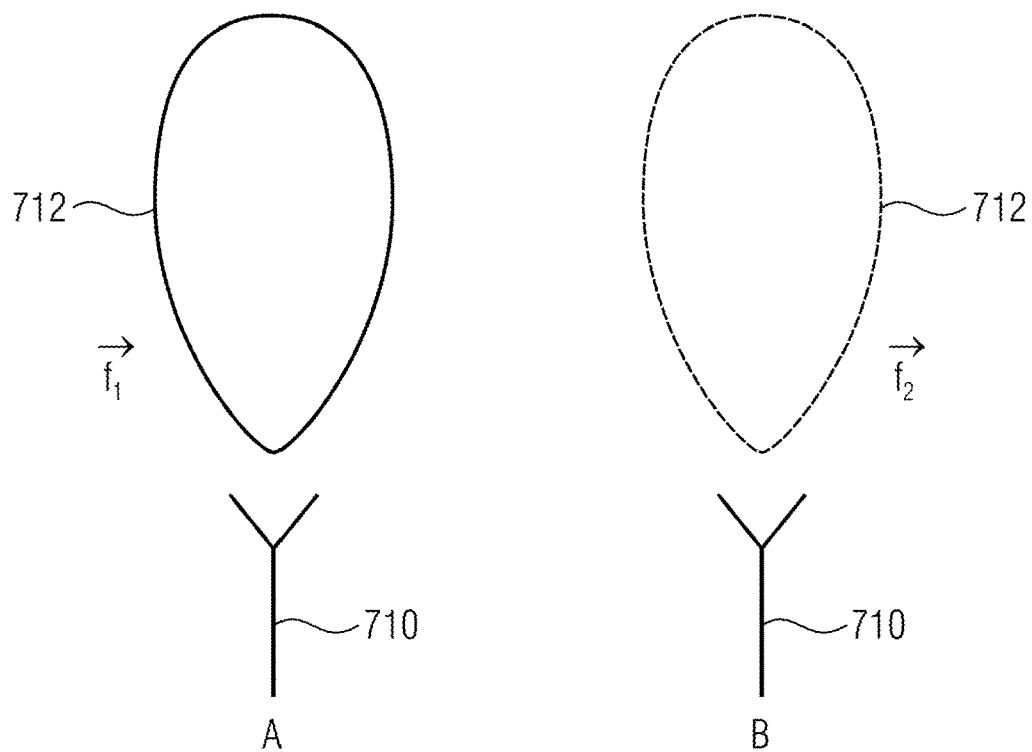
FIG. 13 shows a schematic illustration of two antenna elements of an antenna apparatus and their associated directional characteristics.

FIG. 13 shows the two antenna elements 710 (indicated by A and B) of an exemplary antenna apparatus that is configured as multi-beam antenna. The two antenna elements 710 each have a beam-shaped directional characteristic 712. The two directional characteristics 712 are each described by a complex-valued directional characteristic $\vec{f}_j$ with j=1 (or A) and j=2 (or B), respectively.

Generally, a multi-beam antenna consists of a quantity of n antenna elements 710 (or radiators, e.g. dipoles) that is connected to a feed network (see FIG. 12). An antenna or antenna element is connected to each of the n outputs of the feed network.

The m inputs of the feed network each serving to output the signals received from the antenna elements 710 or to feed the RF signals to be sent out via the antenna elements 710, correspond, in one configuration, each to a specific directional characteristic $\vec{C}_i$ that is defined as:

$$\vec{C}_i = \vec{C}_i(\vec{\omega}) = \vec{C}_i(\phi, \theta) = \begin{pmatrix} C_i^{(co)} \\ C_i^{(cross)} \end{pmatrix} \tag{1}$$

with $i = 1, \ldots\ m$

Here, a co-polarized component $C_i^{(co)}$ and a cross-polarized component $C_i^{(cross)}$ are given.

Figure 14:
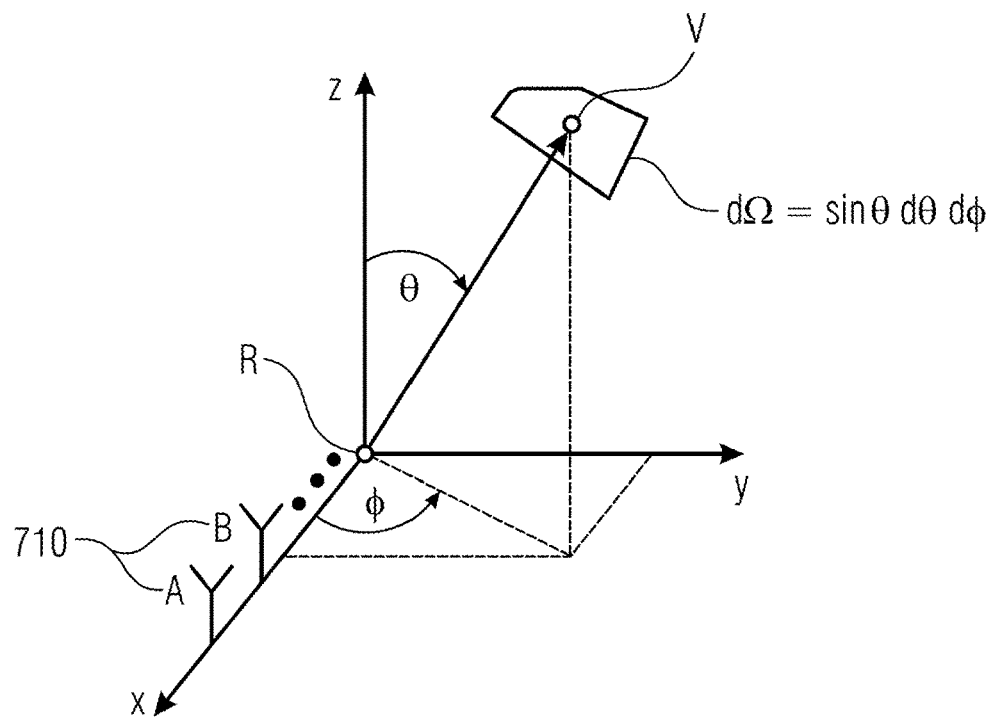
FIG. 14 shows a coordinate system for the description of the antenna elements of FIG. 13.

FIG. 14 shows a coordinate system having the three axes x, y and z as well as the reference point R in the origin of the coordinate systems. In the illustrated example, the two antenna elements 710 (A and B) are arranged along the x axis. Here, an observation point V is described by an azimuth angle $\phi$ in the x-y plane as well as a co-elevation angle $\theta$ relative to the z axis. Here, an area $d\Omega = \sin\theta*d\theta*d\phi$ is considered.

For allocating a transmitter or, for example, specifically an RFID transponder to a specific direction, the directional characteristics $\vec{C}_i$ of the antenna apparatus have specific characteristics. Here, the two-element antenna array of FIG. 13 will be considered further.

With reference to the reference point R according to FIG. 14, where the coordinate origin is placed for simplicity reasons, both antenna elements 710 (i.e. A and B) each have the stated (complex) radiation characteristic $$\vec{f}_j = \begin{pmatrix} f_j^{(co)} \\ f_j^{(cross)} \end{pmatrix} \text{ with } j = 1, \ldots\ n \tag{2}$$

From this, the so-called radiation matrix $\tilde{H}$ (compare C. Volmer et al., "An Eigen-Analysis of Compact Antenna Arrays and Its Application to Port Decoupling", IEEE transactions on antennas and propagation, vol. 56, no. 2, pp. 360-370, 2008) can be determined whose components are given by the following formula:

$$\tilde{H}_{pj} = \frac{1}{4\pi} \int_\Omega \vec{f}_p^H \vec{f}_j \, d\Omega \tag{3}$$

with $\{p, j\} = 1, \ldots, n$

Since the radiation matrix $\tilde{H}$ is a Hermitian matrix, the same can be diagonalized. Thus, the following results:

$$\tilde{H} = \tilde{Q}\tilde{\Lambda}\tilde{Q}^H \text{ with } \tilde{\Lambda} = \text{diag}\{\lambda_1, \ldots, \lambda_n\} \tag{4}$$

The equation (4) describes the eigenvalue decomposition of the radiation matrix $\tilde{H}$. Here, each column in $\tilde{Q}$ represents one of the n eigenvectors $\vec{q}_j$ and each main diagonal element in $\tilde{\Lambda}$ describes the allocated eigenvalue $\lambda_j$.

The eigenvectors $\vec{q}_j$ describe the fundamental excitation vectors of the antenna apparatus, here an antenna array with the antenna elements. The eigenvectors $\vec{q}_j$ are orthogonal in pairs, as long as no eigenvalues $\lambda_j$ occur multiple times. If eigenvalues $\lambda_j$ occur multiple times, an orthonormal basis to the same has to be found whose base vectors are orthogonal to one another.

Additionally, the eigenvectors $\vec{q}_j$ have a length of one. Specific directional characteristics $$\vec{C}_j^{(m)} = \begin{pmatrix} C_j^{(m,co)} \\ C_j^{(m,cross)} \end{pmatrix} \tag{5}$$

are assigned to the eigenvectors that are orthogonal to one another.

Thus, the following applies:

$$\phi(\vec{C}_p^{(m)})^H \vec{C}_j^{(m)} = 0, \text{ if } p \neq j. \tag{6}$$

The eigenvectors $\tilde{Q}$ represent a specific orthonormal base of the possible feed vectors. However, other orthonormal bases can be determined, such that the feed network does not necessarily have to be an eigenmode network. It is needed that at least one zero is formed in one of the directional characteristics along a specific direction.

For an array of two equal antenna elements (see FIG. 13) having the same orientation, the following eigenvectors result:

$$\tilde{Q} = \frac{1}{\sqrt{2}} \begin{pmatrix} 1 & 1 \\ 1 & -1 \end{pmatrix} \tag{7}$$

The antenna elements 710 (for example dipoles), are thus fed either in an even mode (even mode: $1/\sqrt{2}$ and $1/\sqrt{2}$) or in an odd mode (odd mode: $1/\infty 2$ und $-1/\sqrt{2}$).

Figure 15:
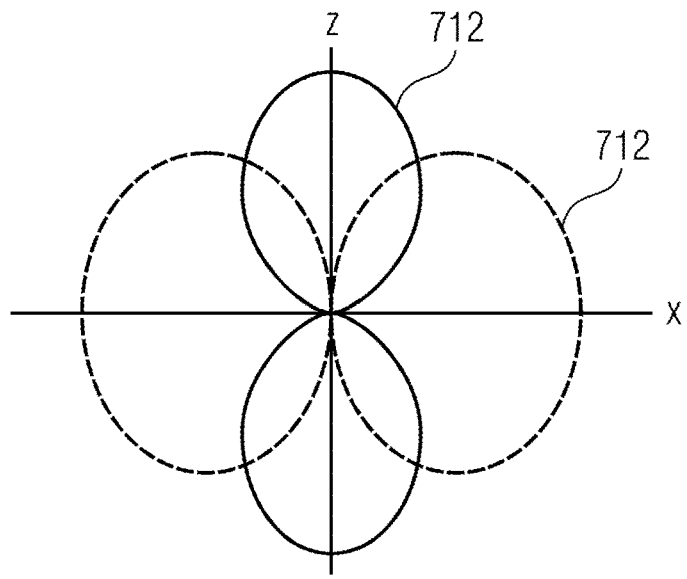
FIG. 15 shows an illustration of the directional characteristics that result in the two antenna elements of FIG. 13 at an even mode and an odd mode.

The resulting amount of directional characteristics is shown in FIG. 15 qualitatively for the x-z-plane. Here, the directional characteristic 712 for the even mode is indicated by solid lines and the one for the odd mode by broken lines. The illustrated directional characteristics result in particular by an eigenmode network.

For feeding in even mode, a maximum results perpendicular to the array that is formed by two equal and equally oriented antenna elements. Thus, the maximum is in z direction and at the co-elevation angle $\theta=0°$, respectively.

In the odd mode, however, a minimum or zero results at this position. The zero and its closer environment, respectively, is narrow with respect to the environment around the maximum in the even mode, since the gradient regarding the co-elevation angle $\theta$ increases strongly in magnitude in the environment of zero.

A radio signal incident on the array of the antenna apparatus from the direction of the zero is hence hardly received or not received at all in the odd mode while the receive signal becomes maximum in the even mode. Thus, the direction of incidence can be inferred from the measured signal levels in the even mode and the odd mode.

Figure 16:
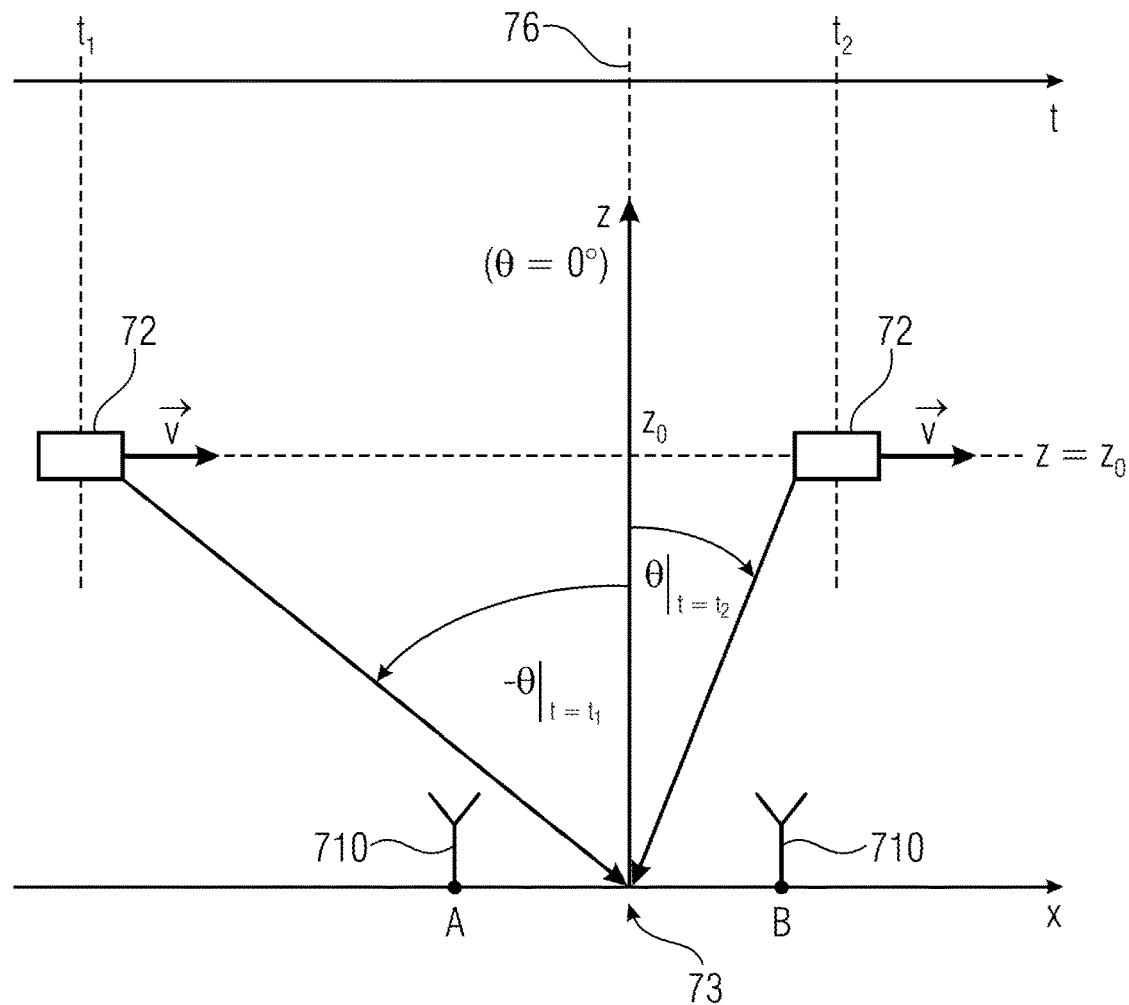
FIG. 16 shows a schematic illustration of determining the position of a transmitter relative to the antenna apparatus with the antenna elements of FIG. 13.

FIG. 16 shows a scenario where an object with an RFID transponder as transmitter 72 is conveyed parallel to the x axis with constant velocity (v). The antenna array formed of the two antenna elements 710 of the antenna apparatus 73 is centered in the origin of the coordinate system and is oriented such that the zero of the receive sensitivity occurs along the z axis $\theta=0°$ in the odd mode. Thus, this zero is the detection area 76. In dependence on the position of the transponder 72 relative to the antenna apparatus 73, the receive signal of the individual modes varies since the angle of incidence is a function of time.

Time t can be allocated to the position of the transponder in x direction. Two positions of the transmitter 72 at the time t1 are illustrated and hence prior to the detection area 76 as well as at a time t2 and hence after passing the detection area 76. The respective angle of incidence $\theta$ as angle of the incident response signal (indicated by the arrows, originating from the transmitter 72) to the z axis, varies over time t.

Figure 17:
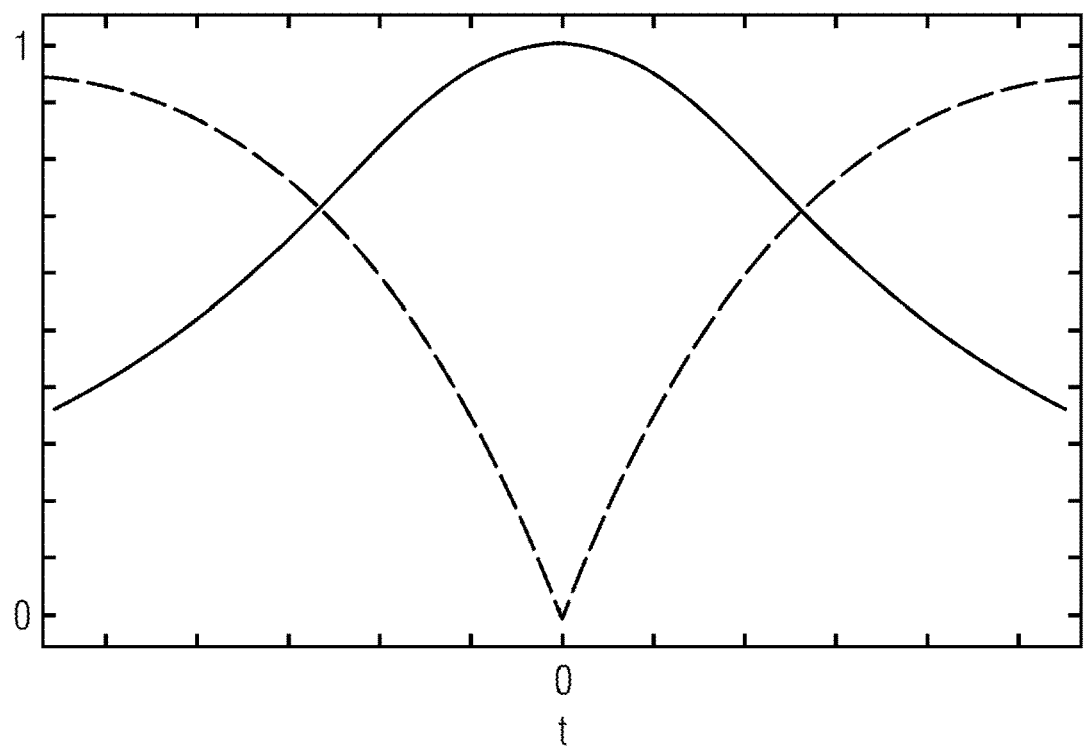
FIG. 17 shows a schematic illustration of the waveforms of the amplitudes of the receive signals in the arrangement of FIG. 16.

FIG. 17 exemplarily illustrates the time signals of the arrangement of FIG. 16. The course of the receive amplitude normed to the maximum as a function of time t for the transmitter of FIG. 16 is shown, which moves parallel to the x axis ($z=z_0$) with constant velocity v. The two antenna elements are on the x axis and are centered around the coordinate origin, i.e. have the same distance to the same.

If the transponder as transmitter is read out at different locations and hence at different times (which means that the transponder has been identified and its identifier is known), analysis of the time signals allows the determination of the time when the transponder is in the direction $\theta=0°$ and hence at a specific location, namely the detection area, along the conveying path.

The receive signal in the odd mode (broken line) is minimum at this time of the passage of the detection area while the same is maximum in the even mode (solid line). Thus, the transponder can be distinguished from a subsequent transponder that is also read out at this time of the passage of the detection area, since the signal of the subsequent transponder is received both in the even mode and in the odd mode. Thus, the transponder answering from the direction $\theta=0°$ and whose signal can only be received in even mode has to be the selected transponder. This result can be used to regulate and to control the flow of objects, for example on a conveyor belt or at a gateway passage.

The time when the transponder is along the plane with co-elevation angle $\theta=0°$ can alternatively also be read out from the even mode. Here, at this location, the signal sent out by the transmitter is received with maximum amplitude.

Figure 18:
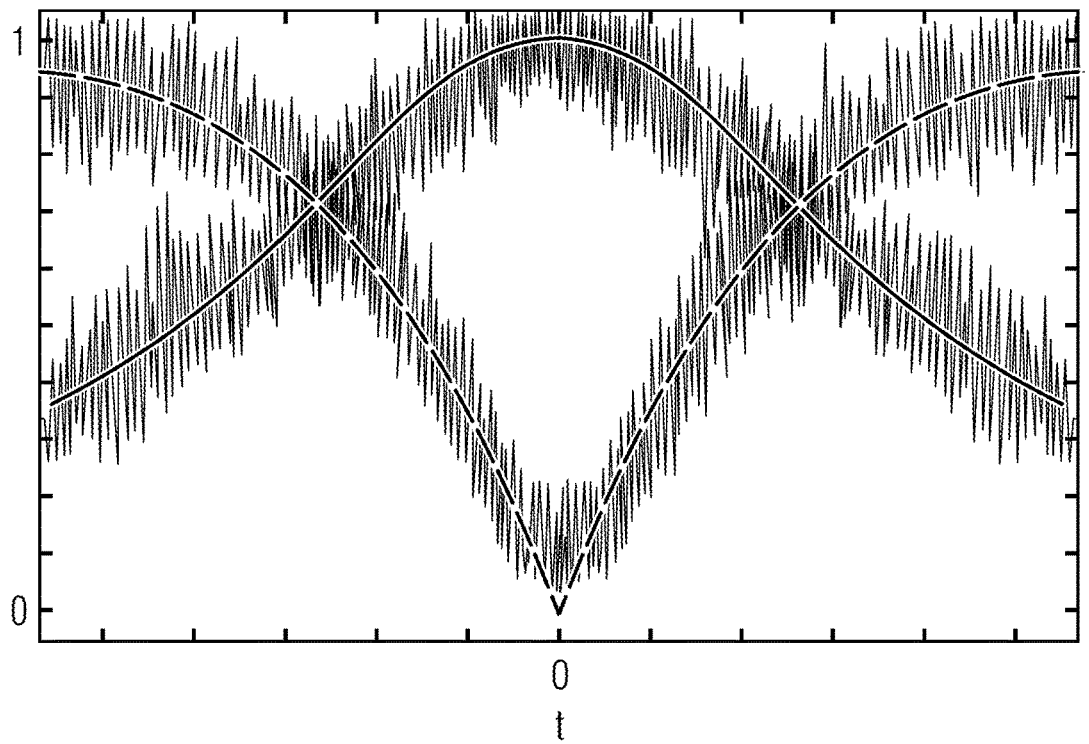
FIG. 18 shows the waveforms of FIG. 17 with superimposed noise.

For practical implementation, however, the uncertainties by superimposed noise have to be considered. FIG. 18 illustrates the waveform of the receive signals of FIG. 17 in even mode (solid line) and odd mode (broken line) with superimposed noise starting from a signal-to-noise ratio of $\rho=20$ dB.

Due to the broad radiation beam in the even mode, the noise has a stronger effect on the signal maximum in the detection area, such that a greater uncertainty occurs during the search for the maximum. Due to the relatively narrow minimum in the odd mode, the same can also be found in superimposed noise with less uncertainty.

Figure 19:
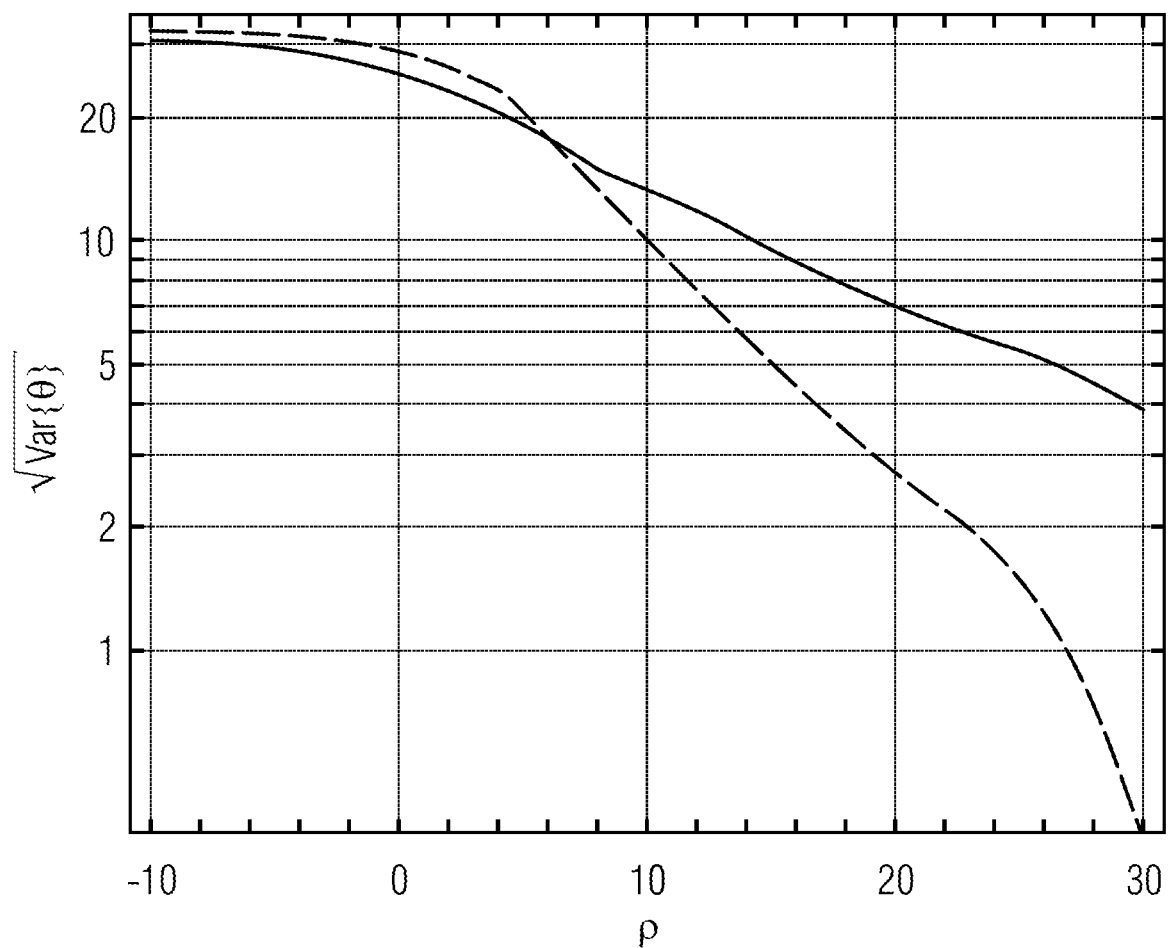
FIG. 19 shows a dependency of the standard variation $\sqrt{Var}$ $(\theta)$ of the estimated angle of incidence $\theta$ of the signal-to-noise distance $\rho$.

For illustrating this, FIG. 19 exemplarily shows the determined standard deviation of the determined angle of incidence $\theta$ for varying signal-to-noise ratios for the structure according to FIG. 16. With increasing signal-to-noise ratio $\rho$ (illustrated on the x axis in dB), the uncertainty in the search for the minimum in the odd mode (broken line) is quickly reduced, while the search for the maximum in the even mode (solid line) shows significantly more uncertainties even with high signal-to-noise ratios $\rho$. Here, the standard deviation $\sqrt{Var}(\theta)$ of the estimated angle of incidence $\theta$ is plotted on the y axis in degree (°). For the example, the transponder moves with a constant velocity of 3 m/s. The standard deviation has been determined across 10 000 test values per signal-to-noise ratio value $\rho$. Here, $z_0=5$ m.

The implementation of the principle of even mode and odd mode feeding is based on a feed network providing the needed feed vectors. The directional characteristics $\vec{C}_i$ according to equation (1) allocated to the input ports thus correspond to the directional characteristics of the eigenmode $\vec{C}_j^{(m)}$, and the feed network is an eigenmode network, wherein the configuration m=n applies. This means that also one signal output for outputting the respectively received signals is available per antenna element 710.

Figure 20:
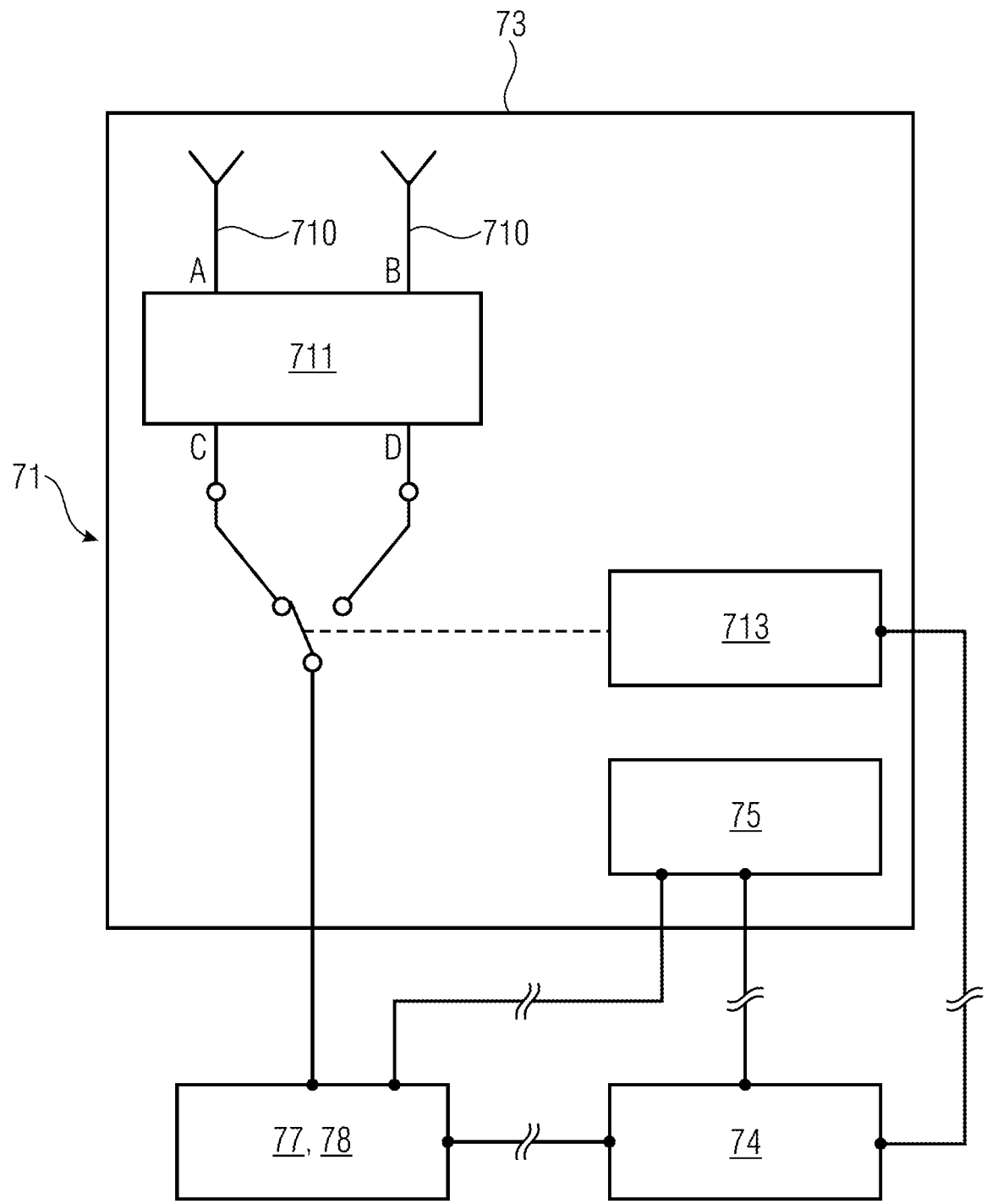
FIG. 20 shows a schematic illustration of a further configuration of the positioning apparatus of the third variation.

A possible configuration of the positioning apparatus 71 with two antenna elements 710 is shown in FIG. 20. The antenna array of the two antenna elements 710 (indicated by A and B) is connected to an eigenmode network as feed network 711. The inputs (indicated by C and D) of the feed network 711 can be selected via a switch for radio-frequency signals (RF switch). The input of the switch is connected to the RFID reader, here serving as signal processing apparatus 77. Here, the RFID reader also includes the signal source 78, such that the RFID reader provides the excitation signal for the transponders and evaluates their response signals. Switching the inputs of the feed network 711 is performed via control logic 713, which is here part of the antenna apparatus 73. The inputs C and D of the feed network 711 are the inputs for the RF signal as excitation signal of the signal processing apparatus 77. Additionally, the same are the outputs for the signals received with the antenna elements 710. Here, also a directional characteristic, i.e. either even mode or common mode is allocated to each input, such that the switch enables switching between the two directional characteristics.

Reading out the transponders and thus receiving the signals is regulated via control apparatus 74 acting on the control logic 713. In the shown configuration, the transponder signals are read out alternatingly in even mode and odd mode. With the RSSI values as values for the amplitude of the received signals, provided by the RFID reader 77, the allocated time signals of the even mode and odd mode can be determined for each transponder. Starting therefrom, determination of the time when the respective transponder traverses the z axis $\theta=0°$ is performed in the data processing apparatus 75. In one configuration, the data processing apparatus 75 in particular determines the angle of incidence of the received signals.

Here, the data processing apparatus 75 is also a component of the antenna apparatus 73. In a further configuration (not illustrated), the control apparatus 74 is also part of the antenna apparatus 73, such that in this configuration the positioning apparatus 71 consists of two elements all in all: antenna apparatus 73 and RFID reader 77.

Here, the separation in control logic 713, control apparatus 74 and data processing apparatus 75 is to be seen with respect to their functions. For the realization, different configurations can be implemented.

Figure 21:
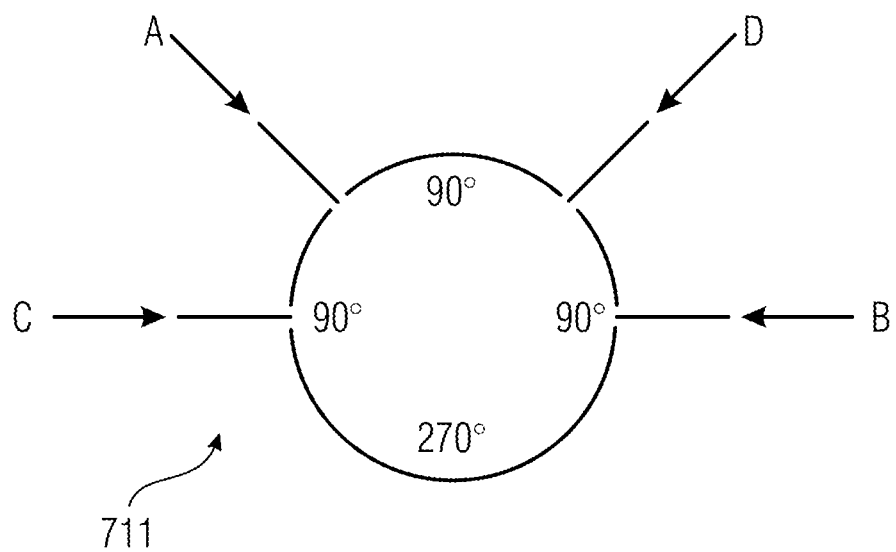
FIG. 21 shows a functional illustration of a hybrid ring coupler as an example of a feed network.

One implementation of an eigenmode network as feed network 711 is shown in FIG. 21 for the antenna array of FIG. 13 consisting of two antenna elements (antenna A and antenna B). This configuration is a hybrid ring coupler providing an even mode signal and an odd mode signal, respectively, depending on the port that is fed (i.e. the respective input of the feed network in the direction of the RFID reader according to FIG. 20, here indicated by C for odd mode input and D for even mode input). Such a hybrid ring coupler is in particular used when an eigenmode network is realized. The principle of eigenmode feeding can be applied to array having any number of antenna elements.

Figure 22:
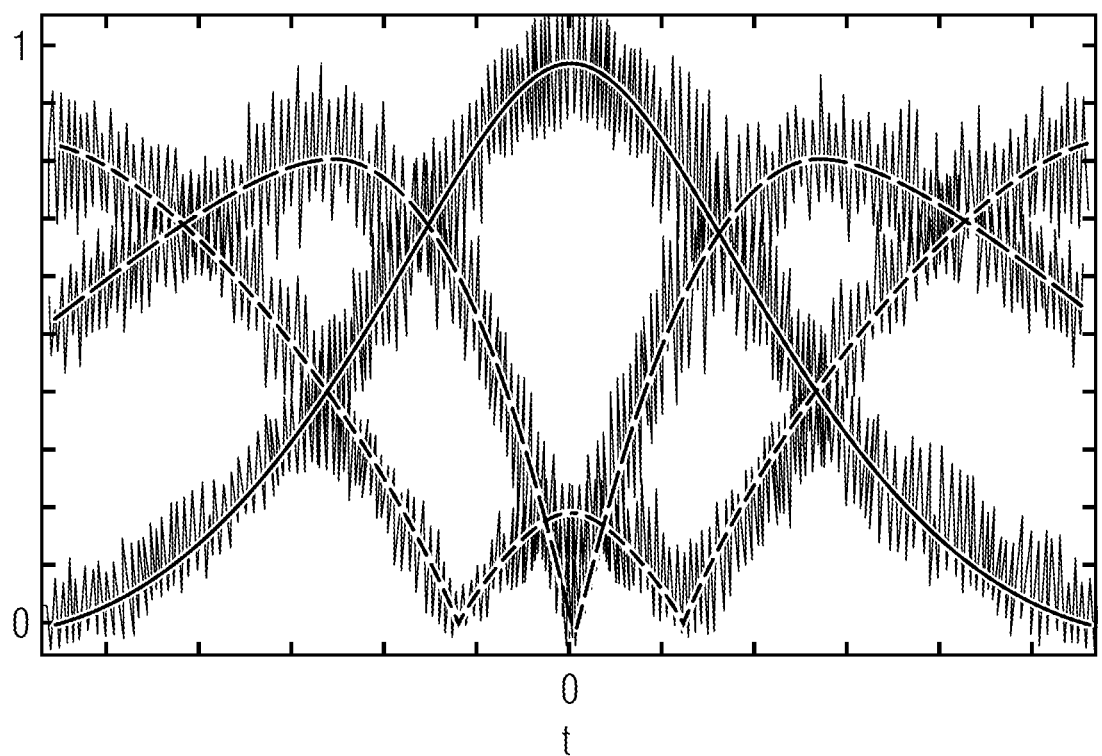
FIG. 22 shows a schematic illustration of the waveforms of the amplitudes of the received signals when using three antenna elements with three modes.

FIG. 22 shows exemplarily the signals of an antenna apparatus comprising three antenna elements (cf. FIG. 12). The three antenna elements are on the x axis and are centered around the coordinate origin. Three modes are shown. The time signals (time t on the x axis, wherein t=0 is the time of passing the detection area and with the receive amplitude normed to the maximum on the y axis) are here illustrated with superimposed noise. The signal-to-noise ratio is $\rho=20$ dB.

In the even mode (solid line) all three antenna elements are fed in-phase. Thus, the corresponding directional characteristic has a maximum along the angle $\theta=0°$ which drops to both sides.

In the odd mode (broken line with longer partial lines), the two outer elements are fed out of phase and with the same amplitude. Here, a minimum or zero, respectively, occurs along the axis with angle $\theta=0°$ which laterally increases to a maximum which is smaller than the maximum of the even mode and then drops again respectively.

In the third mode (broken line with shorter partial lines), respectively adjacent elements are fed out of phase. Thereby, two zeros result symmetrically around the z axis in the radiation diagram having a small maximum around the area with the angle $\theta=0°$. The two zeros increase laterally again.

Here, the consideration is limited to the top half plane $z \geq 0$.

With the help of the two additional zeros of the third mode, with superimposed noise, with respect to the two-element array, the time when a transponder passes the z axis can be determined more accurately. For plausibility reasons, the estimated time of the minimum in the odd mode signal has to occur between the times for the minima in the signal of the third mode.

Additionally, in the three element array, the zero in the odd mode is more distinct than in the two element array due to the larger aperture, wherein an equal distance between the antenna elements is assumed.

Figure 23:
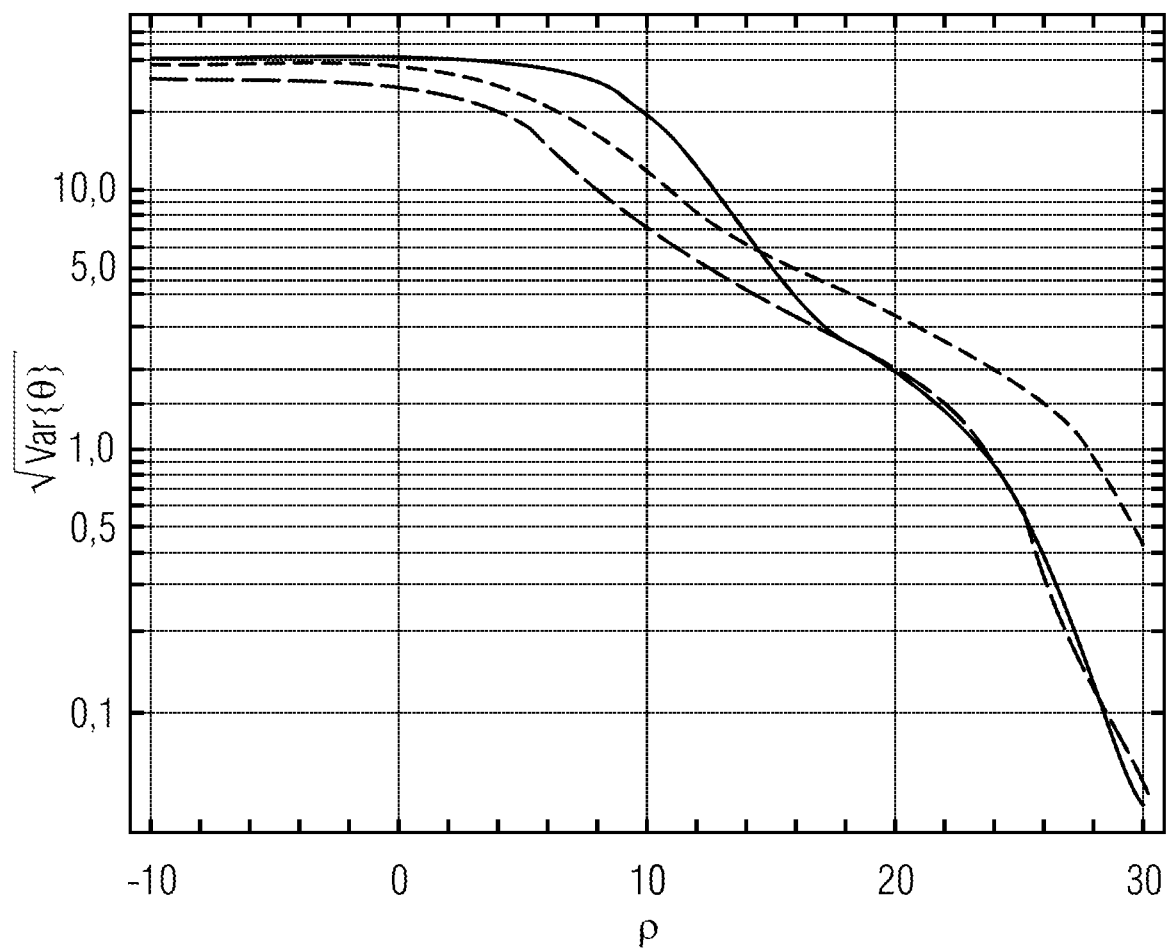
FIG. 23 shows an illustration of the dependency of the standard variation of the determined angle of incidence $\theta$ on the noise for an antenna apparatus with three antenna elements.

FIG. 23 shows the standard deviation $\sqrt{\mathrm{Var}\{\theta\}}$ of the estimated angle of incidence $\theta$ as a function of the signal-to-noise ratio $\rho$, that has been determined based on the signals in the odd mode (solid line) and based on the signals in the odd mode and the third mode (broken thick line). For comparison, the results for the odd mode of the two-element array is plotted (broken thin line, cf. FIG. 19).

Here, the transponder moves parallel to the x axis ($z=z_0$) with constant velocity v=3 m/s for the determined values. The antenna elements are on the x axis and are centered around the coordinate origin. The standard deviation has been determined across 10 000 test values per $\rho$ value. Still, $z_0=5$ m.

The comparison of the variances between a two-element and a three-element array shows that the combination of odd mode and third mode shows a lower standard deviation than the odd mode of the two-element array.

For signal-to-noise ratios of less than 13 dB, the odd mode of the three-element array results in higher standard deviations than the odd mode of the two-element array. In the three-element array, with increasing value for $\rho$, the standard deviation of the odd mode approaches the standard deviation that results from the combination of odd mode and third mode. This results since the uncertainty when estimating the angle of incidence and hence the scattering around the expectation value decreases. Thus, it becomes more and more unlikely that the minimum in the time signal of the odd mode does not occur between the minima of the third mode.

Figure 24:
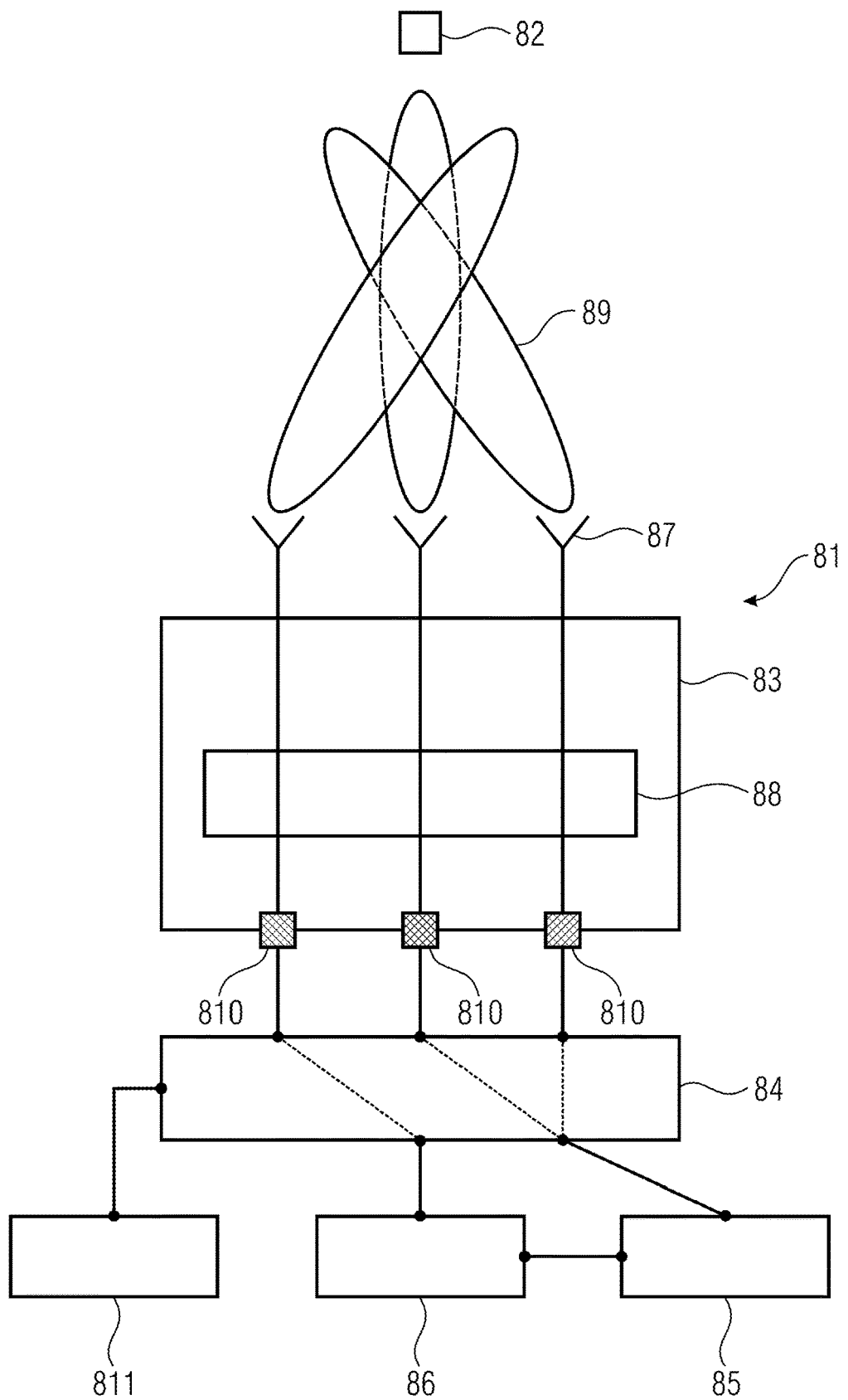
FIG. 24 shows a schematic illustration of a positioning apparatus according to a fourth variation and its application.
Figure 25:
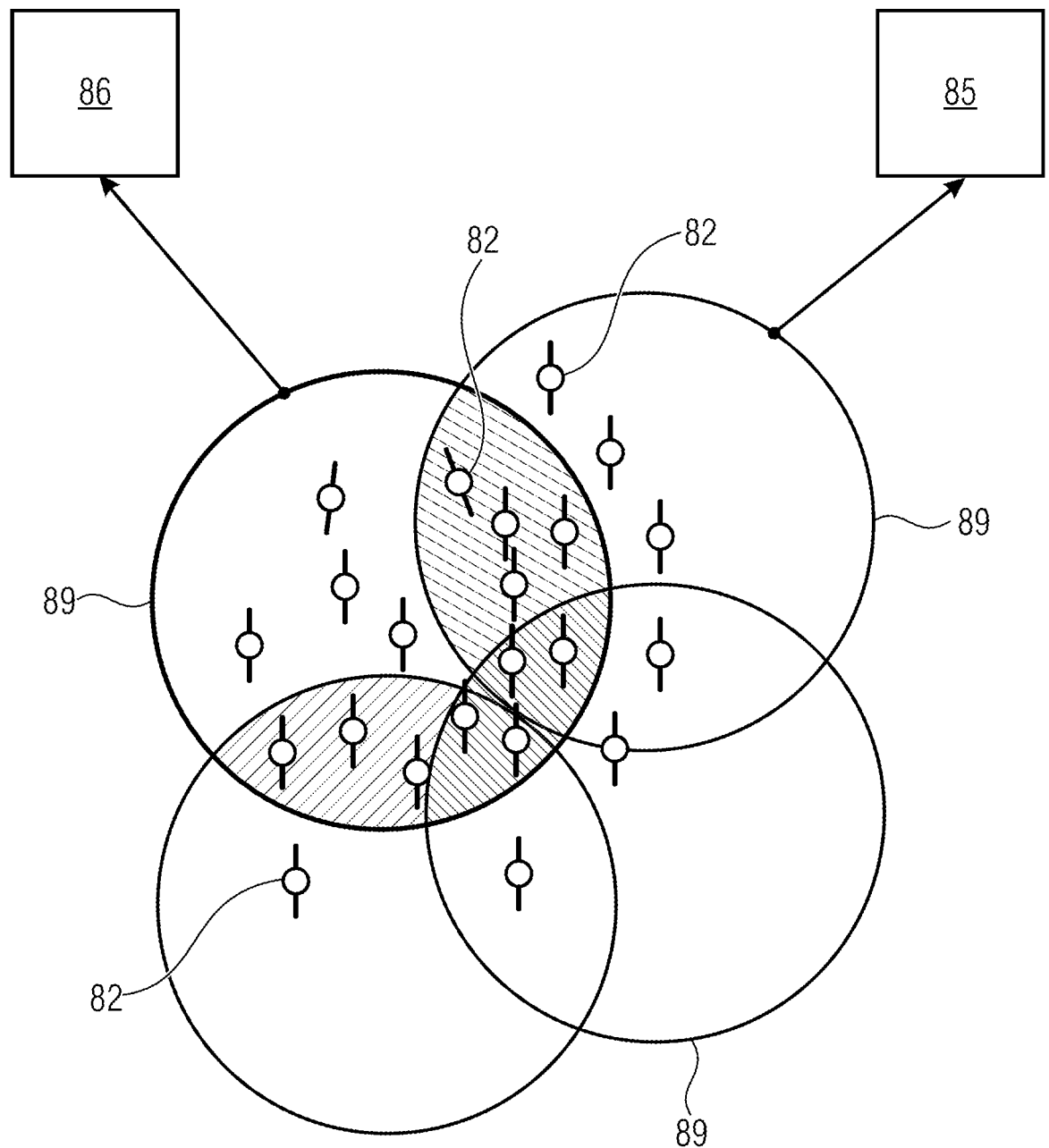
FIG. 25 is a schematic diagram for illustrating the method performed with the positioning apparatus of FIG. 24.

FIG. 24 and FIG. 25 show a fourth variation for obtaining the data represented via the inventive apparatus.

FIG. 24 shows a schematic configuration of a fourth variation of the positioning apparatus 81 serving to determine the position of the transmitter 82. For this, the positioning apparatus 81 comprises an antenna apparatus 83, here comprising three antenna elements 87 as an example.

The antenna elements 87 are connected to the outputs of a feed network 88. Via the feed network 88, the directional characteristics 89 each connected to the antenna elements 87 can be generated and switched with the regulating apparatus 84. For transmitting e.g. excitation signals, the directional characteristics can also be superimposed, which has a respective effect in signal shaping. If, vice versa, the antenna apparatus 83 receives signals, the same are split up into the individual directional characteristics by the feed network 88 and output individually via the signal outputs 810. Thus, in the shown example, the antenna apparatus 83 also comprises three signal outputs 810 when having three antenna elements 87 and three directional characteristics 89, respectively.

For further signal processing, the regulating apparatus 84 is provided that connects the signal outputs 810 to the information reading apparatus 86 and to the data processing apparatus 85, respectively. Here, the regulating apparatus 84 connects one signal output to the information reading apparatus 86 and the remaining signal outputs 810 to the data processing apparatus 85.

The information reading apparatus 86 and the data processing apparatus 85 both process the received signals and evaluate the same. In the shown configuration, both apparatuses 85, 86 evaluate the signals with respect to their physical characteristics. In that way, for example, both apparatuses 85, 86 determine a magnitude of the field strength of the signals or possibly also the phase values of the actually complex signals. The difference is, however, that only the information reading apparatus 86 also extracts information from the signals that are transmitted as data by the signals. This means only the information reading apparatus 86 can, for example, extract identification identifiers or, e.g., digital information from the signals. This higher evaluation is not provided by the data processing apparatus 85 in the illustrated configuration and the same evaluates the signals only, e.g. with respect to the amplitude or phase. In an alternative configuration (not illustrated), the data processing apparatus 85 also has the ability of extracting data.

The illustrated positioning apparatus 81 as a whole allows the evaluation of the received signals with respect to their physical characteristics and with respect to the information about the position of the transmitter 82.

In the shown example, these are each simultaneously received signals that result from radiation of the transmitter 82.

Here, the data processing apparatus 85 also receives data (e.g. the determined RSSI value) from the information reading apparatus 86 in order to determine, as a whole, the information about the position of the transmitter 82 or at least on the direction.

Since the transmitter 82 in the shown example is a passive transmitter in the form of an RFID transponder, the positioning apparatus 81 additionally comprises a signal source 811 that generates an excitation signal which is radiated via the antenna apparatus 83 and received by the transmitter 82 so that the same is able to radiate the signals in turn. Here, the transmitted information is at least an identification identifier of the transmitter 82.

In an alternative configuration (not illustrated), the signal source 811 and the reader 86 belong to one device. This is, for example, an RFID reader.

Thus, in one configuration, the positioning apparatus 81 allows the provision of amplitude and phase information of the received signals of the transmitters 82 or specifically RFID transponders that have been excited by one or several readers as respective information reading apparatus 86. This takes place with a multi-beam antenna as antenna apparatus 83 whose individual elements or antenna elements 87 are connected to a feed network 88, such as a Butler matrix.

Normally, such a beamforming network 88 has a plurality of inputs and outputs. By controlling at least one of these ports 810 (i.e. an input and output, respectively), a specifically formed directional characteristic (beam) 89 is formed for the transmission case. When feeding the other ports 810, a respective different beam shape results.

By using the feed network 88, one port 810 of the antenna apparatus 83 is connected to the signal source 811 (in an alternative configuration (not illustrated), the connection of the antenna apparatus 83 would be to the information reading apparatus 86) in order to send out the excitation signal with the respective directional characteristic 89. Thereby, the RFID transponders are excited as transmitters 82. The incident signals are tapped via the same port (i.e. via the signal output) 810 and directly provided to the RFID reader as configuration of the information reading apparatus 86, in particular essentially without signal power loss.

According to one configuration, by using the beamforming network as configuration of the feed network 86, merely one beam, i.e. only one directional characteristic is formed for the transmission case in the multi-beam antenna 83 at each time t.

In the receive case, however, the signal information of all beams, i.e. all directional characteristics are provided at the ports 810 of the feed network 88. Since these beams overlap in the present configuration (see FIG. 25), excited transponders 82 are also in partial portions in at least one of the residual receive beams. Since such a beamforming network 88 is not absolutely symmetrical in practice, also small signal portions drop at the (m−1) remaining ports 810 of the network 88 not connected to the information reading apparatus 86. In particular, the overlapping of the beams is used. Thereby, also signal portions of transponders excited by the active beam (port with transmitting/reading apparatus) drop at the remaining ports that are connected to the data processing apparatus 85. For directional estimation, this signal information is provided to electronics (data processing apparatus 85) directly integrated in the multi-beam antenna 83 or also externally available.

By a suitable switching logic, switching between the ports 810 of the beamforming network 88 in the shown configuration is performed. This means that the RFID reader 86 is continuously connected to all, but at the time t only to one input 810 of the network 88. Accordingly, the remaining ports 810 are also switched to the data processing apparatus 85 for directional estimation.

Thereby, after a specific time t1, a quantity of directional information in amplitude and phase are provided in dependence on the number of the antenna elements 87 and directional characteristics 89 and the switching time. The same can then be computed and possibly occurring erroneous information due to reflections and ambiguities can be detected and considered.

By such a multi-beam antenna 83 with respective beamforming network 88, the transmitting and reading path of the information reading apparatus 86 is almost not effected. By the superposition of the beams of a multi-beam antenna, transponders that are detected by at least one of the adjacent beams in the receive case are also excited, see FIG. 25.

Thus, the signal information can be tapped at the decoupled ports 810 of the feed network 88 which exactly do not correspond to the direct signal path of the reader 86 at this time without influencing the signal path of the reader 86. This is mandatory for the range of the reader and the error-free operation 86 since the power of the returned signal of the passive transponder 82 is very low. For that reason, the readers 86 have high signal sensitivity.

FIG. 25 shows schematically a plurality of transmitters 82 in the form of RFID transponders. Here, the four circles indicate four different directional characteristics 89. The signals received with one directional characteristic 89 (strong border) are supplied to the information reading apparatus 86 (indicated by the arrow).

There, the transmitted signals and also a value for the signal amplitude (the RSSI-value) are determined from the signals. The signals received with the remaining three directional characteristics 89 are supplied to the data processing apparatus 85.

It can be seen that directional characteristics 89 are superimposed (shaded area), such that, for the receive case, the signals of some senders 82 reach the information reading apparatus 86 and are also evaluated with respect to the position by the data processing apparatus 85.

FIGS. 26 to 36 show a fifth variation of the positioning apparatus.

Figure 26:
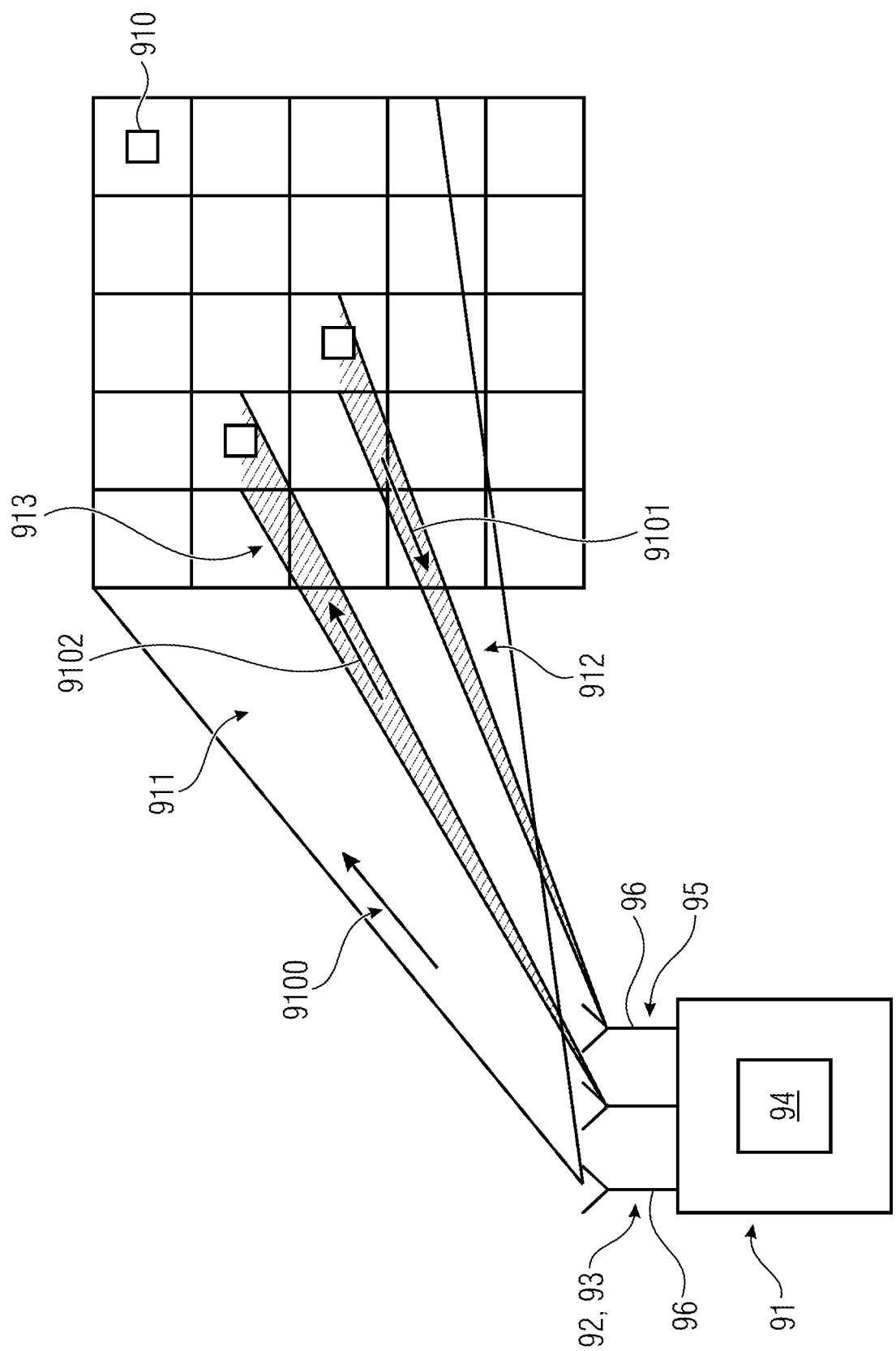
FIG. 26 shows a schematic structure of a position apparatus according to a fifth variation in the application.

The configuration of the positioning apparatus 91 in FIG. 26 includes a transmitting apparatus (TX) 92 and a receiving apparatus (RX) 93 as well as an antenna apparatus 95 comprising several (here 3) antenna elements 96 (e.g. parts of a patch antenna or dipole antennas, alternatives are, e.g. monopole antennas, monopole-type antennas, chip antennas or loop antennas). Here, the antenna apparatus 59 is configured as multibeam antenna. Here, the different beam-shaped directional characteristics can be switched, such that different spatial areas can be determined for transmitting and receiving signals via the antenna apparatus 95. Here, the directional characteristics are connected to spatially different receive sensitivities and transmission characteristics (or transmission sensitivities). Selecting the directional characteristics and the spatial areas, respectively, takes place via the control apparatus 94, e.g. in the form of a feed network.

The positioning apparatus 91 (an alternative term for the shown configuration is central radio unit) comprises a transmitting apparatus 92 and a receiving apparatus 93, here combined in one transmitting/receiving apparatus and using the antenna apparatus 95 comprising the three antenna elements 96 together. Control of the transmitting apparatus 92 and the receiving apparatus 93 and the transmitting and receiving function of the transmitting/receiving apparatus 92, 92 performed by the control apparatus 94. The control relates in particular to spatial areas where the signals are transmitted or from which signals are received, respectively.

In connection with the predetermination of individual directional characteristics and hence individual spatial areas, it will be discussed what is considered as omnidirectional emission or omnidirectional reception. In this case, depending on the configuration of the transmitting apparatus 92 and the receiving apparatus 93 and the available antenna apparatus 95, respectively, signals are transmitted and received, respectively, homogenously or by using a plurality of directional characteristics. Thus, there is no advantageous distribution. Thus, in one configuration for omnidirectional reception and omnidirectional transmission, all antenna elements 96 and all directional characteristics, respectively, that are available to the antenna apparatus 95 are used.

In the illustrated example, the antenna apparatus 95 comprises three antenna elements 96, by which the different directional characteristics can be generated. Here, one antenna element 96 has a large activation area 911 in which an activation signal 9100 is sent out. The activation signal 9100 serves to activate or wake up the communication apparatus 910 within the activation area 911 and is to transfer the energy necessitated for the communication in the form of a response signal 9101 to the same.

The communication apparatuses 910, i. e. the units indicated above as transmitter whose signals are represented according to the invention or are used for obtaining information to the represented are, in the illustrated embodiment, within a wall that is mentally divided into individual fields. The division into fields is performed in particular by the fact that the control apparatus 94 predetermines different receiving areas 912 for the receiving apparatus 93, from which the receiving apparatus 93 receives the response signals 9101 of the communication apparatuses 910. Thus, the receiving apparatus 93 samples the fields of the activation area 911. This can, for example, be performed row by row or column by column or in an arbitrary manner. In the shown configuration, the receiving areas 912 are partial areas of the activation area 911 to which the activation signal 9100 has been transmitted. Predetermining the receiving areas 912 takes place by switching the different directional characteristics of the antenna apparatus 95.

Thus, when activating the communication apparatus 910, a directional characteristic is used or the activation signal 9100 is sent out omnidirectionally to reach a large activation area 911. The response signals 9101 of the communication apparatuses 910 are received from smaller receiving areas 912 in order to obtain also information about the location of the communication apparatuses 910 as well.

From the received signals, on the one hand, information about the communication apparatus 910 is determined, i.e. an identification identifier. Additionally, the position of the respective communication apparatus 910 is determined from the signal in connection with the directional characteristic used for the reception.

Thus, the positioning apparatus 91 obtains from the received signals, here the response signals 9101, data about the position and identity of the existing communication apparatuses 910, such that also objects possibly connected to the communication apparatuses 910 can be identified.

After identifying and localizing the communication apparatuses 910, a specific communication with individual communication apparatuses 910 takes place. For this, a communication area 913 is predetermined, such that the communication signals 9102 to be sent out are only transmitted into the selected communication area 913.

In the areas 911, 912 and 913, arrows indicate in what direction the respectively allocated signals move. Here, the communication area 913 serves, possibly after transmitting a communication signal 9102 of the positioning apparatus 91, also to receive further signals originating from communication apparatuses 910 that sent out their signals into the communication area 913.

All in all, the positioning apparatus 91 allows the communication with, for example, movable objects or communication apparatuses 910 having, for example, autonomous power supply in form of batteries or energy harvesting generators.

The communication apparatuses 910 have a radio connection consisting, in one configuration, of a power-saving radio receiver, a radio transmitter as well as a computing and control unit. Optionally, sensors (e.g. photo diode or microphone) or actuators (e.g. engine or acoustic signal generator) can be provided.

At the observation time, the communication apparatuses 910 are distributed in space and are stationary at first. For easing the illustration and explanation, the communication apparatuses 910 are arranged, for example, in one plane or in two offset adjacent half planes (e.g. wall shelfs) and can be aimed at from the central radio unit, comparable to a collimated light beam from the antenna of the central radio unit, with a collimated radio beam (in the following also called beam).

Figure 27:
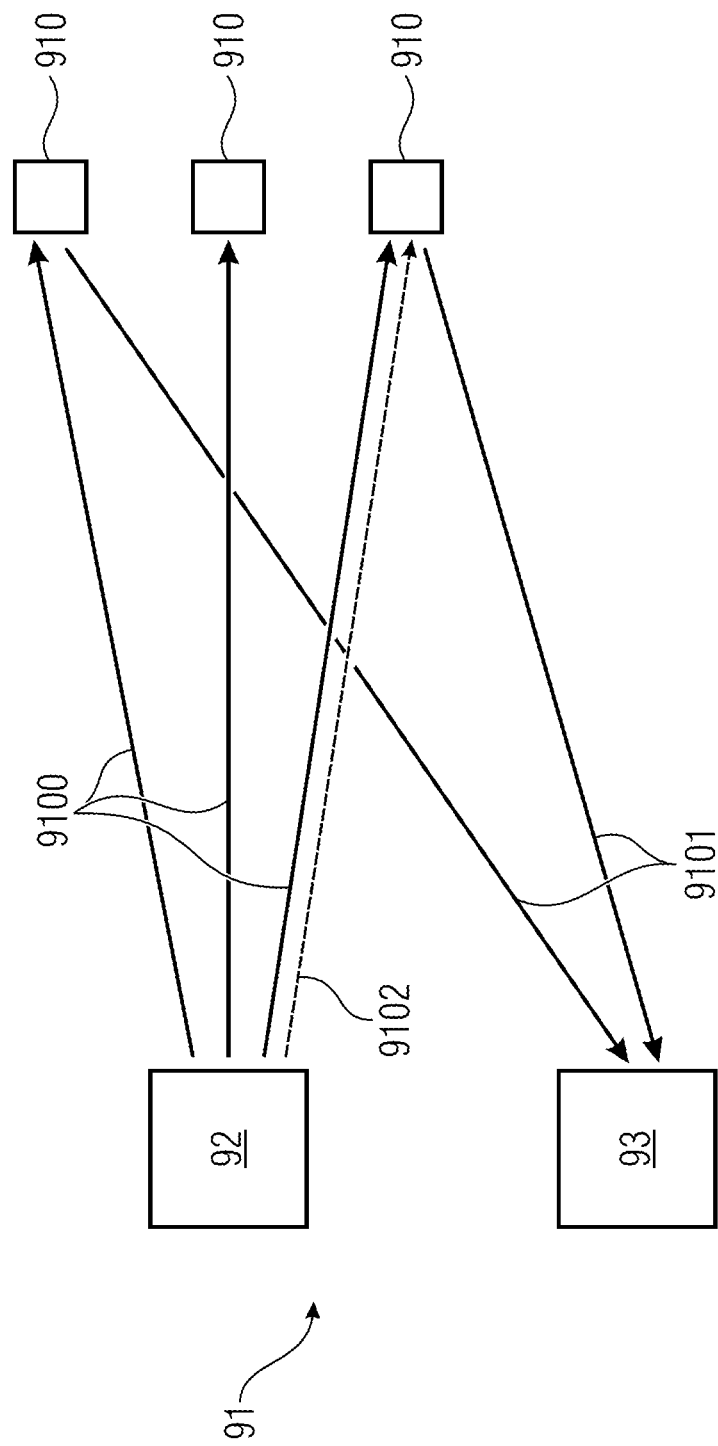
FIG. 27 shows a schematic diagram of an alternative implementation of the positioning apparatus according to the fifth variation during application.

FIG. 27 schematically illustrates the path of some signals. Here, the positioning apparatus 91 and the communication apparatuses 910 together form a communication system or a communication array.

In the illustrated configuration of the positioning apparatus 91, the transmitting apparatus 92 and the receiving apparatus 93 are separate components that also use different antenna apparatus, not illustrated herein for clarity reasons.

An activation signal 9100 is sent out to the three existing communication apparatuses 910 from the transmitting apparatus 92. In the shown configuration, the activation signal 9100 carries an identifier that indicates which communication apparatuses 910 are activated completely and are to transmit response signals. Thus, a so-called selective wake-up process is performed. Depending on the application case, objects are addressed individually via their respective ID (e.g. 16 bit sequence) and woken up. Waking up object groups (e.g. all objects of type 12 having the group ID "12") can be performed as selective wake-up process. This helps to keep current consumption within the objects low since unnecessary transmission processes are prevented. Further, selective wake-up is helpful when a very large number of objects is reachable and actually only a subset is of interest for the request. Thus, the non-addressed communication apparatuses 910 receive only the activation signal 9100 and read out the information that the same do not have to react any further.

In a further alternative or additional configuration, the transmitting apparatus 92 does not send out the activation signal 9100 in an omnidirectional manner as illustrated herein but into a narrow selected activation area 911. By this limitation of the area which the activation signal 9100 reaches, alternatively or additionally, a selection of the communication apparatuses 910 with which communication is to take place is performed.

In the shown case, by sending out the identifier, only the top and bottom communication apparatus 910 have been activated that each send out a response signal 9101. Response signals 9101 are received by the receiving apparatus 93 in that the directional characteristics of the receiving apparatus 93 move along or sample the communication apparatuses 910, here from top to bottom.

The position of the individual communication apparatuses 910 is determined from the two response signals 9101 in connection with the directional characteristics used for reception. Since, as for example common in RFID transponders, the response signals also include identification data of the communication apparatuses 910, the response signals 9101 allow identification of the individual communication apparatuses 910.

In the positioning apparatus 91, after sampling the fields (here three), the connection is given between the responding communication apparatuses 910 and their positions and the needed directional characteristics, respectively, with which one communication apparatus 910 each can be addressed.

Thus, subsequently, specific communication with individual communication apparatuses 910 is possible. For this, the communication area into which the communication signal 912 is sent out is predetermined. Thus, the communication area results in that a respective directional characteristic of the transmitting apparatus 92 is used for transmitting the communication signal 9102.

Here, exemplarily, the communication signal 9102 is emitted to the bottom communication apparatus (illustrates by the dotted arrow).

All in all, with respect to the embodiments, communication, identification and localization can be explained as multi-stage method, Step 1:

In a first configuration, activation of communication apparatuses is performed by activation signals (or also referred to as excitation signals) emitted in a directional or omnidirectional manner. These activation signals originate form a transmitting apparatus which, in one configuration, is part of a central radio unit (see FIG. 26) and in an alternative configuration a separate component (see FIG. 27). Thus, the excitation signal represents a request to the communication apparatuses to transmit a signal. Here, possibly, an identifier indicating which of the communication apparatuses are to respond is transmitted.

In an alternative second configuration of the first step, an initiation signal is sent out by at least one communication apparatus that this communication apparatus wants to establish communication. For detecting this, a receiving apparatus, which is, e.g. part of the stated central radio unit, receives signals omnidirectionally or accordingly with a number of available directional characteristics in at least one listening or hearing phase. Therefore, the receiving apparatus is active for signals from many different areas.

Thus, for a transmitting apparatus and a receiving apparatus respectively, the first step means that signals are sent to or received from a large and not necessarily specified area.

Step 2:

After the activation signal in the first configuration in step 1, the communication apparatuses (here also sometimes referred to as objects) respond with the response signal. Here, in one configuration, the response signal includes object-specific data that are, for example, identification data or measurement data etc. The response signals are received in a collimated manner in that the space and the respectively used antenna apparatus are sampled selectively by the available directional characteristics. This takes place sequentially or in parallel in that, for example, the received signals are allocated to the individual directional characteristics by a matching feed network. In one configuration, the communication apparatuses transmit response signals that include a preamble and the data actually to be transmitted. Here, in one configuration, the preamble includes an identifier of the communication apparatus. In one configuration, the data include measurement data detected by a sensor.

Here, the response signals are essentially received without delay and in parallel, respectively. In one configuration, this takes place by the plurality of different directional characteristics and the separation by a feed network (e.g. in the form of a Butler matrix) that is connected to the antenna apparatus. In another configuration, the different directional characteristics are switched so fast and thus the respectively different receive areas are switched so fast that all receive areas are passed within the time during which the communication apparatuses send out their response signals.

In a second configuration, mentioned in step 1, having a communication apparatus from which an initiation signal originates, the receiving apparatus allows, in one variation, that step 2 is skipped since, e.g. due to the separation of the received signals into the directional characteristics, it is already known by the initiation signal where the communication apparatus is. If this is not yet possible based on this signal, in a further variation, the space is sampled by individual directional characteristics. Alternatively, the initiation signal triggers step 1.

A course regarding the initiation by a communication apparatus is, for example, as follows:

A sensor connected to the communication apparatus determines an event at the time to.

Thereupon, the communication apparatus of the respective objects sends out the initiation signal. This radio message includes, for example, an ID, the sensor value and a statement on the type of the event or a time stamp of the event.

The receiving apparatus of the positioning apparatus is adjusted to the omnidirectional reception of signals and thus receives the initiation signal in that it actually receives the message immediately.

If the receiving apparatus has the option of separating the received signals into the directional characteristics, the same also has, together with the reception of the initiation signal, at the same the angular position and the matrix position, respectively, of the communication apparatus within the fields allocated to the directional characteristics.

In an alternative configuration, the receiving apparatus connects the individual directional characteristics, wherein switching between the fields can be accelerated since only one communication apparatus transmits.

All in all, after a preamble ($31*T_B$) and the duration of the data packet (16 bit ID and data, all in all between 64 and 128 bit), the information of the sensor event is provided in the data storage of the receiving apparatus (and the receiver and RX component of the central radio unit, respectively). Here, the information relates to the above stated content of the initiation signal.

Step 3:

In this step 3, the actual communication takes place, wherein radio telegrams are specifically transmitted by the transmitting apparatus and the central radio unit, respectively, via respective directional characteristics to the individual objects or fields as communication signals. The directed communication reduces possible interferences and allows a higher data rate with reduced transmitting power.

Here, in one configuration, after sending out the communication signal from the communication area, at least one signal is received. Here, the positioning apparatus selects one communication area into which the transmitting apparatus transmits the communication signal and from which the receiving apparatus receives at least one further signal, which is advantageously a response signal to the communication signal. Thus, in this configuration, bidirectional signal transmission takes place in the communication area.

Figure 28:
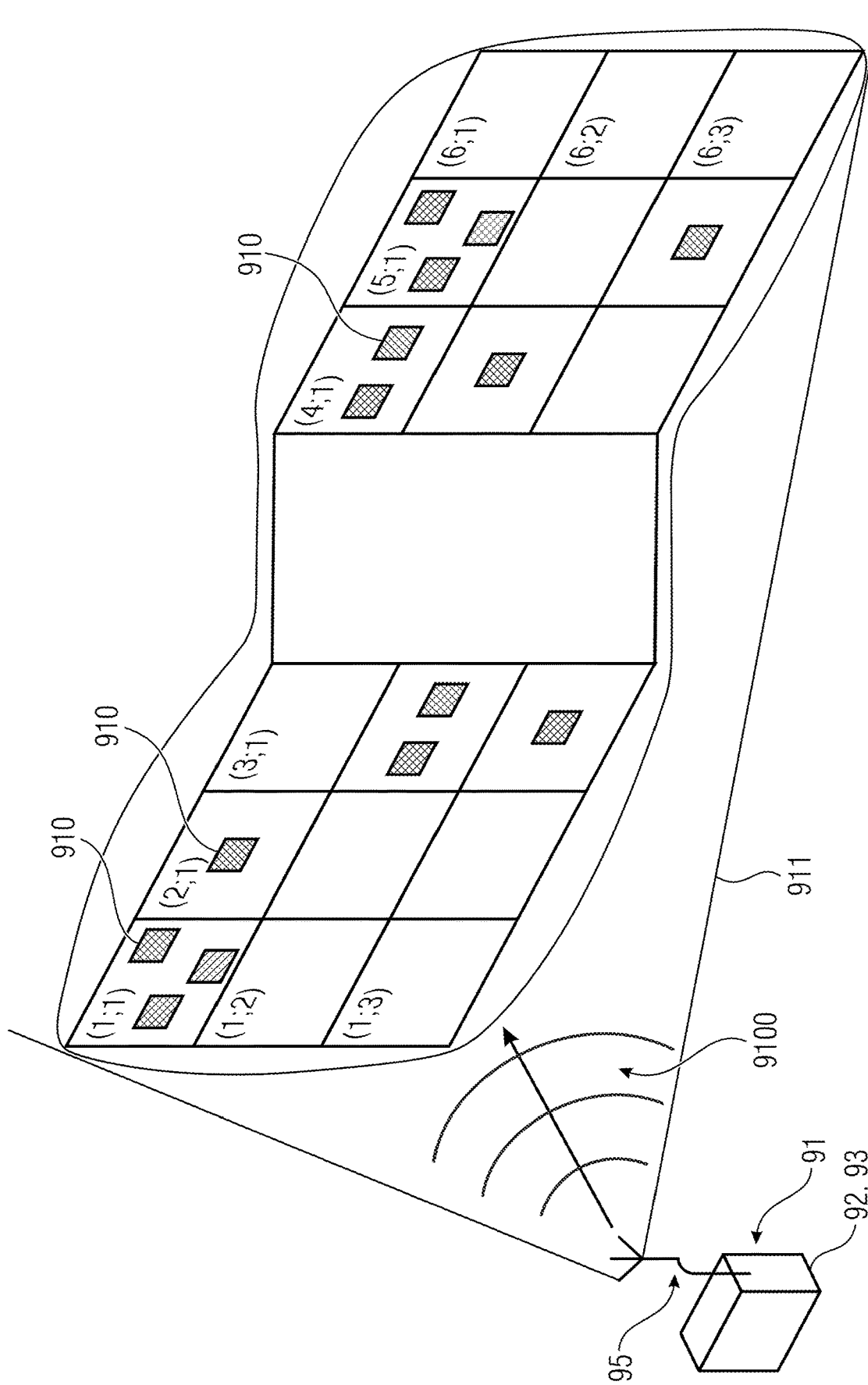
FIG. 28 shows a schematic diagram of step 1 of the communication with a further configuration of the positioning apparatus.

Steps 1 to 3 will be discussed again below in connection with FIG. 28 to FIG. 30. Here, the positioning apparatus 91 is illustrated with a transmitting apparatus 92 configured as a component and a receiving apparatus 93 as well as an antenna apparatus 95. Here, the positioning apparatus 91 is partly referred to as central radio unit.

Several communication apparatuses 910 are in the space in front of the central radio unit 91, each representing one object. The objects 910 are stationary and do not change their position. In the shown example, the directional characteristics of the antenna apparatus 95 allow the separation of the space into several fields that are indicated by coordinates (i; j) which result from the i-th column and the j-th row.

The spatial areas for transmitting and receiving the signals to be discussed are indicated, wherein arrows indicate the direction of the signals.

In step 1 illustrated in FIG. 21, an excitation signal 9100 that can be referred to as wake-up telegram is sent to all objects 910 simultaneously in the field of view of the (un)collimated antenna apparatus 95 by the central radio unit 91. In one configuration, the signal is an activation sequence having a duration of e.g. 30 ms. The objects 910 are configured accordingly to receive and detect the excitation signal 9100 as agreed activation sequence and thereupon prepare response signals for step 2. The objects 910 are now "woken-up".

After sending out the excitation signal 9100, the central radio unit 91 sets the multibeam antenna as an example for the antenna apparatus 95 to the first of the m*n fields of the object plane and switches to reception. If the transmitting apparatus 92 had been active at first, now the receiving apparatus 93 of the central radio unit 91 operates.

Figure 29:
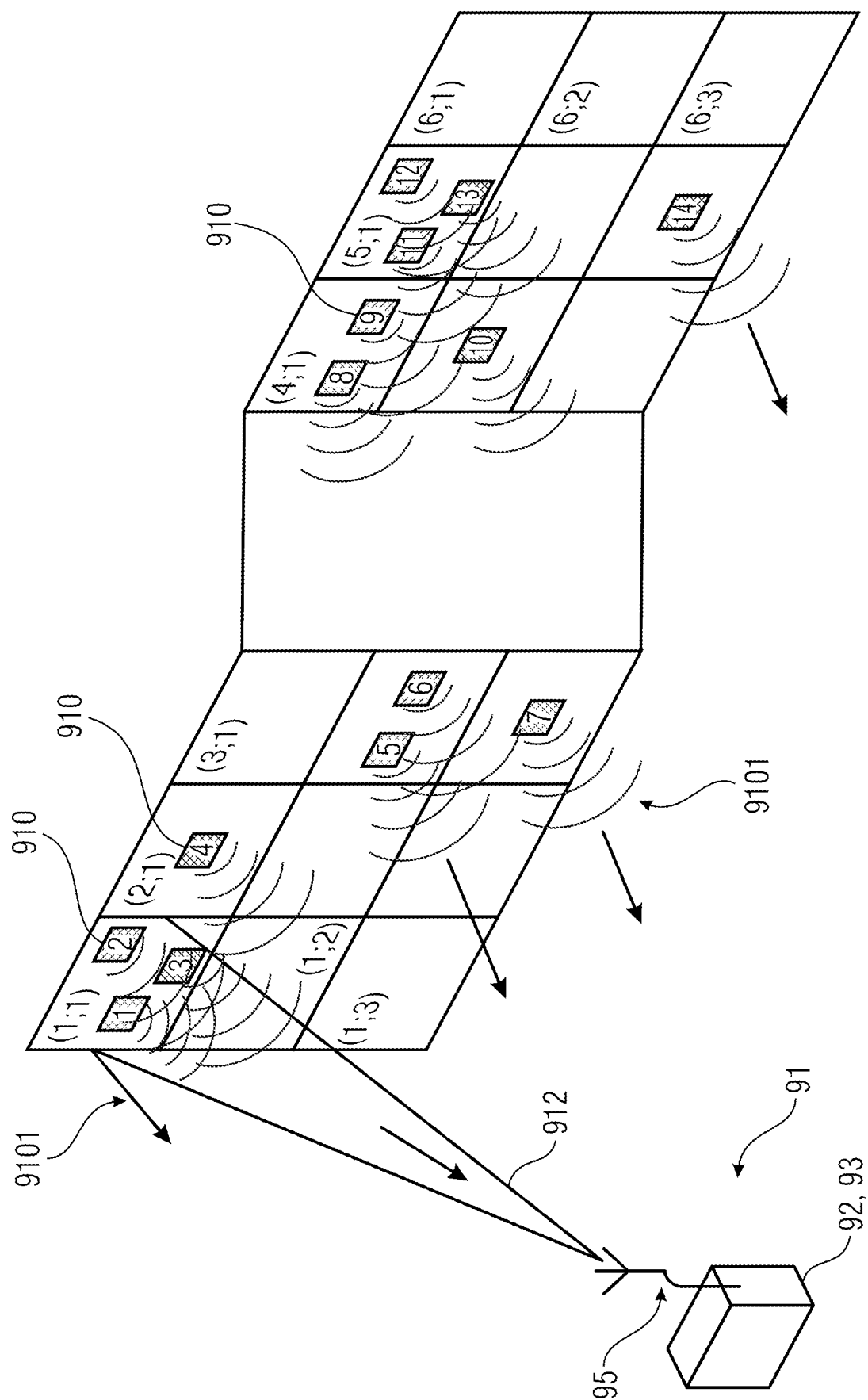
FIG. 29 shows a schematic diagram of step 2 of the arrangement of FIG. 28.

FIG. 29 shows how the woken-up objects 910 respond in step 2 and send their response signals 9101. Here, in the illustrated configuration, the response signals 9101 include a response preamble as well as object-specific information, such as ID identifier, serial number or status information. Further information can also be sensor values or data about last specific object events (e.g. vibration).

The configuration shows that from some fields several communication apparatuses 910 respond (here, these are fields (1; 1), (3; 2), (4; 1) and (5; 1)). If most response signals 9101 are separated in that the directional characteristics of the antenna apparatus 95 switch to different receive areas 912, a separation of the response signals 9101 is possible, e.g. via the identification separation.

In a further configuration, in the case that several objects 910 are arranged close to one another, a response delay takes place, which is derived, for example, from the individual ID identifier. The delay results, for example, from a 16 bit ID identifier modulo 5 multiplied with the response duration.

One example: An object 910 having the ID identifier 68 responds after 3.50 ms. An object 910 having the ID identifier 21 responds after 1.50 ms and an object 910 having the identifier 40 responds immediately without any delay. By separating the times at which the individual signals are received from a field or receive area, the separation with respect to the individual communication apparatuses 910 results.

In the case that the objects 910 specify the respective receive level of the activation radio sequence 9100, e.g. as RSSI value, according to one configuration, adaptation, in particular reduction of the transmitting power for the radio answer to be provided is performed for reasons of power saving, longer battery run time and also lower secondary emissions to neighbors.

Figure 30:
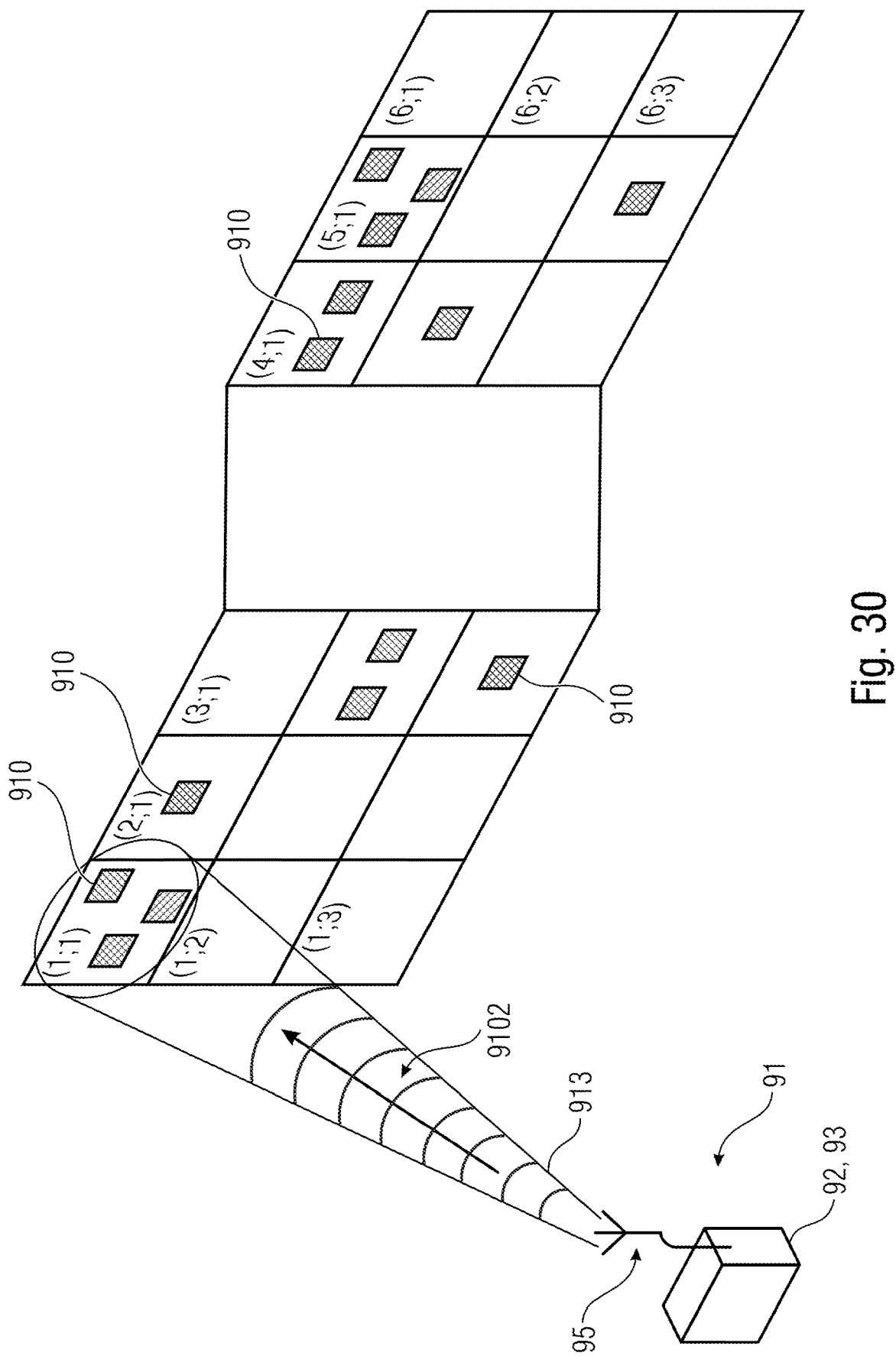
FIG. 30 shows as schematic diagram of step 3 of the arrangement of FIG. 28.

FIG. 30 illustrating step 3 shows the specific communication of the positioning apparatus 91 with the objects 910 of a field (1; 1).

Starting from the localization and identification of the communication apparatuses 910, the central radio unit 91 can now specifically address objects 910 in specific fields with collimated beam direction of the antenna apparatus 95 and carry out further communication, possibly even with higher data rate. For this, the transmitting apparatus 93 sends out the communication signals 9102. The reception of signals transmitted thereupon by the communication apparatus of the selected communication area 913 also takes place with a selected directional characteristic. In one configuration, the same directional characteristic is used for receiving further signals.

A possible reduction of the fields to be irradiated to a significantly smaller subset is useful for a specific duration, e.g. from 6*8 to, for example, 12 fields. A field-by-field emission of the field coordinates (location information) by the central radio unit to the objects 910 in the respective fields results in individual knowledge of the location of the objects 910.

Multihop methods when forming ad-hoc sensor networks and fast determination of neighborhood ratios among the objects 910 is possible by this information (propagation of location information by the collimated field-by-field radio transmission) in an efficient manner. Multihop method means the transmission of data packets across several intermediate stations. Thus, in one configuration, the communication apparatuses 910 communicate with one another.

After the specific duration, again, a complete field irradiation of all m*n fields can take place and the method can be started again in step 1.

The temporal frequency of the method according to step 1 to 3 determines the possible update rate of the detected objects 910 and their presence and identity, respectively. Movement processes of objects 910 can be detected in that manner, such that when an object 910 passes through different fields sequentially and responds for the method according to step 1 to 3, respectively. Indirectly, even the direction of movement within the fields (and a projection, respectively) and the object velocity can be inferred.

Figure 31:
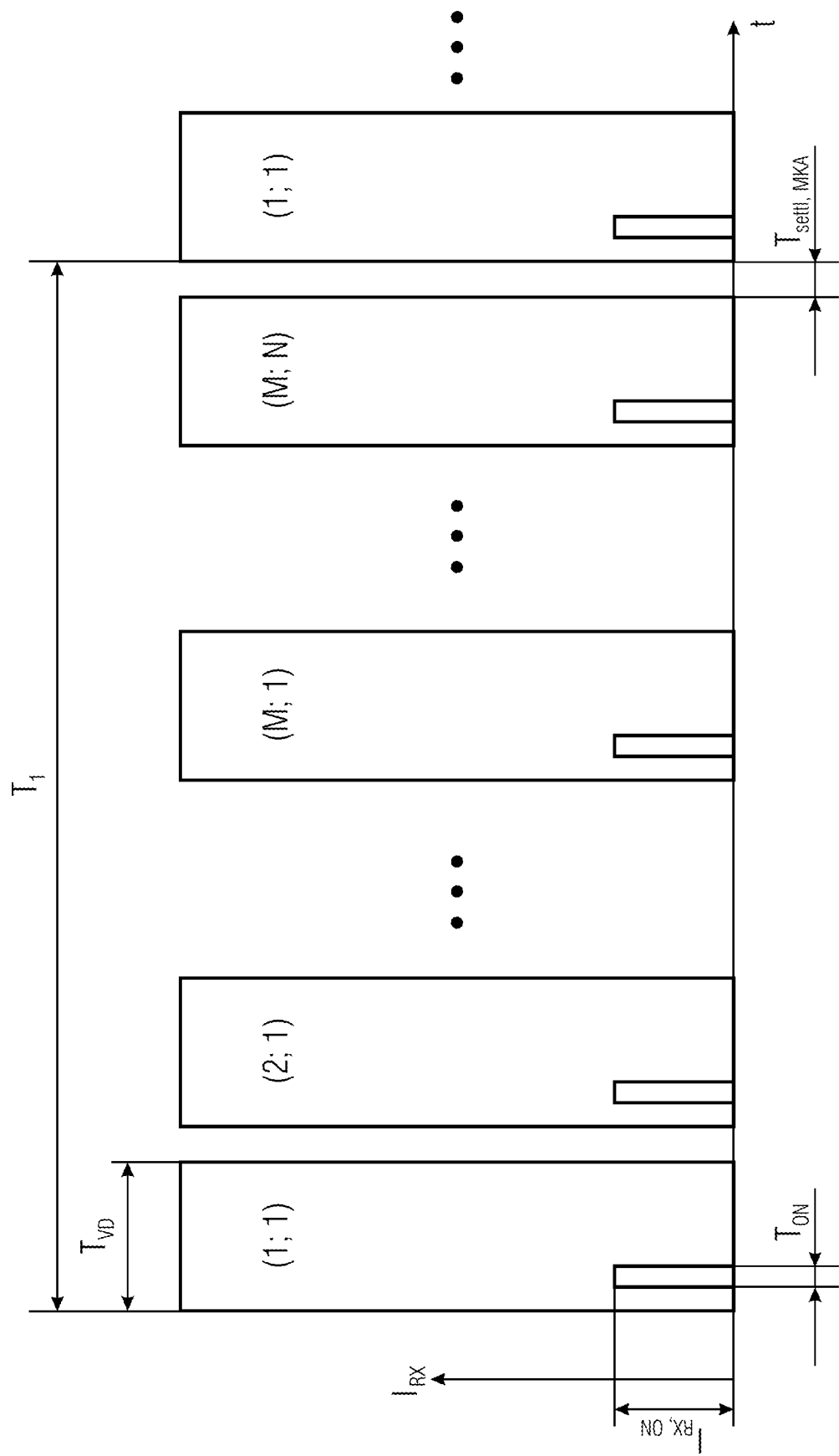
FIG. 31 shows a schematic illustration of a temporal sequence of passing through fields.

FIG. 31 shows an embodiment for a temporal sequence of the field passage with short sampling. Also, some exemplary numerical values will be given.

The sampling of M*N fields having coordinates (i; j) is illustrated, wherein i=1, M and j=1, ..., N. The sampling of all fields takes place within the duration $T_1$.

The communication apparatuses send out their response signals with a specific data rate $1/T_b$ or slower, e.g. 1 kbps. Within the retention duration $1/T_{VD}$, the central radio unit receives the radio signals from the selected field (i; j) selected via the directional characteristic. The retention duration $T_{VD}$, i.e. the time for which a directional characteristic is active and hence signals are received from the receive area is, in this shown configuration, at most:

$$T_b/(m*n).$$

The symbol duration $T_b$ as duration of the response signals is 1 ms. Here, with the directional characteristics M*N=10*10 fields are sampled.

The retention duration $T_{VD}$ of the receive area, i.e. the beam, on each field is:

$$T_{VD}=T_b/(M*N)-T_{settl,MKA}.$$

Here, $T_{settl,MKA}$ is the settling time for the directional characteristic per field. Here, $T_{settl,MKA}$=100 ns. This results in $T_{VD}$=1 ms/100−100 ns=10 μs−100 ns=9.9 μs.

Further, the switch-on duration of the receiving apparatus $T_{on}$ is illustrated. In this time, the response signals are received while the beam, i.e. the beam of the respectively switched directional characteristic is in the field (i; j). The switch-on duration is very short (in particular $T_{ON} \ll T_{VD}$, e.g. $T_{ON}$=100 ns) such that energy can be saved on the side of the receiving apparatus. This has the advantage of a high operating duration. At the same time, a power-saving receiving apparatus allows, for example, the usage in the home field or generally needs less maintenance.

In the time $T_{ON}$, a signal sample is received and processed. This can take place in the form of amplitude, frequency or phase modulation. The amplitude of the receive signal is processed within $T_{ON}$ since this can frequently take place in a power-saving manner (comparable to a diode detector).

In particular, $T_{ON}/T_0 \ll 1$ and possibly $T_{ON}/T_0 \le 1\%$. Here, the time $T_0$ is given by: $T_0=T_{VD}+T_{settl,MKA}=T_b/(M*N)$. Thus, this is the time between two respectively sampled fields.

The receiving apparatus of the positioning apparatus and the central radio unit, respectively, has, as ON current, i.e. as current requirement for receiving and processing received signals, the value: $I_{RX,ON}$.

Thus, as an average current consumption of the communication apparatus, the following results:

$$\overline{I_{RX}} = \frac{T_{ON}}{T_0} \cdot I_{RX,ON} = \frac{T_{ON} \cdot M \cdot N}{T_B} \cdot I_{RX,ON}.$$

$I_{RX,ON}$=1 mA. Then, an average current consumption $\overline{I_{RX}}$ of 10 μA results, for example for $T_{ON}$=100 ns and $T_0$=10 μs. This allows the operation of battery-operated communication apparatuses for several years.

A further variation for accelerating the method and for saving energy, respectively, is enabled by the following configuration.

For the case that the objects of interest and the allocated fields (x; y), respectively, have already been determined by evaluating the preambles of the response signals, there are several variations for further action with respect to the m*n field matrix:

In one variation, the further fields are sampled with the existing sampling rate $f_{MKA,MUX}$ and the same data rate $f_{sample,RX}$. This enables complete uninterrupted processing of all possible m*n transmit signals. No synchronization effort is needed between the transmitting objects or with the receiving apparatus and the central radio unit, respectively.

In an alternative variation, the number of "irradiated" beams onto the fields that have already been localized with the evaluation of the preambles of the response signals is reduced: If, for example, only five fields are identified, the beam could be limited to the five locations instead of all m*n. In the case of 10*10 fields, an increase of the sampling rate $f_{MKA,MUX}$ by the factor 100/5=20 would be possible, which is accompanied by a 20-fold data rate for the receiver.

After a specific termination criterion (e.g. a predetermined interval or the fact that no radio data are received anymore from the field), the reduction of the detected fields can be cancelled again and the complete m*n detection, i.e., the detection of the response signals across all m*n fields can be performed.

Alternatively or additionally, in the case of detecting a preamble sequence within m*n fields, the retention duration $T_{VD}$ of the beam per field is shortened, e.g. from 10 μs to 1 μs, which enables a more frequent detection, i.e., a higher data rate $1/T_b$. Here, no transmission data of other objects from the field are lost. After a specific termination criterion (for example a predetermined interval or the fact that no radio data are received anymore from the field), the original lower sampling rate $f_{MKA,MUX}$ can be set again. This enables power-saving reception of the response signal in that the transmission data with higher data rate are received only during actual demand. Usually, $\overline{I_{RX}}$ is only slightly increased.

After the retention duration $T_{VD}$ has expired, the next field is controlled by the beam. For this, the antenna is switched to a different directional characteristic. The order of the targeted m*n fields can be continuously increasing or decreasing, arbitrary or heuristically.

The method is performed for all fields and needs, at the most, as much time as the length of a data bit ($T_b$). Thereby, no transmission data are lost.

After detecting all m*n fields, the method is repeated for the next data bit. In that way, the received bit sequences are stored in the m*n data buffers of the receiving apparatus and the central radio unit, respectively.

If needed, in one configuration, the method is used in an oversampling manner, i.e. more than one sample is taken per field, e.g. four samples. For this, the retention duration has to be selected four times shorter accordingly. The data processing unit runs with bit clock $1/T_b$ and can perform the detection of specific preambles or correlation patterns with little delay in order to be able to determine the actually given response of the respective object with a specific certainty.

In this case, several conclusions can be drawn:

In the respective field, an object has successfully received the activation radio sequence in the form of an activation signal, decoded the same and transmitted a response signal. Thus, at the same time, the field position (i; j) is known. In that way, the presence of radio objects can be stored, for example in intermediate storage. Together with the identity identifier (ID) sent out subsequently by the object, the allocation field position (i; j) and object ID can be performed. Thus, from the point of view of an angular estimation originating from the central radio unit, the object is localized.

If several positioning apparatuses are used next to one another, the location in space can be inferred by skillful arrangement of at least partly overlapping angular fields. For the case if only one positioning apparatus is used, the distance within an angular field can be inferred together with the receive field strength or a number derived as "received signal strength indicator" (RSSI). If RSSI-detection without radio obstacles is possible for calibration purposes with the used positioning apparatus, the distance and possible obstacles or shadings in the angular field can be inferred.

The directional gain that can be obtained by beam collimation in the beam can be used both on the transmitter side and on the receiver side, e.g. by reduced transmit power and by reduced minimum sensitivity in the receiving apparatus, respectively. Apart from that, directed communication in the sense of "space diversity" is possible with little or very little secondary send outs outside the respective main beam of the individual directional characteristics. The latter is in particular for the case when the antenna apparatus is a multi-beam antenna where the directional characteristics each comprise one dominant beam.

The positioning apparatus is configured particularly favorable for the operation when power-saving radio receivers having little reaction time, e.g. wake-up receiver circuits or the same are used in the objects and in the central radio unit. For example, the receiving apparatuses according to DE 10 2009 047 199 A1 should be named. If both the communication apparatuses as well as the central radio unit are configured in a respective power-saving manner, battery-operated implementations needing little maintenance with operating periods of years can be provided on the side of the object but also on the side of central radio unit.

In the specific case that the method according to step 1 is only performed relatively seldom, e.g. every 2 minutes, but the receive case with the sampling detection of all m*n fields by means of power-saving radio receivers (step 2) is provided most of the time, current consumption can essentially be reduced to the receiver current consumption on the side of the central radio unit as well as on the side of the object.

Additionally, the sampling method allows spontaneous sending out of radio telegrams on the object side. Coordination or synchronization can then be omitted. If objects only radiate radio messages in an event-driven manner, the increased current consumption on the object side only depends on the frequency of such events. There is basically no numerical limitation of the object number. Extending or changing the object number is possible.

The method is configured with very little delay and allows fast detection of object events and represents a significant technical improvement of wireless radio systems for implementing wired objects in the sense of "Internet of Things".

Figure 32:
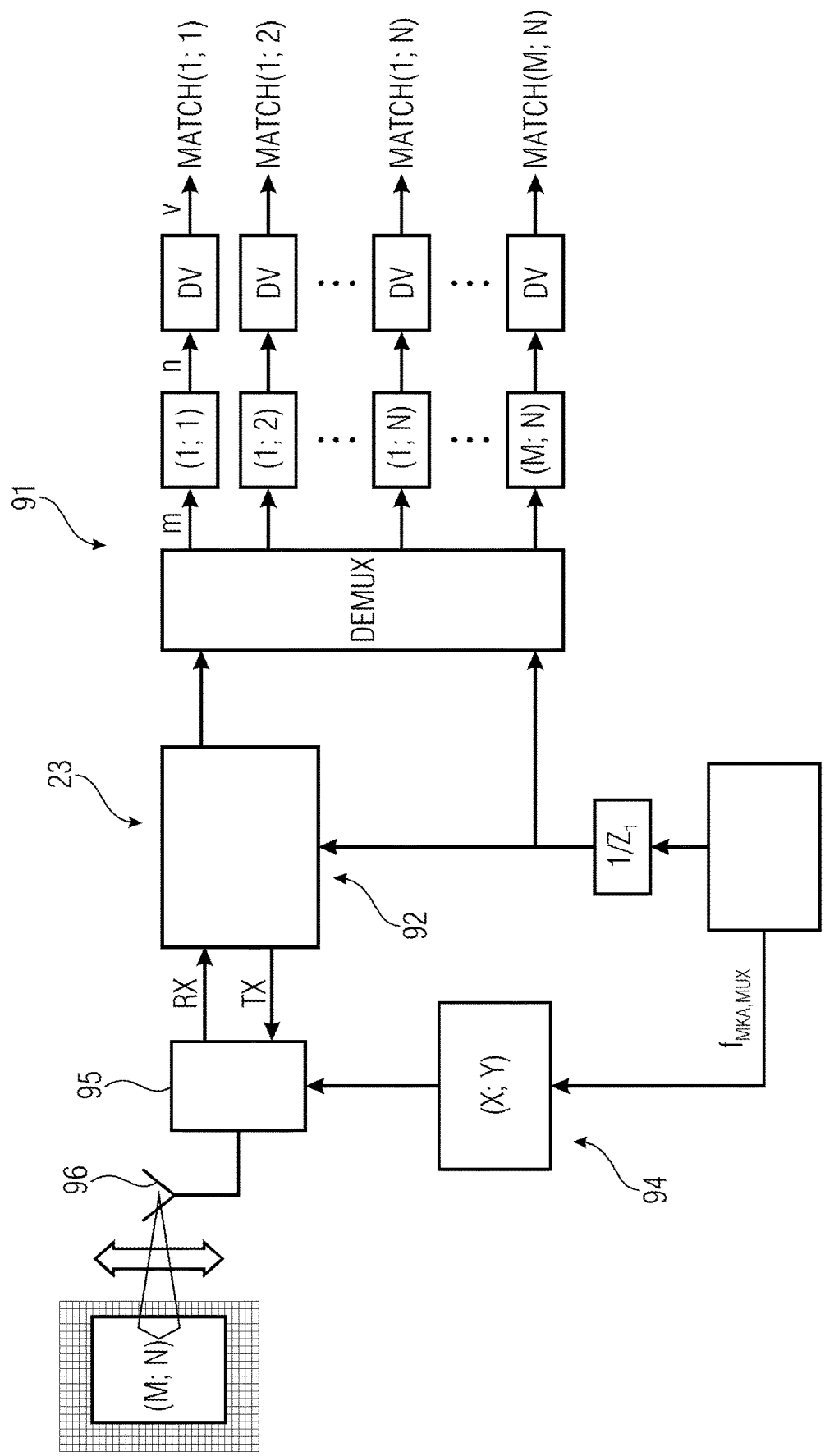
FIG. 32 shows a schematic illustration of the components of a positioning apparatus in the form of a block diagram.

FIG. 32 shows a configuration of a structure of the central radio unit 91 with antenna control, sampling unit and data processing.

Here, the antenna apparatus 95 comprises several antenna elements 96, only one of which is illustrated herein, and is connected to an apparatus here operating as receiving apparatus 93, illustrated by the arrow indicated by RX and as a transmitting apparatus 92, illustrated by the arrow indicated by TX. This is a power-saving transmitting/receiving apparatus, here operating as sampling ASK/OOK demodulating radio receiver. Alternatively, Frequency Shift Keying, (FSK) is used for data transmission.

The control apparatus 94 selects the individual directional characteristics of the antenna apparatus 95 and determines the (x; y) coordinates of the fields that are connected to the directional characteristics and from which (response) signals are received and into which (communication or activation) signals are transmitted. Additionally, the control apparatus 94 receives, from a clock source, the frequency $f_{MKA,MUX}$ for sampling the fields, i.e. for switching the directional characteristics in order to obtain the individual receive areas. In the illustrated configuration, the connected data rate $f_{sample,RX}$ is supplied, to the transmitting/receiving apparatus and as sampling frequency to the demultiplexer.

The received data, e.g., in the form of ASK/OOK data or FSK data can be described as binary data stream having the word width n. The simplest case of the word width 1 bit is provided, for example, in the simple 2-ASK or OOK demodulation.

The data are transferred to a demultiplexer (here referred to as DEMUX) having n outputs, each connected to one of all in all n receive data buffers and a respectively allocated data processing unit DV. The detected bits of the receive signals are then sorted and stored in a data buffer for the M*N receive bit sequences of the respective length L. The M*N receive data buffers are configured, e.g. as shift register of the length L with the word width n. For simplicity reasons, the same are configured similarly.

The data processing units DV each generate a match (i;j), allocated to the individual fields (i;j). This is, for example, performed as a pattern detector with our without error tolerance in order to detect the answer preamble of the respective communication apparatus with a specific certainty. The data processing units DV perform data coding or data analysis. For fast localization, in one configuration, correlation analysis is used as digital calculation of the cross correlation for determining the similarity of a transmitted identification sequence to a respective reference sequence. The data processing units DV provide, e.g., a decoded data stream or, e.g. a digital signal having the word width v, referred to as MATCH(m;n) for displaying the correspondence of transmit and reference sequence.

If as a transmit sequence, i.e. as response signal, a sequence suitable for cross correlation analysis is used (e.g., when the autocorrelation function of the reference sequence is a similar to a time discrete Dirac impulse), the successful match of transmit and reference sequence can be determined easily and receive-error tolerant in a digital manner. In this case, the respective MATCH(m;n) signal can be generated as a purely binary signal when a numerical comparison of a matching factor with a decision threshold is used. The transmitted sequence can be configured as combination of a preamble for correlation and data part.

In this configuration, the radio response of the communication apparatuses is sent out from the area with m*n fields as 2-ASK modulated (amplitude-shift keying, wherein the amplitude of the carrier signals is changed for transmitting data) response signal. In a specific case, this takes place as On-Off-Keying (OOK). In On-Off Keying, the carrier signal is switched on and switched off to transmit a logic 1 and a logic 0, respectively. For this modulation case, demodulation in the receiver can be performed by simple decision with analog comparators.

In this way, reception and detection of the data bit of a duration $T_b$ originating from an object within the field (i; j) can already be performed after the switch-on time $T_{ON}$ (see FIG. 31).

Here, the timing of the localization will be explained again in other words:

The beam of the positioning apparatus 91 having a multi-beam antenna as antenna apparatus 95 directed in the interlaced scanning samples the M*N fields (here, e.g. 10×10) within a symbol duration (here 1 ms) in 100 steps with 10 μs and provides the antenna receive signal to a power-saving sampling radio receiver. The same takes a "short sample" of the RF signal within the beam retention duration $T_{VD}$ (9.9 µs) with the receiver switch-on duration $T_{ON}$ (here, e.g. 100 ns).

This sample is supplied to the 1-to-(M*N) demultiplexer in an ASK/OOK demodulated manner for further digital signal processing. There are M*N shift registers (indicated by (1; 1) to (M; N)) for buffering the receive data samples. For each of the M*N shift registers, there is a sequence and preamble detection, which can be implemented, e.g. as digital cross-correlator of the length 31 bits. This is performed by the data processing units DV.

If the agreed preamble is detected in an error-tolerant manner for the respective M*N data vector, the (x; y) position within the M*N field matrix is known automatically and without any delay: angular estimation is performed by the agreed allocation beam angle and matrix allocation.

Figure 33:
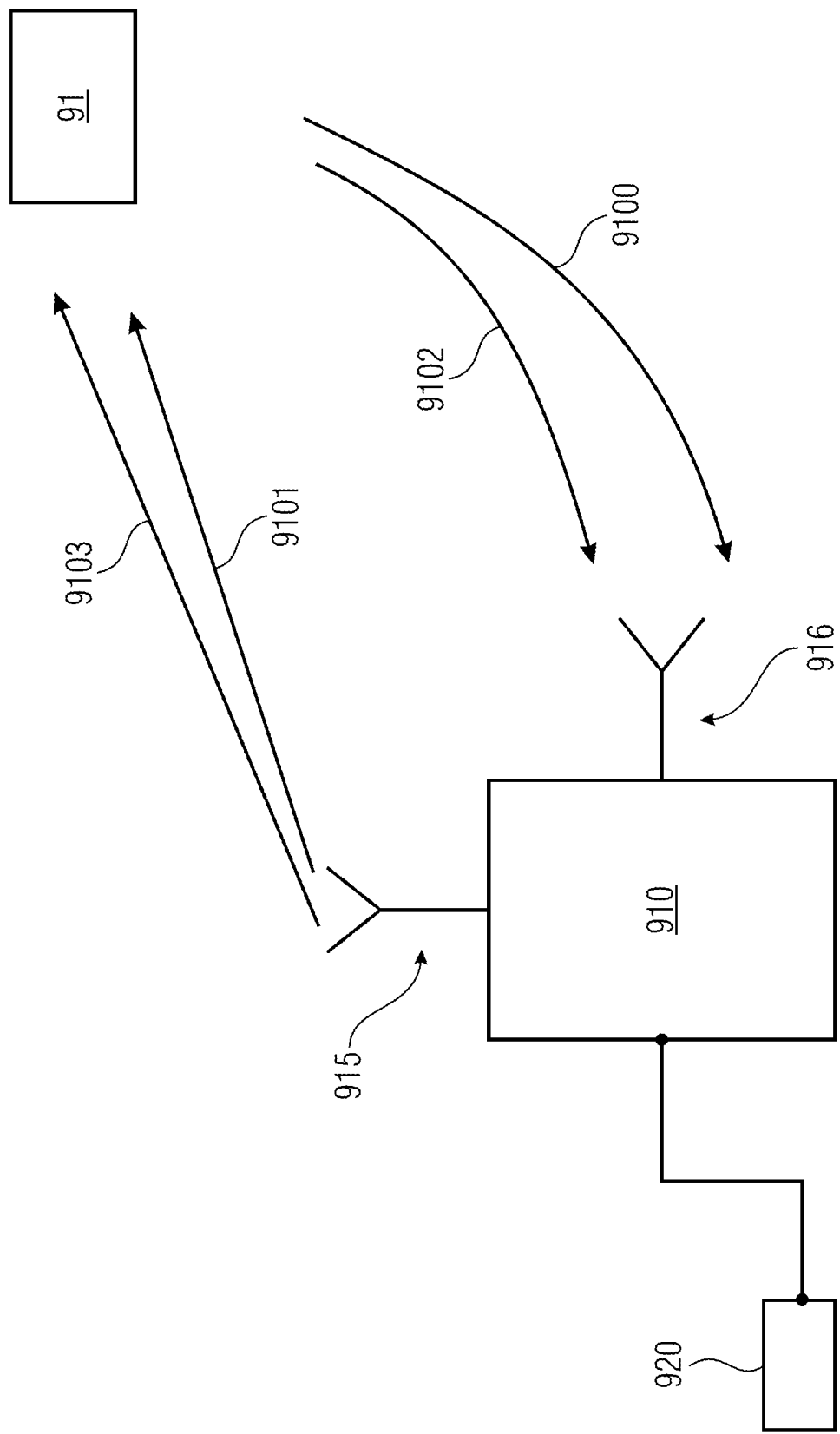
FIG. 33 shows a schematic illustration of a positioning apparatus with a communication apparatus.

FIG. 33 shows schematically a communication apparatus 910 having a transmission apparatus 915 and a detection apparatus 916, which are here two antenna elements of an antenna apparatus and also represent different directional characteristics. Here, the communication apparatus 910 is configured, for example, according to the disclosure of DE 10 2009 047 199 A1. In a simple case that is not illustrated herein, the communication apparatus 910 is an RFID tag or an RFID transponder. Starting from this power-saving configuration of the communication apparatus 910, in one configuration, the positioning apparatus 91 itself is also such an energy-saving unit as it is disclosed in DE 10 2009 047 199 A1. Here, the positioning apparatus 91 is provided with the antenna apparatus having the differently selectable directional characteristics for transmitting and receiving electromagnetic signals.

With the transmission apparatus 915, the communication apparatus 910 sends out an initiation signal 9103 to cause the positioning apparatus 91 to send out an activation signal 9100. Here, this activation signal 9100 causes, that the communication apparatus 910 receives more energy for the further or actual communication. Thereupon, the communication apparatus 910 sends out its response signal 9101, in order to transmit, here as an example the measurement data of the sensor 920. Here, the sensor 920 is, for example, a temperature sensor.

In the next step, the positioning apparatus 91 sends out a communication signal 9102 for exchanging, e.g. further data with the communication apparatus 910.

Here, the transmission initiative comes from the communication apparatus 910 and the object comprising the communication apparatus 910, respectively, (not illustrated). For example, the object wants to initiate the positioning by the central radio unit 91 and thus radiates a wake-up sequence or another suitable previously agreed-upon sequence in the form of an initiation signal 9103 to the central radio unit 91. In one configuration, for receiving such initiation signals 9103, the central radio unit 91 has an omnidirectional characteristic. In an alternative configuration, for example, the existing beam-shaped directional characteristics of the antenna apparatus are operated sampling row-by-row across all fields.

When receiving the initiative message of the object, the central radio unit 91 determines the object position (and the field coordinates, respectively). This takes place, for example by splitting up the receive signals according to the individual directional characteristics or by specifically switching the individual directional characteristics.

If the object 910 also sends out its ID as radio message, the central radio unit (i.e. the positioning apparatus) 91 additionally knows the connected information between the object ID and the object field number and the object location, respectively and the needed directional characteristic, respectively. This connection can remain with the central radio unit 91 or can be displayed via the inventive apparatus or, in one configuration, can be returned to the object 910 itself, e.g. as part of the communication signal. The approach of transmitting the location information is recommended, for example, when objects 910 are newly added in the detection area of the central radio unit 91 or when objects 910 move or are moved. Then, when applying the initiation signal multiple times, the object 910 can prompt the step-by-step detection of the entire movement or can also quickly determine the vacation of the detection area ("tracking and tracing").

In one configuration, the initiation signal is connected to the above-described process of selective wake-up and activation.

In that way, selective waking-up can relate to all moved objects and only these objects send out the respective radio response for positioning by the central radio unit. Thereby, the radio traffic can be limited to the moved objects and all positions (field numbers) can be determined continuously and with little delay.

Further fields of application are, in particular, environments where an RFID-based detection in the near field (distance<<10 m) is not possible, e.g. for space reasons or the same.

In a configuration (not illustrated), several central radio units are used, each comprising antenna apparatuses, in particular in the form of multi-beams antennas. Therewith, the accuracy of positioning from the mere field number to the position in space can be improved. Additionally, redundancy and lower estimation errors are effected. In that way, for example with two offset central radio units, shading by spontaneously introduced obstacles can be detected and positioning can still be performed.

The arrangement of the objects and communication apparatuses can also be performed as matrix or set of floor plates as well as ceiling plates. If each floor or ceiling plate is provided with a power-saving radio receiver and radio transmitter as well as a computing and control unit, i.e. generally a communication apparatus, and optionally sensors, sensors can, e.g. detect the proximity of a movable object or a person and can then initiate the communication with the central radio unit in the sense of the above-described steps, e.g. by the initiation signal. In that way, for each floor plate, driving or stepping on the same can be registered individually and at the same time be transmitted to the central radio unit with little delay. Other sensory events, such as illumination or reduced luminosity by shading can also trigger the initiation.

In a further configuration, the objects and the communication apparatuses, respectively, are arranged, for example, in a large area, such as a car park, a delivery warehouse, a field, etc. Here, the invention enables the localization of the objects (e.g. a transport container, a grid box, a vehicle, or the same) with one communication means 910 each in the entire arrangement. For this, depending on the configuration, one or several radio units 91 are used, whose signals radiated as beam characteristic irradiate, depending on the configuration, the entire area or partial areas. In one configuration, several central radio units 91 are used for higher reliability, more accurate determination and accuracy. In one configuration, the same divide the area to be irradiated into several sectors. Here, in one configuration, the communication means 910 is attached to the outside of the respective objects, e.g. on a car roof with a magnet.

In the above configuration, the method for determining the object position within the field by orienting the beam-shaped antenna characteristic is performed, as described in the above paragraphs. Depending on the application, the antennas with variable beam-shaped radiation characteristic are set up at greater height, e.g. on masts or rooftops, so that a view to the communication means 910 of the objects is a free as possible, and hence larger ranges are possible. The method serves, e.g. for fast localization of objects, containers or vehicles (persons or living beings are also possible) on a large area.

Figure 34:
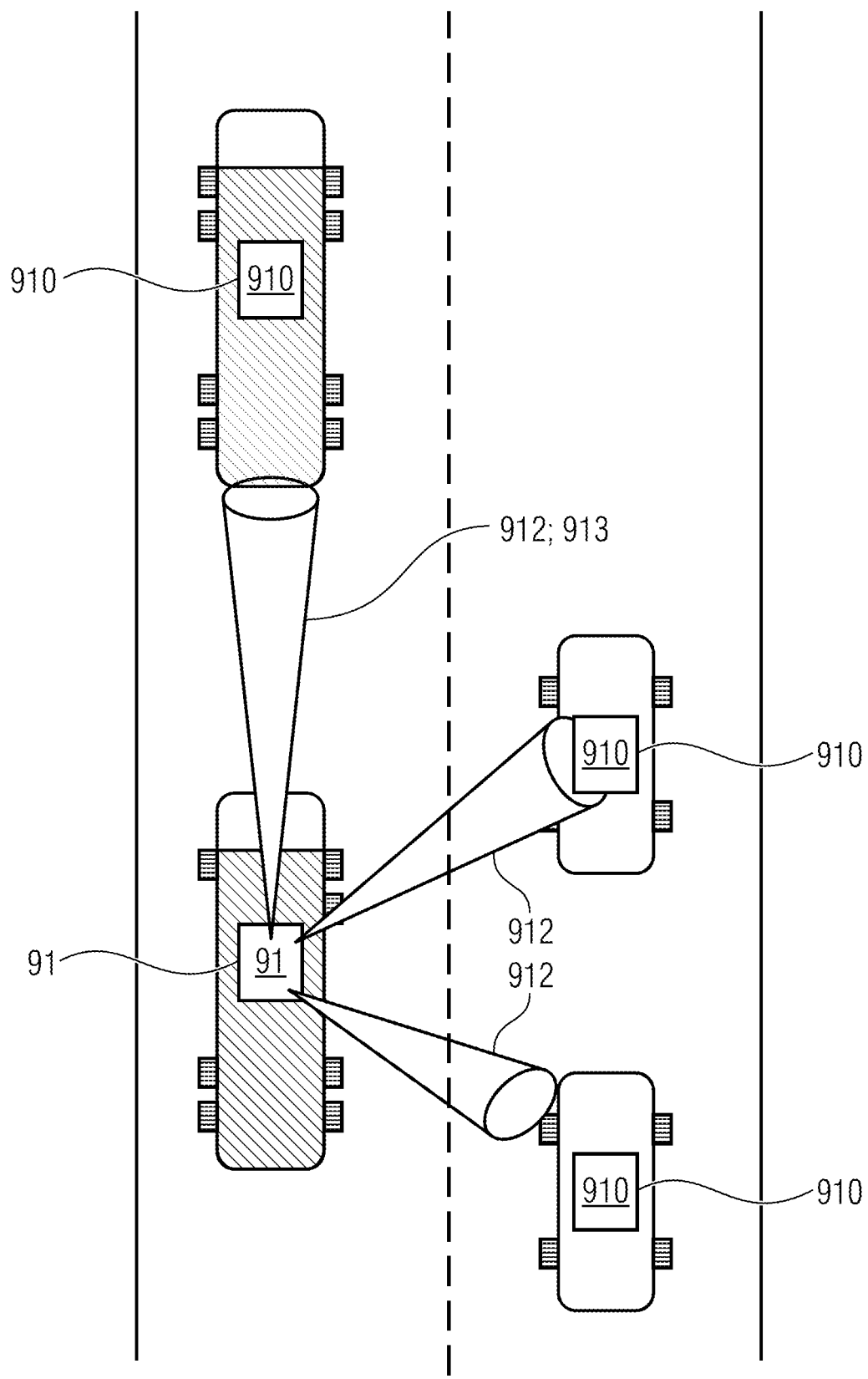
FIG. 34 shows a schematic illustration of a first application scenario.

FIG. 34 shows a case of application where the positioning apparatus 91 is installed on a vehicle, e.g. a truck.

Further vehicles have respective communication apparatuses 910. The central radio unit 92 communicates with the communication apparatus 910, such that the communication area 913 is directed to this vehicle driving in front. This serves, for example, to adjust and regulate, respectively, the driving velocities in order to maintain a constant velocity. The receive areas 912 are directed to the two other communication apparatuses 910, here the cars that are overtaking. Thus, the positioning apparatus 91 receives signals from there and can also at least determine from the signal strengths of the received signals whether the objects are still in the range of the receive areas 912. Further, the communication are 913 can be redirected accordingly to the other objects so that communication can also be realized with them.

Thus, this is an example for car-to-car communication and enables the communication of vehicles with one another or with other road users. Via the communication area 913, in particular, bidirectional communication takes places with another vehicle, while the other receive areas 912 listen what vehicles might also want to communicate. Starting therefrom, accordingly, switching between the directional characteristics is performed. A possible frequency range is, for example in the wireless LAN 5.9 GHz band. The data about the other vehicles can be represented via the inventive apparatus. Thus, in one configuration, a velocity of the other vehicles is determined and represented from the received signals.

Figure 35:
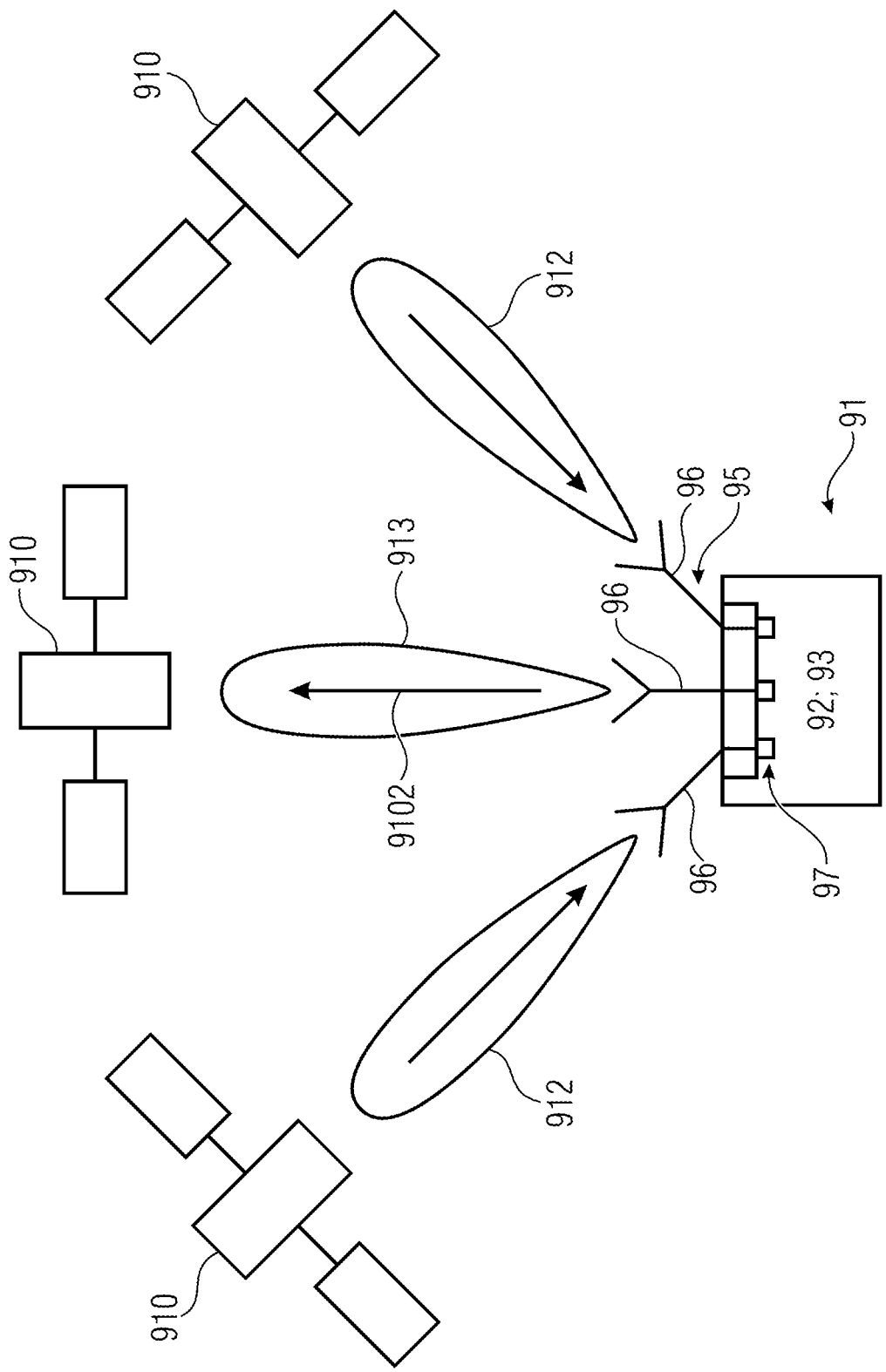
FIG. 35 shows a schematic illustration of a second application scenario.

In a similar configuration, shown in FIG. 35, the objects having the communication apparatuses 910 and that are even the communication apparatuses 910, respectively, are satellites. Thus, this is about communication between satellite 910 and ground on which the positioning apparatus 91 resides, or between several satellites.

Here, the antenna apparatus 95 as a multi-beam antenna is connected to a feed network as control apparatus 94 having several ports 97.

The directional characteristic that is allocated to the communication area 913 and that serves for bidirectional communication and at least sending out the communication signal 9102 is directed as transmit/receive beam across a port 97 of the feed network 94 in a specific direction. At this port 97 of the feed network 94, bidirectional communication between the positioning apparatus 91 (also the central radio unit) and the communication apparatus in the form of the selected satellite 910 takes place. At the other ports 97, listening is performed (receive case), i.e. the other directional characteristics are used as mere receive areas 912 from which only signals (indicated by arrows) are received and into which no signals are sent out by the positioning apparatus 91. Via these other directional characteristics and the allocated ports and signal outputs 79, respectively, of the feed network 94, further satellites 910 can be localized and accordingly be represented for the user by the invention, If the connection via the communication port and the communication beam, respectively, deteriorates, switching to a different beam and a different directional characteristic, respectively, can be performed, which possibly allows improved communication (e.g. higher signal level) with a different satellite.

The station on the ground and the position of the positioning apparatus, respectively, can also be a vehicle having one or several antennas attached at any position which have to be tracked since the vehicle moves.

Figure 36:
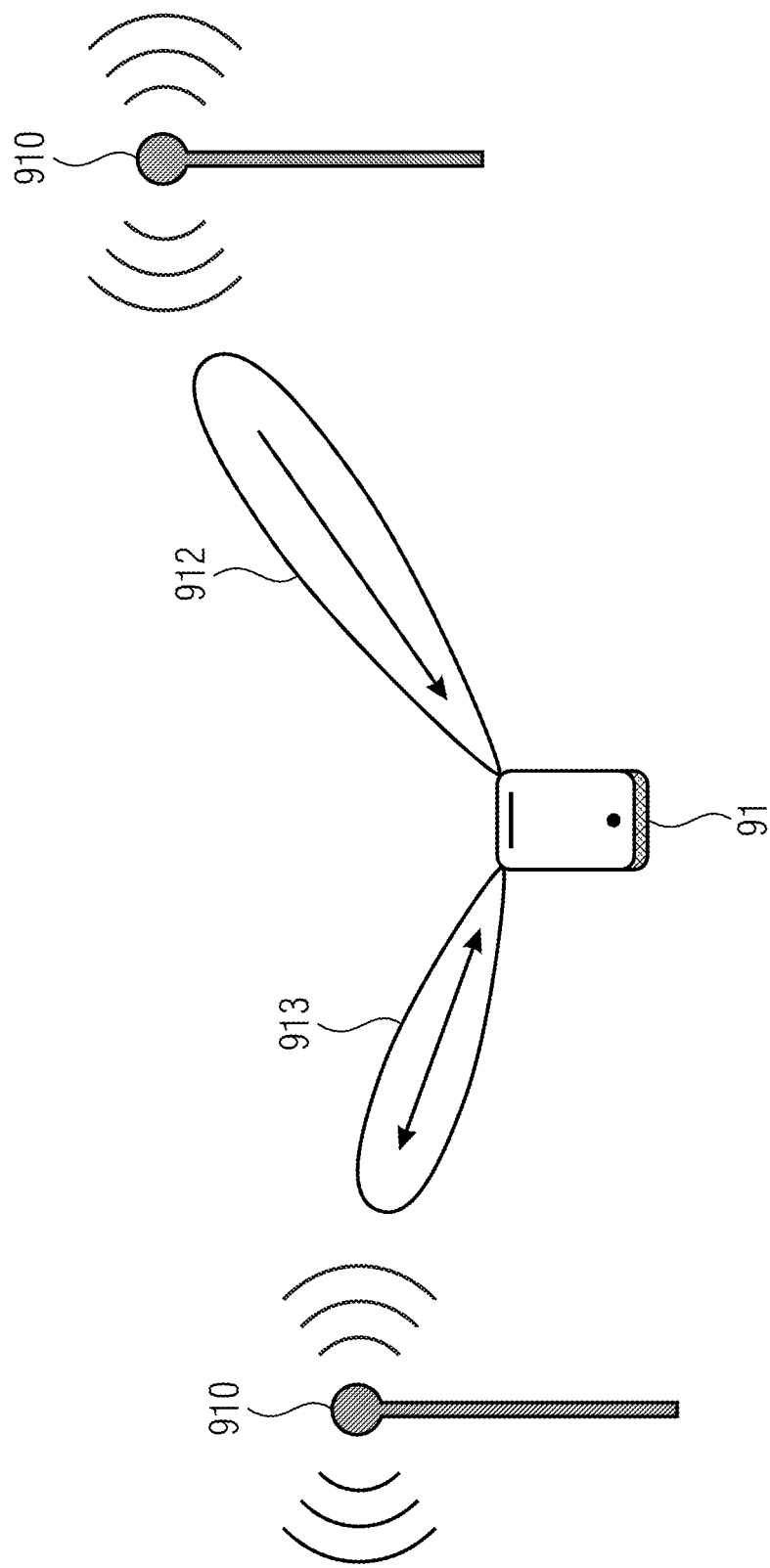
FIG. 36 shows a schematic illustration of a third application scenario.

FIG. 36 shows an application in the mobile radio range.

In mobile radio, the clients (e.g. mobile phone or smartphone) communicate with so-called base stations which are arranged in a distributed manner. The base stations are normally arranged at masts such that, in total, some sort of omnidirectional characteristic results. Normally, the client also has an omnidirectional antenna. However, frequently, cases of coverage or shadings occur.

Here, the illustrated smartphone is the positioning apparatus 91 and is equipped with a multi-beam antenna (not illustrated). This allows the determination of the communication area 913 in the direction of a so-called radio mast as configuration of the communication apparatus 910 as well as the receive area 912 in the direction of a further radio mast 910. This allows communication and simultaneous determination of a specific base station 910 with significantly higher gain (directivity), possibly depending on the time or on the distance to the same.

The shown arrows indicate that the positioning apparatus 91 only receives signals via the receive area 912 (simple arrow in the direction of the positioning apparatus 91) and that the positioning apparatus 91 transmits and receives signals via the correspondence area (double arrow in both directions).

If there are cases of coverage or greater distances to a base station 910, starting from detecting the signal levels of other base stations 910, the remaining receive paths of the multi-beam antenna can pivot the beam for the communication specifically to other base stations 910. In that way, it is possible that the beam is directed to the base stations having the best signal strength.

If, for example, the positioning apparatus 91 moves more towards the right side, the base station 910 there offers better reception.

FIGS. 37 to 50 show a positioning apparatus according to a sixth variation.

Figure 37:
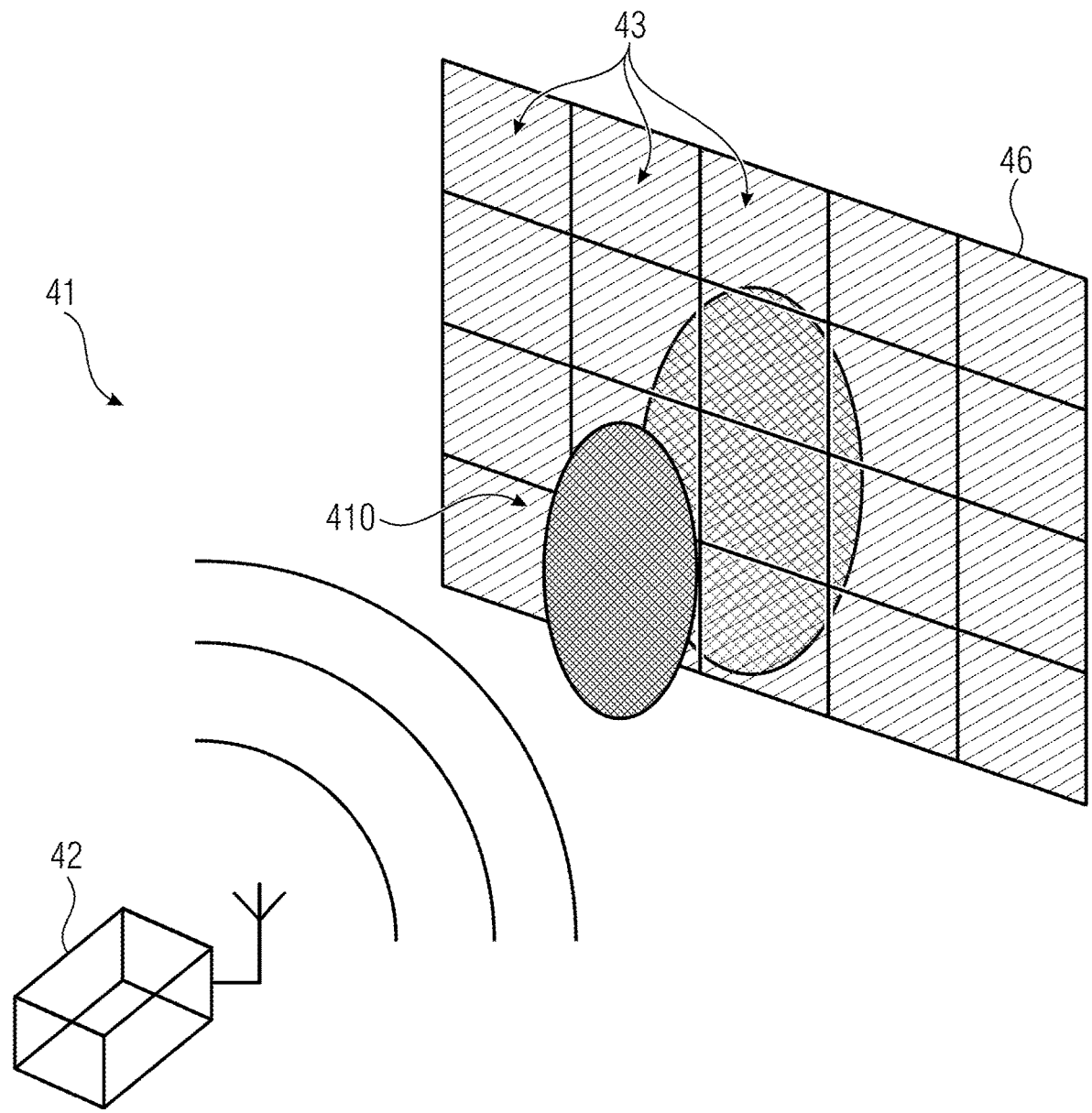
FIG. 37 shows an exemplary structure of the positioning apparatus according to a sixth variation.

FIG. 37 shows as basic diagram an exemplary structure of the positioning apparatus 41 for detecting an object 410. The positioning apparatus 41 comprises a transmitting apparatus 42 (another term for it: central radio unit), here, for example, operating as transmitter and spaced apart therefrom receiving apparatuses 43 (another term for it: radio module) that is attached to a wall 46 with a segmentation into twenty partial areas in total, or that form these partial areas, respectively. The receiving apparatuses 43 are, for example, the antenna apparatus as part of the inventive apparatus for representing user information.

Here, the transmitting apparatus 42 is a multi-beam antenna (MBA) operating as transmitter and receiver. Here, OOK modulation is used. Here, OOK stands for so-called on-off keying where the carrier signal of digital information is switched on and off in order to transmit a logic 1 and logic 0, respectively.

The receiving apparatuses 43 allow also receiving and transmitting of signals. According to the segmentation, there are M*N (here 5*4) wake-up detectors (see, e.g. the disclosure DE 10 2009 047 199 A1). In the shown example, the current consumption of the receiving apparatuses 43 is less than 20 µA.

The receiving apparatuses 43 (in the following also referred to as radio modules) are, at the time of observation, arranged regularly in the wall 46 and do not move at first. The radio modules 43 are targeted by the configuration of the transmitting apparatus 42 (in the following partly referred to as central radio unit) with a concentrated radio beam as signal (in the following also called "beam").

In one configuration (not illustrated), the receiving apparatuses 43 are arranged via floor plates as well as ceiling plates. In one configuration, each floor or ceiling plate is provided with a power-saving radio receiver as receiving apparatus and a central radio transmitter as transmitting apparatus. In a further configuration, additionally, sensors, e.g. infrared sensors, heat or humidity sensors are provided that detect the proximity of a movable object or person and then cause the central radio unit, i.e. the transmitting apparatus to send out the signals. Thus, for each floor plate and each receiving apparatus, respectively, passage or stepping on can be registered individually and can be determined by the central radio unit simultaneously for all floor plates with little delay. Other sensory events, such as illumination or reduced luminosity by shading can also activate the transmitting apparatus by respective sensors.

An exemplary sequence for detecting an object 410 will be explained based on the following steps. Here, the statements apply accordingly for additional or alternative configurations. Additionally, not all steps are obligatory in all configurations.

The method consists of the following steps or stages:

Step 1: collimated sending out of a signal from the transmitting apparatus 42 to a respective receiving apparatus 43.

Step 2: sending out a response signal from the receiving apparatus 43 in the case that signal attenuation can be determined.

Step 3: setting the signal for next field and continue with step 1.

Step 4: discretization of the RSSI and attenuation values that result from the response signals.

Step 5: form classification and derivation of motion vectors of the object.

When covering the receiving apparatuses 43 by the object 402, reference is made to the shadow cast which makes the object 43 seem larger. For this effect, a configuration (not illustrated) provides that the receiving apparatuses 43 are distributed such that also a distance of the object 410 to the holding apparatus 46 can be determined.

Figure 38:
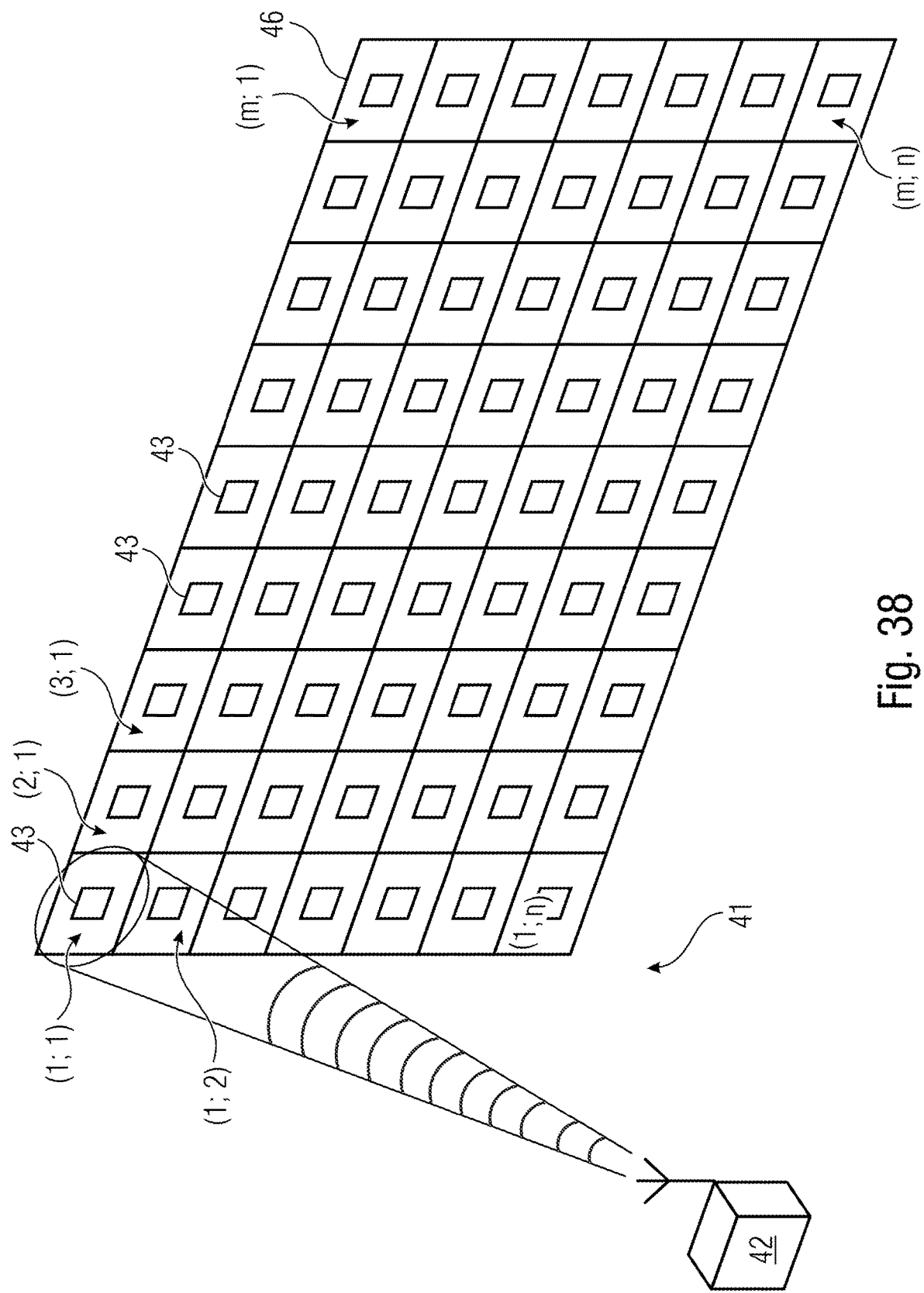
FIG. 38 shows a state in which signals of the transmitting apparatus are applied to the receiving apparatuses.

FIG. 38 shows the case that the transmitting apparatus 42 configured as multi-beam antenna is directed to a first field of a radio module wall 46 with its directional characteristic and hence with its main radiation direction. Here, the directional characteristics relate to spatially different emission characteristics, wherein each directional characteristic is characterized by one beam.

By switching the different directional characteristics, in the shown embodiment, the main beam is guided over the fields of the walls 46 and hence over the receiving apparatuses 43. The M*N fields will be referred to below by (i; j), wherein i=1, 2 ... m and j=1, 2 ... n.

Subsequently, a radio telegram referred to as wake-up telegram and signal, respectively, will be transmitted to the receiving apparatus 43 in the first field (1; 1). This can be an activation sequence having a duration of, e.g. 30 ms.

The receiving apparatus 43 receives the activation sequence, in particular agreed in advance, in the transmitted signal and also detects the same. Thereupon, the receiving apparatus 43 prepares a response signal for the above step 42. The radio module as receiving apparatus 43 in the first field (1; 1) is now "woken up" and active, respectively.

In one configuration, for example for refined determination of the signal attenuation between the transmitting apparatus 42 and the receiving apparatus 43, a specific signal will be additionally sent out by the transmitting apparatus 42 in one field (i; j).

The power-saving receiving apparatus 43 detects the transmitted signal and determines an RSSI value, for the signal amplitude, as digital value. If the RSSI value determined by the signal amplitude is above an expected RSSI set value, which has been determined, e.g. in a specific calibration in advance in an obstacle-free environment, the RSSI value determined by the respective computing unit in the receiving apparatus 43 results in the action in the above Step 2, i.e. the receiving apparatus 43 outputs a response signal. Here, this is performed, for example, via radio signals.

In Step 2, in the illustrated configuration, the receiving apparatus 43 refrains from a return answer in the form of sending out a response signal to the transmitting apparatus 42 as central radio unit in the following case: for the case applies that the RSSI difference, which is defined as difference between the currently determined RSSI value ($RSSI_{set}$) and an expect set value ($RSSI_{expected}$): $RSSI_{actual}$–$RSSI_{expected}$ lies below a predetermined threshold (the attenuation limiting value). In an alternative configuration, the attenuation limiting value is related to a proportional value for the determined amplitude relative to the expected amplitude.

For the case that the RSSI difference is greater than the threshold, depending on the configuration, either the determined $RSSI_{actual}$ value or the RSSI difference ($RSSI_{actual}$–$RSSI_{expected}$) or a respectively discretized amount will be returned as radio telegram by the receiving apparatus 43 as radio module in the field (i; j) back to the central radio unit 42.

For checking the complete operability of the receiving apparatus 43 in the field (i; j), in one configuration, by specific request by the transmitting apparatus 42, either the $RSSI_{actual}$ value or the RSSI difference, given by $RSSI_{actual}$–$RSSI_{expected}$ is returned as radio telegram and response signal, respectively.

For the case that no objects are in the optical path between transmitting apparatus 42 and receiving apparatus 43, the responses of the receiving apparatus 43 are omitted. Thereby, the receiving apparatuses 43 can stay tuned most of the time to reception and consume only the current needed for the respective power-saving radio receiver. Thereby, operation of the radio module wall 46 with batteries involving little maintenance is possible for several years.

In Step 3, the directional characteristic of the switchable multi-beam antenna 42 is directed to a next field.

The order of the targeted m*n fields can be continuously increasing or decreasing, by rows or columns or also in diagonals or also arbitrary or heuristic. Determination of the respective RSSI value is performed as described in Step 1 and 2.

After detecting all m*n fields, all in all, in the example discussed herein, a matrix of the individual RSSI values ($RSSI_{actual}$)i, j and the determined deviations from the respectively expected RSSI value ($RSSI_{actual}$–$RSSI_{expected}$) i, j results. Thus, this is a measurement cycle that can be considered as image of the space between the transmitting apparatus and the receiving apparatus.

In the following, as an exemplary attenuation value for the individual fields having coordinates (i; j) is defined as follows:

$$ATTEN_{i,j} = (RSSI_{actual} - RSSI_{expected})i,j.$$

Depending on the attenuation of the radio signal in the beam for a field (i; j) when passing through an object that lies between the transmitting apparatus 42 and the receiving apparatus 43 in the wall 46, respective level values $ATTEN_{i,j}$ give information about the obstacle and object, respectively, to be detected.

Here, the attenuation depends on a material and the thickness of the object in the respective optical path as well as on the frequency of the radiation.

FIG. 39 shows a possible matrix $ATTEN_{i,j}$ that results during the passage of the beam through a test object and where the determined attenuation factors are stated in decibel.

In Step 4 of the exemplary configuration, the matrix of FIG. 39 for simplified calculation will be discretized with 1 to k decision thresholds ($ATTEN_{threshold,i}$).

In one configuration, a rule for forming the discrete path attenuation classes disk_$ATTEN_{i,j}$ results as follows:

When $ATTEN_{threshold,S-1} < ATTEN_{i,j}$ and when $ATTEN_{i,j} \leq ATTEN_{threshold,S}$, then disk_$ATTEN_{i,j} := S$.

If for the example of FIG. 39 two decision thresholds $ATTEN_{threshold,1} = 15$ dB and $ATTEN_{threshold,2} = 25$ Db are predetermined, the matrix of the discrete ATTEN values of FIG. 40 results.

For power-saving further processing, discretizing with only one decision threshold is provided. In this case, matrices having the binary entries 0 or 1 result.

Figure 41:
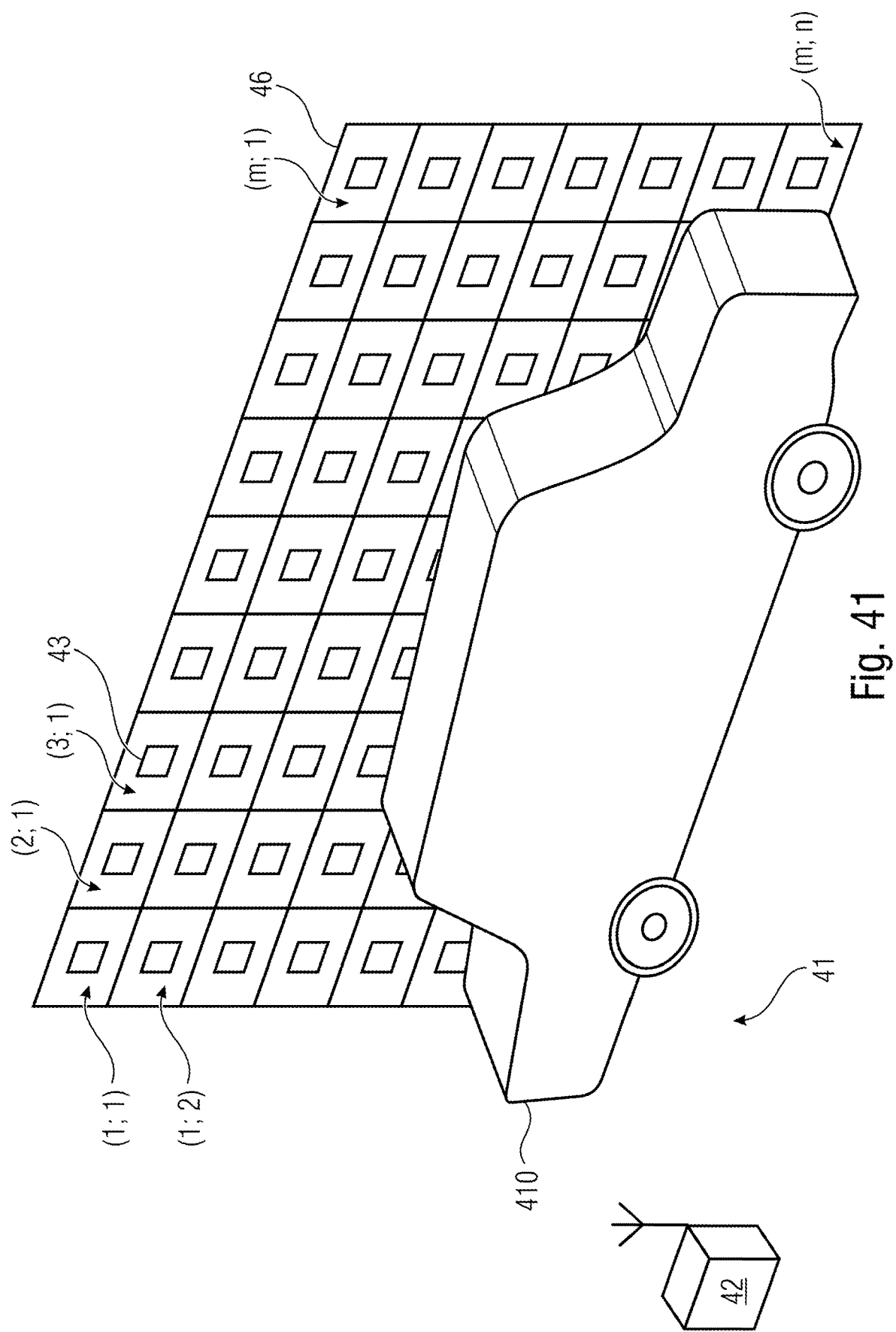
FIG. 41 shows a positioning apparatus with a vehicle as an object in the pass-through area of the signals.
Figure 43:
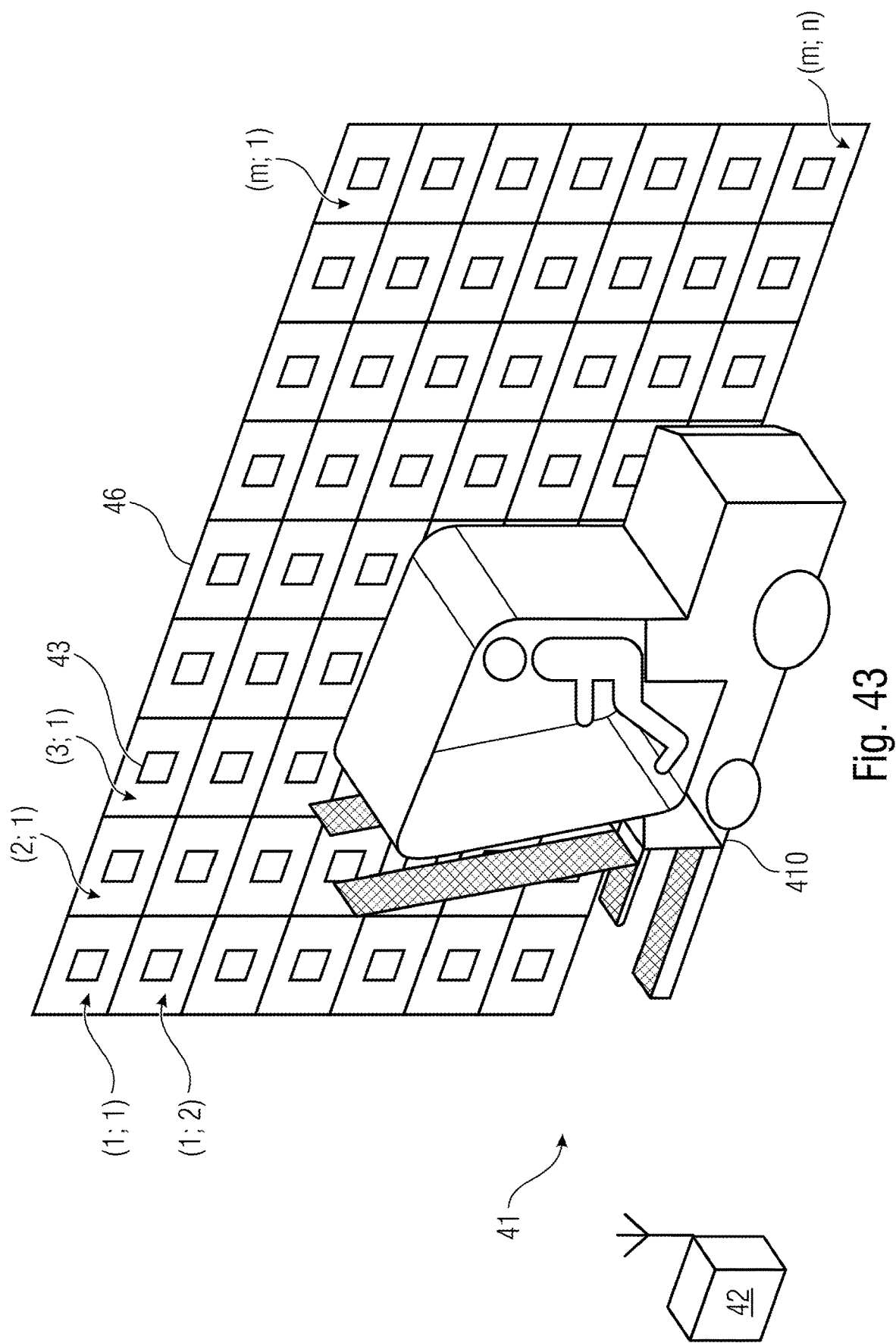
FIG. 43 shows the positioning apparatus of FIG. 41 with a forklift as an object, FIGS. 44 a)-f) show the attenuation values determined for the examples of FIGS. 41-43.

FIGS. 41, 42 and 43 each show a positioning apparatus 41 with a transmitting apparatus 42 and receiving apparatuses 43 attached to a wall as holding apparatus 46. Here, as an object 410, a car (FIG. 41), a person with a shopping trolley (FIG. 42) or a forklift (FIG. 43) is within the signal passage area.

Figures 44A, 44B:
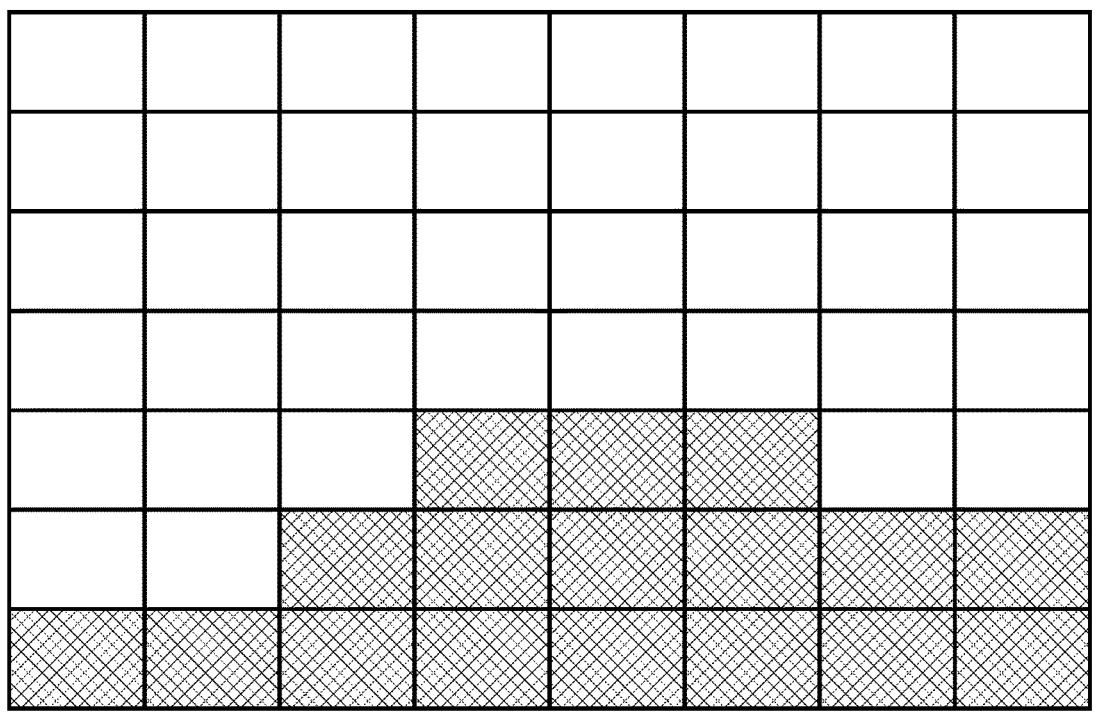
Figures 44C, 44D:
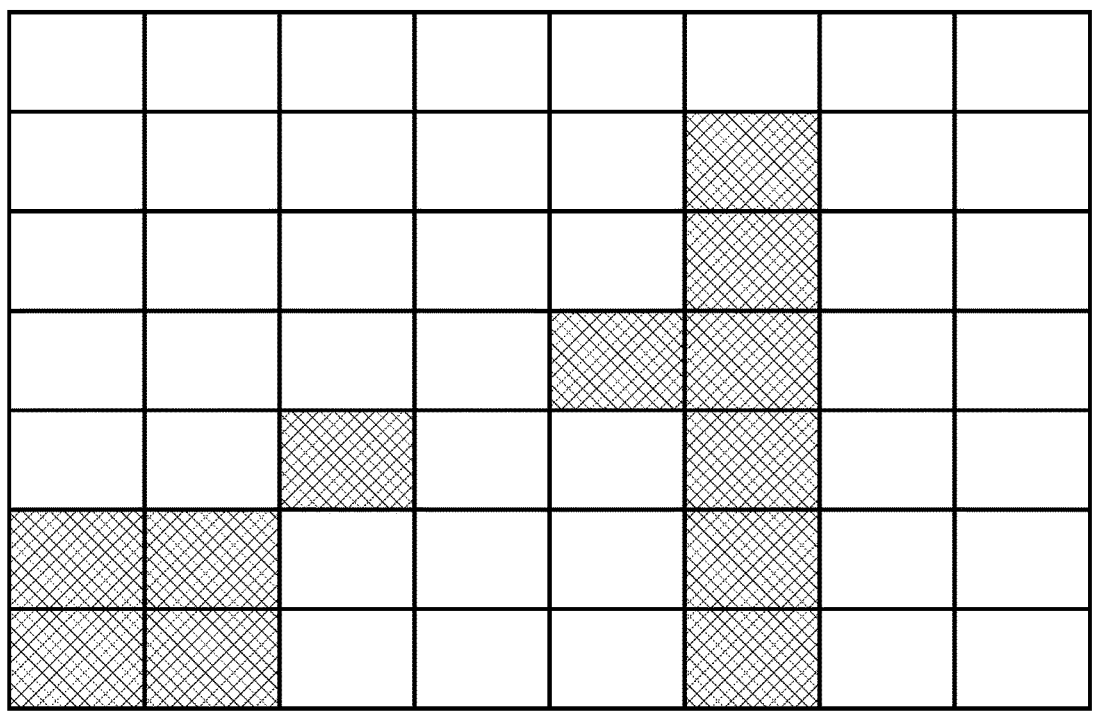
Figures 44E, 44F:
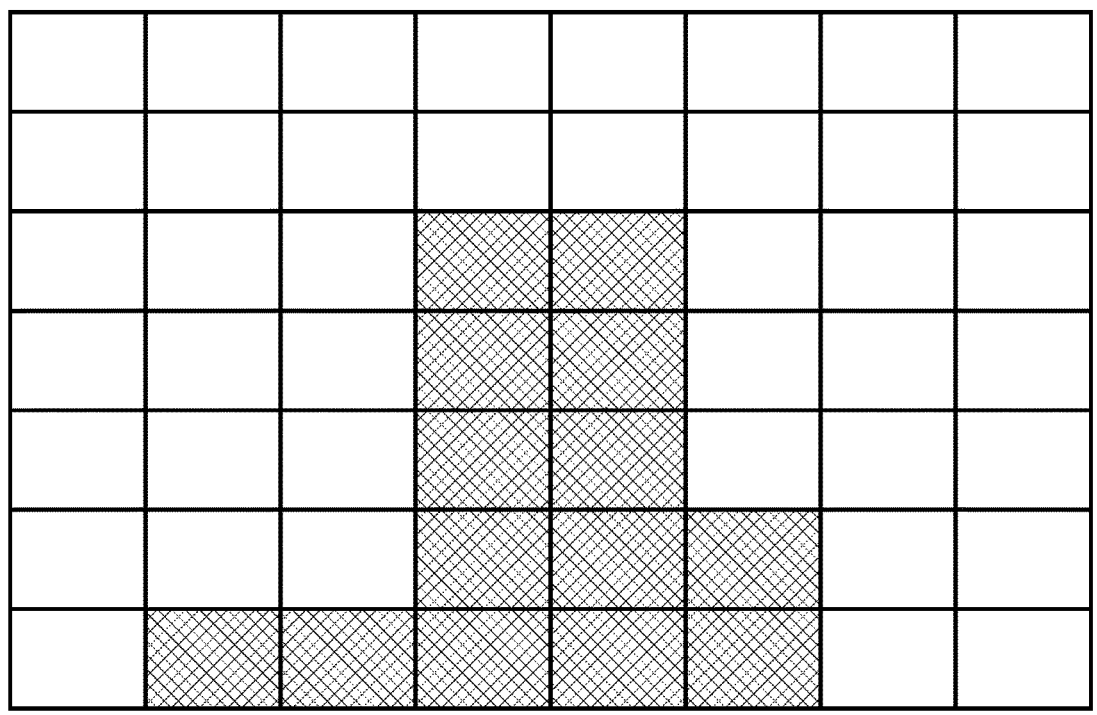

The respectively resulting matrices of the attenuation $ATTEN_{i,j}$ are shown in FIG. 44b (car), in FIG. 44d (person with shopping trolley) as well as in FIG. 44f (forklift). If the matrix values are only discretized with a decision threshold and the fields are colored according to the scheme: white coloring for the value 0 and grey coloring for the value 1, the different forms are shown in FIGS. 44a (car), 44c (person with shopping trolley) as well as FIG. 44e (forklift).

In Step 5, shape classification is performed based on the discretized matrix. For this, the area, the extension in x or y direction, the diagonal extensions of the object can be determined. Object classification can be performed based on these characteristics together with 2D pattern recognition with stored reference shapes.

After detecting all m*n fields, the method for obtaining the data is repeated for the next image $ATTEN_{i,j}$. By the different, in particular subsequent measurement cycles and the attenuation images obtained therefrom, respectively, it can, i.e. be determined whether an object has moved.

Based on the request frequency of the transmitting apparatus 42 as central radio unit as well as based on the basically possible continuous presence of an object as radio obstacle, the maximum current consumption of each receiving apparatus 43 as radio module can be inferred from the respective transmitting duration.

For this case, in one configuration, Step 2 is modified:

If the RSSI values and the determined attenuations $RSSI_{actual} - RSSI_{expected}$ from one measurement cycle (considered as an image) compared to a preceding measurement cycle remain similar or the discretized values disk_$ATTEN_{i,j}$ remain unamended for the respective field, then, in this configuration, outputting the response signal as response of the respective receiving apparatus is omitted. Only when an amended value for disk_$ATTEN_{i,j}$ exists, i.e. when a deviation exists within a predetermined development limiting value, radio transmission of this new value from the receiving apparatus to the transmitting apparatus will be performed.

This configuration serves to reduce the radio traffic and the current consumption in the receiving apparatuses and radio modules, respectively, for the case that objects do not move or only move very slowly. This supports the usage of power-saving radio receivers needing little maintenance in the radio module wall as holding apparatus with simultaneously low installation effort since no wiring or connection to power lines is involved. Thus, flexible usage of the entire arrangement is possible.

In a further step, by comparing different images $ATTEN_{i,j}$ or disk_$ATTEN_{i,j}$ to the preceding images, the movement direction and the velocity are inferred. For this, in particular for discrete matrices, methods for correlation calculation (also matched filter approaches) are known in order to be able to infer the movement direction with only a few computing steps while simultaneously maintaining the object shape. This allows the realization of counting processes for objects with simultaneously determining the direction of movement.

In one configuration, the frequency of the signals emitted by the transmitting apparatus is selected accordingly, for example in order to make a differentiation according to material class metal, wood, plastic and biological tissue based on the different signal attenuation. In one configuration, at least two signal frequencies are used.

Signal processing of the discretized images as processing of the determined attenuation values, in particular with purely binary discretization is possible with little to average computing effort and can thereby be implemented in an easy manner as battery-operated arithmetic unit (dedicated sequential circuit or programmable microcontroller or microprocessor) since only computing operations in integer arithmetic are incurred.

Figure 45:
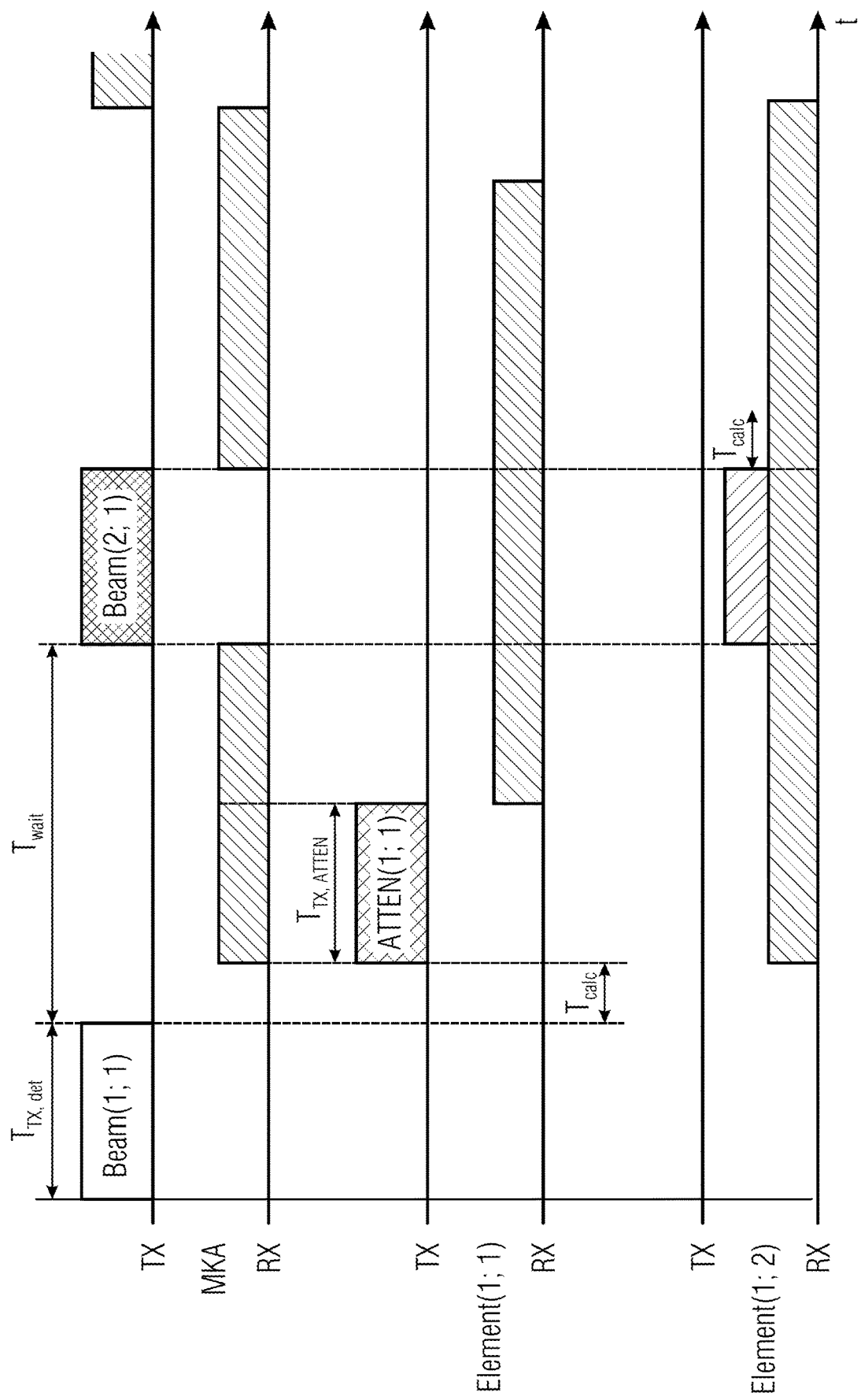
FIG. 45 shows an example for the temporal sequence of method steps in the positioning apparatus according to the sixth variation.

FIG. 45 shows a temporal sequence of several method steps. Here, MKA is the transmitting apparatus which operates as transmitter (TX) of the signals to the receiving apparatuses and as receiver (RX) of the response signals originating therefrom.

The transmitting apparatus MKA transmits a signal directed into a spatial area (here referred to as beam) specifically into the spatial area (1; 1) and subsequently transmits a further beam into another spatial area (2; 1). This takes place for the duration $T_{TX, det}$. Then, the transmitting apparatus MKA waits and listens for response signals. This lasts for the duration $T_{wait}$ which, in this case, is longer than the transmitting duration $T_{TX, det}$.

Here, the behavior of two receiving apparatuses (indicated by element) is shown at two locations (1; 1) and (1; 2), wherein both elements also serve to transmit (TX) and receive (RX) signals.

The receiving element that has been addressed first in the spatial area (1; 1) receives the beam (1; 1) and calculates the attenuation factor in the time $T_{calc}$. Here, the same is greater than the predetermined attenuation limiting value, such that the receiving apparatus element (1; 1) sends out a response signal with the attenuation factor with the duration $T_{TX, ATTEN}$.

In the other receiving element, element (1; 2), also, a signal (beam (2; 1)) is received, wherein, however, the attenuation value is smaller than the limiting value. Thus, the second received element, element (1; 2), does not send out a response signal.

For the case that the signal attenuation assumes very high values due to shading based on stepping on or driving on a field (i; j) (e.g. on a floor plate) by an object and the radio communication between the receiving apparatus in the field occupied by the object (i; j) and the central radio unit in the form of the transmitting apparatus is inhibited, one configuration provides for switching to the receiving apparatus in at least one adjacent field—e.g. (i+1; j) or (i+1; j+1)–. This can be propagated by radio locally from field to field, e.g. by radio.

In a further configuration, in specific cases all immediate neighbors of field (i; j) perform the radio communication with the central radio unit. In the case of a regular matrix field array, four or eight neighboring fields are available. Thereby, the general failure of communication by very high radio switch-off on a field or in one propagation beam is prevented.

Figure 46:
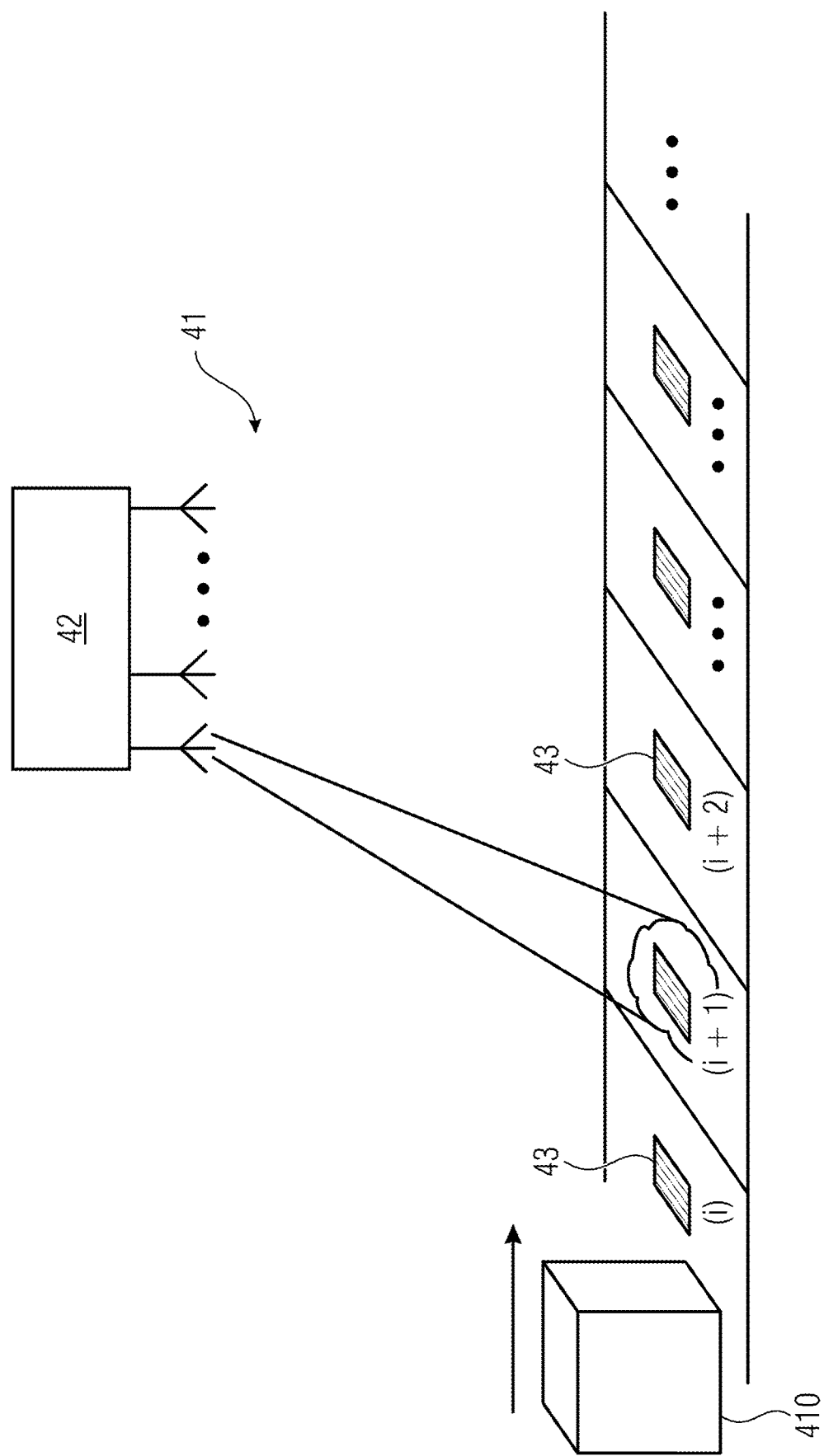
FIG. 46 shows an exemplary positioning apparatus according to the sixth variation with receiving apparatuses along a transport route.

FIG. 46 shows an exemplary arrangement of the receiving apparatuses 43 along a path, here given by a conveyer belt, for the specific case of one-dimensional detection of an object 410.

Along the path across which the object 410 moves (indicated by the arrow), receiving apparatuses 43 are arranged, here indicated by i, i+1, i+2 according to their position. Above the conveying path is a transmitting apparatus 42 having several antenna elements and configured as multi-beam antenna. If the object 410 is above a receiving apparatus 43 while the multi-beam antenna 42 transmits to this receiving apparatus 43, the signal is attenuated by the object 410. Thereby, it can be determined where the transported object 410 is located along the path.

Figure 47:
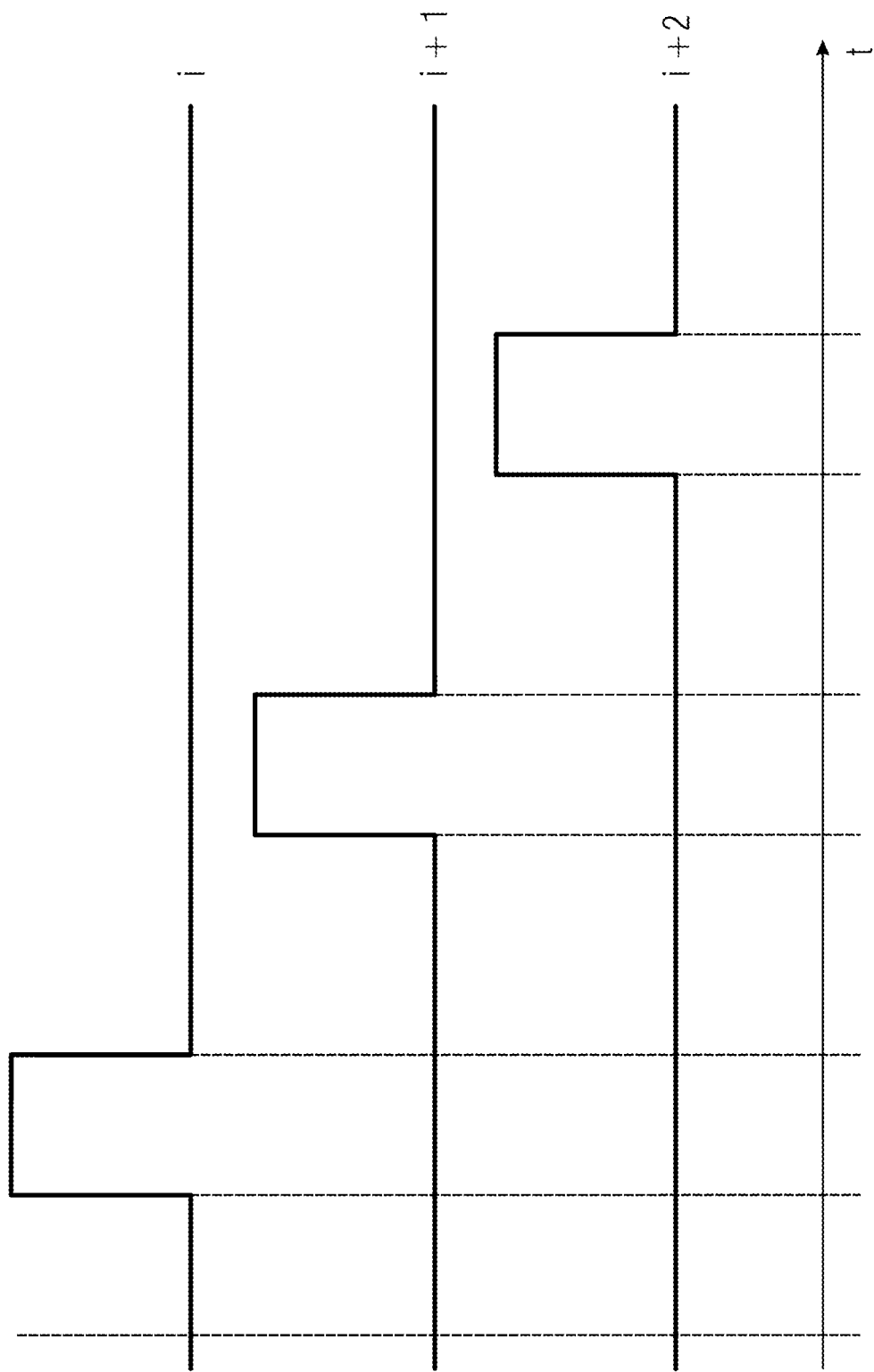
FIG. 47 shows exemplarily response signals for the positioning apparatus of FIG. 46.

FIG. 47 shows the response signals of the receiving apparatuses 43 of FIG. 46 in dependence on time t. The receiving apparatuses at the positions i, i+1 and i+2 each output an impulse as a consequence of the presence of the object 410. If the transported object is above a receiving apparatus, the receive field strength of the signal sent out by the multi-beam antenna is reduced for the receiving apparatus. In that case, the response signal is sent out.

The velocity of the object, its size (length) and for example its composition can be inferred from the responses of the receiving apparatuses. This allows flow control.

Compared to optical sensors in the form of light barriers, a radio-based solution has the advantage that the same is not susceptible to dirt and allows practical tolerance in the orientation between multi-beam antenna and radio objects.

Figure 48:
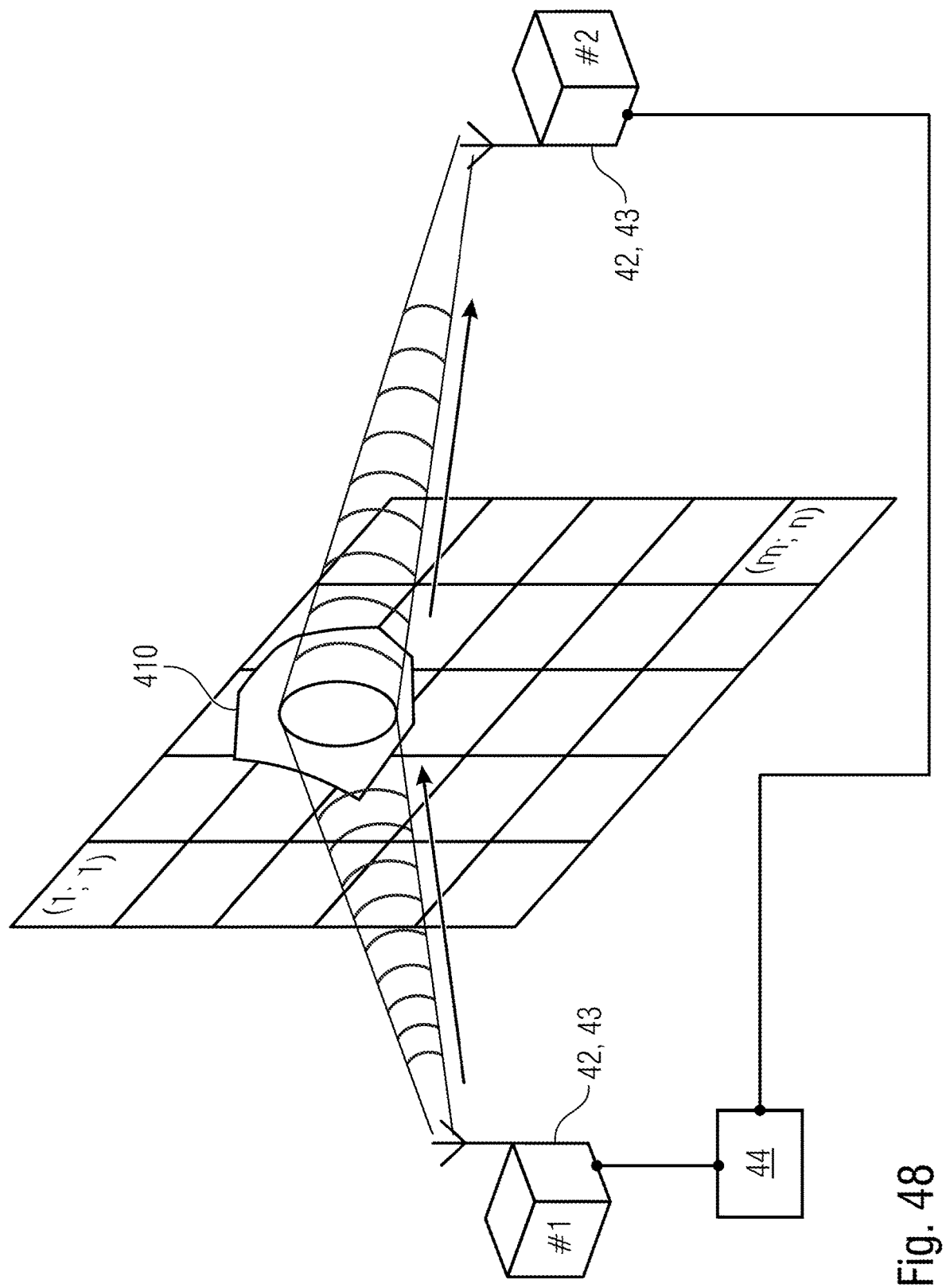
FIG. 48 shows a positioning apparatus for detecting an object according to the sixth variation with two transmitting/receiving apparatuses each having a switchable multibeam antenna.

FIG. 48 shows the case that apparatuses having switchable multi-beam antennas are used as primary transmitting apparatus 42 (illustrated on the left side and indicated by #1) and as primary receiving apparatus 43 (illustrated on the right side and indicated by #2) that allow sending out in specific spatial directions and receiving from selected spatial directions. This has the advantage that the actual holding apparatus can be omitted and that the coordinate system accompanying the holding apparatus exists only in data form by switching the individual beams for transmitting and receiving the signals. Thus, the raster is only implied wherein the same is not provided as an actual object.

Additionally, in the illustrated configuration, transmitting and receiving apparatuses 42, 43 exist on both sides, such that both apparatuses (#1, #2) can each send signals and can receive signals. Here, the signals relate to the actual measurement signals whose attenuation factor is determined as well as to the response signals that carry the information about the received signals.

The transmitting/receiving apparatus 42, 43 #1 transmits, e.g. in interlaced scanning, radio telegrams for all m*n fields that are received by the transmitting/receiving apparatus 42, 43 #2. This is respectively indicated by the arrows. Here, single coordinating/agreeing of the two transmitting/receiving apparatuses 42, 43 with respect to the order in which the fields are provided with the signals is sufficient.

When the object to be detected 410 is targeted by collimated beams of the transmitting/receiving apparatus 42, 43 #1, the transmitting/receiving apparatus 42, 43 #2 can receive and decode the reflected and attenuated radio signals from the transmitting/receiving apparatus 42, 43 #1 with its respectively adjusted collimated beam.

Due to the known information about the field number of the collimated beam of the transmitting/receiving apparatus 42, 43 #1 for sending out signals and the field number of the collimated beam of the transmitting/receiving apparatus 42, 43 #2 for receiving signals, the position of the object 410 in space (as x;y;z coordinates) and the size of the object 410 can be inferred, similar to crossed light cones.

In the illustrated configuration, the evaluation apparatus 44 is connected to the transmitting/receiving apparatus 42, 43 #1 and the transmitting/receiving apparatus 42, 43 #2 and thus obtains information about the signal transmitted by the transmitting/receiving apparatus 42, 43 #1 (i.e. at least the amplitude) and the directional characteristic used for this. Further, from the transmitting/receiving apparatus 42, 43 #2, the evaluation apparatus 44 receives information about the received signal and the allocated directional characteristic. Then, the position of the object 410 results from the two directional characteristics and further statements on the object 410, i.e. on its material, result from the two signals.

In one configuration, the following takes place:

The transmitting/receiving apparatus 42, 43 #1 positions its collimated beam at a field position (i; j). Due to the lack of knowledge on the object to be detected 410, the transmitting/receiving apparatus 42, 43 #2 samples all fields (p; q). If the transmitting/receiving apparatus 42, 43 #2 determines the reception of reflected signals for specific fields, the position of the object 410 as obstacle can be inferred. If all fields (p; q) are sampled by the transmitting/receiving apparatus 42, 43 #2, the transmitting/receiving apparatus 42, 43 #1 switches to the next field etc.

Optionally, according to one configuration, apart from purely system-related radio preambles also the respective field positions of the two collimated beams are sent out. Then, coordination/agreement can be reduced to a minimum and both radio units (i.e. both transmitting/receiving apparatuses 42, 43 #1 and #2) know about the beam reflection by the object 410. For this, in one configuration, the two radio units exchange the role of transmitter and receiver field-by-field.

In a further configuration, the transmitting/receiving apparatus 42, 43 #2, which in this case only operates as receiving apparatus 43, has different directional characteristics and receives signals simultaneously, also with several directional characteristics. Here, the received signals are each split up into the individual directional characteristics (e.g. by a Butler matrix). This allows listening for different spatial areas. Here, by evaluating the signal amplitudes of the individual signals, the spatial area with the greatest amplitude can be determined. This spatial area is then evaluated separately by the transmitting/receiving apparatus 42, 43 #2.

Figure 49:
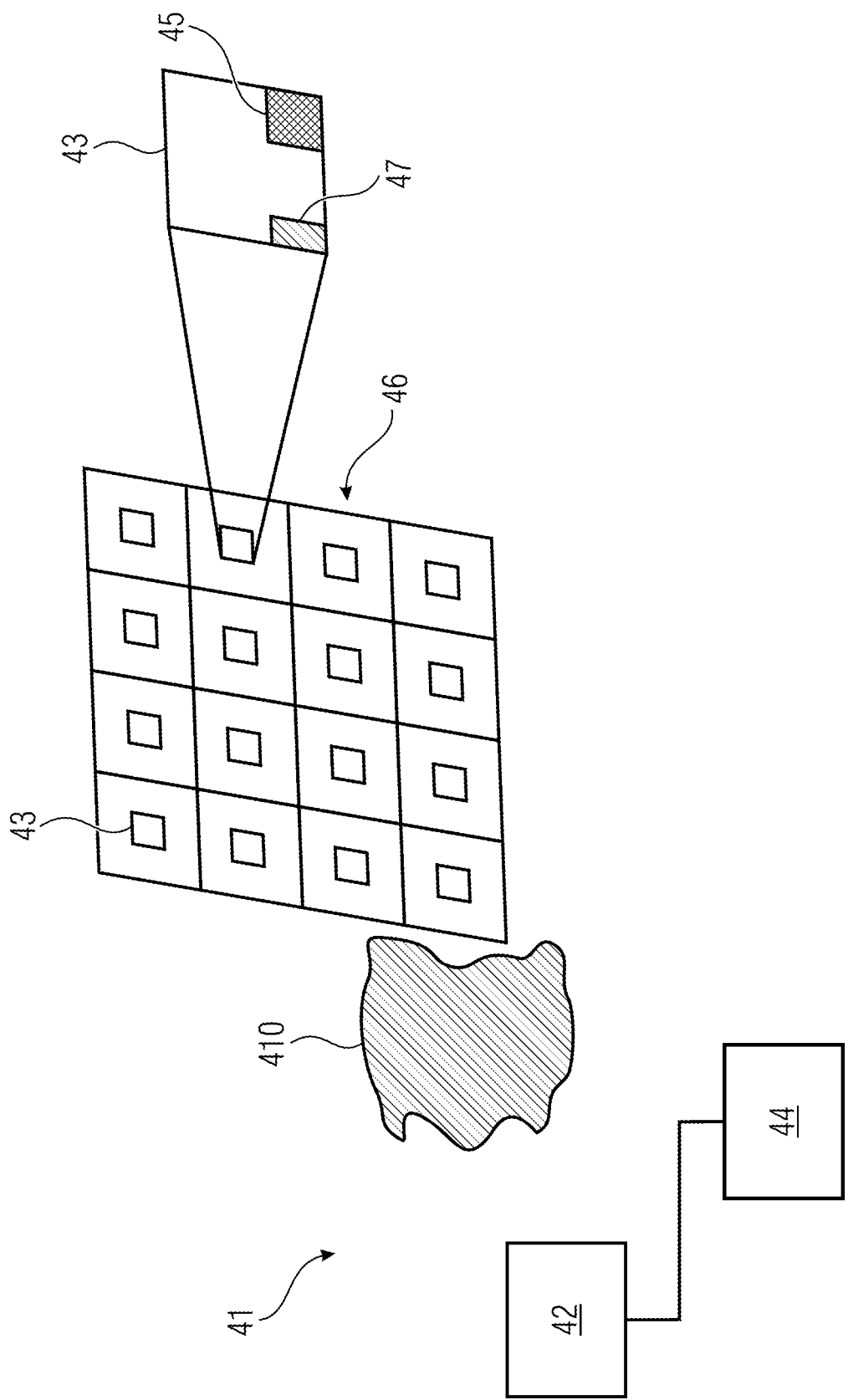
FIG. 49 shows a further configuration of the positioning apparatus of the sixth variation.

FIG. 49 shows a further configuration of the inventive positioning apparatus 41.

A transmitting apparatus 42 emits signals in the direction of a holding apparatus 46, here implemented as wall element. Here, depending on the application case, the signals are emitted omnidirectionally or into individual spatial areas. The omnidirectional emission depends on the configuration of the used antenna and its general emission characteristics.

The specific emission into individual spatial areas is enabled in that the transmitting apparatus 42 has individual directional characteristics that are each connected to different spatial transmitting characteristics. By the directional characteristics, the signals are emitted in different areas to a varying degree. In the shown configuration, these are in particular directional characteristics that are connected to a beam shape.

The directional characteristics and the emission of the signals with the different directional characteristics enables a signal to travel across the holding apparatus 46 and to thereby address the individual receiving apparatuses 43 in the holding apparatus 46 individually.

Here, the transmitting apparatus 42 is connected to an evaluation apparatus 44 that generates, from the signals radiated by the transmitting apparatus 42 and the signals received from the receiving apparatuses 43, information about an object 410 between the transmitting apparatus 42 and the receiving apparatus 43.

For this, signal evaluation apparatuses 45 are provided. In the shown example, each receiving apparatus 43 has such a signal evaluation apparatus 45 that determines, in the shown example, an attenuation factor from the received signals in relation to values generated during calibration. During calibration, the receiving apparatuses 43 receive, for example, one signal each without any object in the optical path. The amplitude of the received signal is then stored as reference value in a data storage 47. During the application, the amplitude of the currently measured signal is compared to the reference value for determining the attenuation factor.

Now, the receiving apparatuses 43 are configured such that the same generate and emit a response signal after receiving a signal. In this case, the transmitting apparatus 42 becomes a receiving apparatus, such that in the shown example the central radio unit 42 and the distributed radio modules 43 are both transmitting apparatuses and receiving apparatuses, hence transmitting/receiving apparatuses.

In the shown configuration, the receiving apparatuses 43 send out the response signal on two conditions, in order to save energy, among others: on the one hand, the attenuation factor has to exceed a specific first limiting value. Thus, the attenuation needs to have a minimum amount. On the other hand, the attenuation factor has to differ by a specific second limiting value from a preceding attenuation factor, i.e. a change needs to have occurred.

When both criteria are fulfilled, the transmitting apparatus 43 sends the response signal to the transmitting apparatus 42 that transmits the response signal or information associated therewith to the evaluation apparatus 44.

After the transmitting apparatus 42 has irradiated all receiving apparatuses 43 with a signal and has received respective response signals by switching the different directional characteristic, the evaluation apparatus 44 evaluates the attenuation factors and the localization of the receiving apparatuses 43 in order to detect at least the presence of the object 410 and to classify, from the outlines of the object 410 and hence the arrangement of the attenuation factors, the object and to make a statement on its material, respectively.

Figure 50:
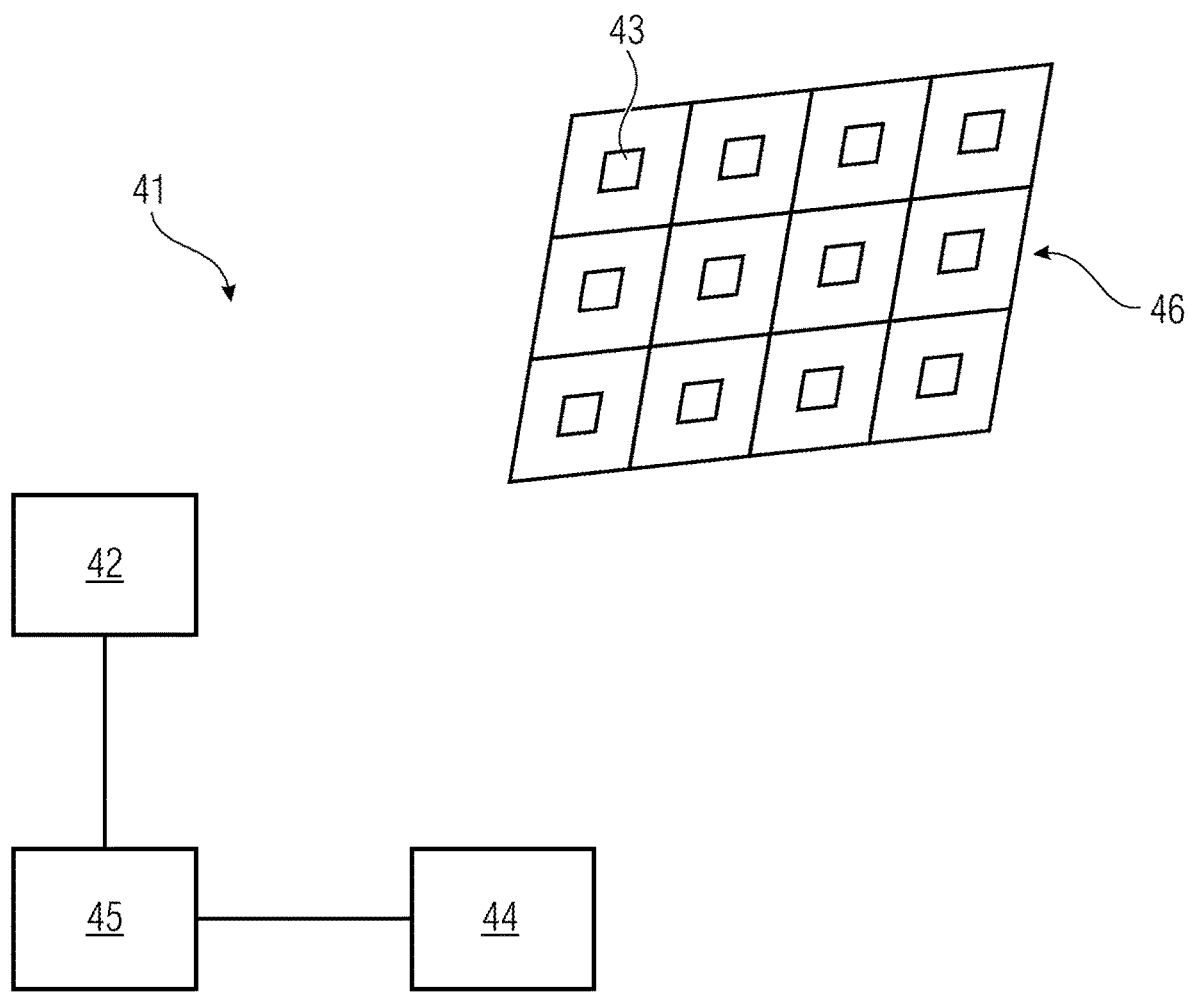
FIG. 50 shows an alternative configuration of the positioning apparatus of the sixth variation.

FIG. 50 provides a signal evaluation apparatus 45 connected to the transmitting apparatus 42. In this configuration, the receiving apparatuses 43 reflect the signals emitted by the transmitting apparatus 42 that are subsequently received again by the transmitting apparatus 42. Thus, the signals pass the space between the transmitting apparatus 42 and the respective receiving apparatus 43 twice.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as an ASIC or an ARM processor.

The above described embodiments are merely illustrative for the principles of the present invention. It is understood that modifications and variations of the arrangements and the details described herein will be apparent to others skilled in the art. It is the intent, therefore, that the invention is limited only by the scope of the appended patent claims and not by the specific details presented by way of description and explanation of the embodiments herein.

According to a first aspect, an apparatus for representing user information can include an antenna apparatus 20, 53, 63, 73, 83, 96, 43, a processing apparatus 3 and a representation apparatus 4, wherein the antenna apparatus 20, 53, 63, 73, 83, 96, 43 is configured to receive signals of at least one transmitter 11 in a scene having at least one directional characteristic 22 related to spatially different receive sensitivities and/or to transmit signals with at least one directional characteristic 22 into a scene 10 and to receive signals of at least one transmitter 11 from the scene 10, wherein the processing apparatus 3 is configured to process the received signals with respect to the scene 10 and to determine representation data, and wherein the representation apparatus 4 is configured to represent at least the determined representation data.

According to a second aspect with reference to the first aspect, the apparatus can comprise a capturing apparatus 1, wherein the capturing apparatus 1 is configured to capture visual images of the scene 10, and wherein the representation apparatus 4 is configured to superimpose at least the determined representation data to a representation of at least one captured visual image.

According to a third aspect with reference to at least one of the first to second aspects, the apparatus can comprise at least one position sensor 6 and the representation apparatus 4 can represent the representation data in dependence on data of the position sensor 6.

According to a fourth aspect with reference to the third aspect, the position sensor 6 can be allocated to the representation apparatus 4 and the representation apparatus 4 can represent the representation data in dependence on an orientation of the representation apparatus 4 relative to the scene 10.

According to a fifth aspect with reference to the third aspect, the position sensor 6 can be allocated to the capturing apparatus 1 and the representation apparatus 4 can represent the representation data in dependence on an orientation of the capturing apparatus 1 relative to the antenna apparatus 20.

According to a sixth aspect with reference to at least one of the first to fifth aspects, the representation apparatus 4 can be configured in the form of glasses.

According to a seventh aspect with reference to at least one of the first to sixth aspects, the representation apparatus 4 can be configured to represent an optical element 14 based on information determined from the received signals.

According to an eighth aspect with reference to the seventh aspect, the representation apparatus 4 can be configured to represent the determined information based on a distance between the transmitter 11 and the representation apparatus 4 and/or based on an orientation between transmitter 11 and representation apparatus 4 and/or based on the information transmitted by the transmitter 11.

According to a ninth aspect with reference to at least one of the first to eighth aspects, the processing apparatus 3 can be configured to access data stored in a database 5.

According to a tenth aspect with reference to at least one of the first to ninth aspects, the processing apparatus 3 can be configured to determine, based on the at least one directional characteristic 22 and based on at least one received signal, a signal distribution of the transmitter 11 as representation data, and the representation apparatus 4 can be configured to represent the signal distribution.

According to an eleventh aspect with reference to the tenth aspect, the representation apparatus 4 can be configured to represent the signal distribution with color coding or with grey-scale coding or with signal strength lines.

According to a twelfth aspect with reference to at least one of the first to eleventh aspects, the apparatus can comprise a positioning apparatus 51, wherein the antenna apparatus 53 comprises several different directional characteristics 58, wherein the directional characteristics 58 each relate to a quantity of spatially different received sensitivities of the antenna apparatus 53, wherein the regulating apparatus 54 acts on the antenna apparatus 53 such that at least one of the directional characteristics 58 of the antenna apparatus 53 is activated, wherein the antenna apparatus 53 receives at least one signal 59 originating from the transmitter 52 with the activated directional characteristic 58, and wherein a data processing apparatus 55 processes the at least one received signal and the quantity of spatially different received sensitivities allocated to the activated directional characteristic 58 to a quantity of weighted received values and determines information about the position of the transmitter 52 at least from the quantity of weighted receive values.

According to a thirteenth aspect with reference to at least one of the first to twelfth aspects, the apparatus can comprise a positioning apparatus 61, wherein the antenna apparatus 63 comprises several different directional characteristics 67, wherein the directional characteristics 67 each relate to at least a quantity of spatially different receive sensitivities of the antenna apparatus 63, wherein the antenna apparatus 63 is configured to receive at least one signal from the transmitter 62 with different directional characteristics, wherein a signal processing apparatus 65 is configured to process the signals received from the antenna apparatus 63 and to determine an amplitude value of a field strength of the received signal, and wherein a data processing apparatus 66 is configured to determine, based on the directional characteristics 67 and the amplitude values determined from the respectively allocated received signals, the information about the position of the transmitter 62.

According to a fourteenth aspect with reference to at least one of the first to thirteenth aspects, the apparatus can comprise a positioning apparatus 71, wherein the antenna apparatus 73 is configured to receive signals originating from the transmitter 72, wherein the antenna apparatus 73 comprises at least one excellent directional characteristic, wherein the excellent directional characteristic relates to a quantity of spatially different receive sensitivities of the antenna apparatus 73, wherein the excellent directional characteristic has at least one sensitivity minimum allocated to a spatial detection area 76, and wherein a data processing apparatus 75 is configured to evaluate at least the signals received from the antenna apparatus 73 with the excellent directional characteristic with respect to the position of the transmitter 72 relative to the detection area 76.

According to a fifteenth aspect with reference to at least one of the first to fourteenth aspects, the apparatus can comprise a positioning apparatus 81, wherein the antenna apparatus 83 comprises several different directional characteristics 89, wherein the directional characteristics 89 each relate to a quantity of spatially different receive sensitivities of the antenna apparatus 83, wherein the antenna apparatus 83 comprises several signal outputs 810, wherein the directional characteristics 89 are allocated to the signal outputs 810, wherein a control apparatus 84 is configured to connect a signal output 810 of the antenna apparatus 83 to an information reading apparatus 86 and further signal outputs 810 of the antenna apparatus 83 to a data processing apparatus 85, wherein the information reading apparatus 86 is configured to determine, from received signals, data transmitted with the signals and wherein the data processing apparatus 85 is configured to evaluate received signals with respect to their physical characteristics.

According to a sixteenth aspect with reference to at least one of the first to fifteenth aspects, the apparatus can comprise a positioning apparatus 91, wherein a receiving apparatus 93 is configured to receive signals 9101, 9103, and wherein a control apparatus 94 is configured to predetermine a spatial area 911, 913 into which the transmitting apparatus 92 sends out signals 9100, 9102.

According to a seventeenth aspect with reference to at least one of the first to sixteenth aspects, the apparatus can comprise a positioning apparatus 41, wherein a transmitting apparatus 42 is configured to send out signals, wherein a receiving apparatus 43 is configured to receive signals, wherein an evaluation apparatus 44 is configured to compare the signals sent out by the transmitting apparatus 42 to the signals received by the receiving apparatus 43 and to generate a comparison result, and wherein the evaluation apparatus 44 is configured to determine from the comparison result whether an object 410 is located between the transmitting apparatus 42 and the receiving apparatus 43.

According to an eighteenth aspect, the invention provides a method for representing user information, wherein signals of a transmitter are received with at least one directional characteristic 22 relating to spatially different received sensitivities and/or signals are transmitted with at least one directional characteristic 22 into a scene 10 and signals of at least one transmitter 11 are received from the scene 10, wherein the received signals are processed with respect to the scene 10 and representation data are determined, and wherein the representation data are represented.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for representing user information,
comprising an antenna apparatus, a processing apparatus, a representation apparatus and a positioning apparatus,
wherein the antenna apparatus comprises several different directional characteristics and is configured to receive signals of at least one transmitter in a scene with at least one directional characteristic relating to spatially different receive sensitivities and/or to transmit signals with at least one directional characteristic into a scene and to receive signals of at least one transmitter from the scene,
wherein the processing apparatus is configured to process the received signals with respect to the scene and to determine representation data, and to determine, based on the at least one directional characteristic and based on at least one of the received signals, a signal distribution of the transmitter as representation data, and wherein the representation apparatus is configured to represent the signal distribution in order to allow visualization of representations of the electromagnetic radio frequency signals that are received from the antenna apparatus,
wherein the positioning apparatus provides data about the at least one transmitter and/or about received signals originating from the at least one transmitter and comprises the antenna apparatus and/or the processing apparatus,
wherein a signal processing apparatus is configured to process the signals received from the antenna apparatus and to determine an amplitude value of a field strength of the received signal and
wherein a data processing apparatus is configured to determine, based on the directional characteristics and the amplitude values determined from respectively allocated received signals, the information about the position of the transmitter,
wherein a transmitting apparatus is configured to send out signals,
wherein a receiving apparatus is configured to receive signals,
wherein an evaluation apparatus is configured to compare the signals sent out by the transmitting apparatus to signals received by the receiving apparatus and to generate a comparison result, and
wherein the evaluation apparatus is configured to determine, from the comparison result, at least whether an object is located between the transmitting apparatus and the receiving apparatus.

2. Apparatus according to claim 1,
wherein the antenna apparatus comprises several different directional characteristics,
wherein the directional characteristics each relate to a quantity of spatially different receive sensitivities of the antenna apparatus,
wherein a regulating apparatus acts on the antenna apparatus such that at least one of the directional characteristics of the antenna apparatus is activated,
wherein the antenna apparatus with the activated directional characteristic receives at least one signal originating from the transmitter and
wherein a data processing apparatus processes the at least one received signal and the quantity of spatially different receive sensitivities allocated to the activated directional characteristic to a quantity of weighted receive values and determines information about a position of the transmitter at least from the quantity of weighted receive values.

3. Apparatus according to claim 1,
wherein the directional characteristics each relate to at least a quantity of spatially different receive sensitivities of the antenna apparatus,
wherein the antenna apparatus is configured to receive at least one signal from the transmitter with different directional characteristics.

4. Apparatus according to claim 1,
wherein the antenna apparatus is configured to receive signals originating from the transmitter,
wherein the antenna apparatus comprises at least one excellent directional characteristic,
wherein the excellent directional characteristic relates to a quantity of spatially different receive sensitivities of the antenna apparatus,
wherein the excellent directional characteristic comprises at least one receive minimum allocated to a spatial detection area and
wherein a data processing apparatus is configured to evaluate at least the signals received from the antenna apparatus with the excellent directional characteristic with respect to a position of the transmitter relative to the detection area.

5. Apparatus according to claim 1,
wherein the antenna apparatus comprises several different directional characteristics,
wherein the directional characteristics each relate to a quantity of spatially different receive sensitivities of the antenna apparatus,
wherein the antenna apparatus comprises several signal outputs,
wherein the directional characteristics are allocated to the signal outputs,
wherein a regulating apparatus is configured to connect a signal output of the antenna apparatus to an information reading apparatus and further signal outputs of the antenna apparatus to a data processing apparatus,
wherein the information reading apparatus is configured to determine, from the received signals, data transmitted by the received signals and
wherein the data processing apparatus is configured to evaluate the received signals with respect to their physical characteristics.

6. Apparatus according to claim 1,
wherein a receiving apparatus is configured to receive signals and
wherein a control apparatus is configured to predetermine a spatial area into which the transmitting apparatus sends out signals.

7. Apparatus according to claim 1,
wherein the apparatus comprises a capturing apparatus,
wherein the capturing apparatus is configured to capture visual images of the scene and
wherein the representation apparatus is configured to superimpose at least the determined representation data on a representation of at least one of the captured visual images.

8. Apparatus according to claim 1,
wherein the apparatus comprises at least one position sensor and
wherein the representation apparatus represents the representation data in dependence on data of the position sensor.

9. Apparatus according to claim 8,
wherein the position sensor is allocated to the representation apparatus and
wherein the representation apparatus represents the representation data in dependence on an orientation of the representation apparatus relative to the scene.

10. Apparatus according to claim 8,
wherein the position sensor is allocated to a capturing apparatus and
wherein the representation apparatus represents the representation data in dependence on an orientation of the capturing apparatus relative to the antenna apparatus.

11. Apparatus according to claim 1,
wherein the representation apparatus is implemented in the form of glasses.

12. Apparatus according to claim 1,
wherein the representation apparatus is configured to represent an optical element based on the determined representation data from the received signals.

13. Apparatus according to claim 12,
wherein the representation apparatus is configured to represent the determined representation data based on a distance between the transmitter and the representation apparatus and/or based on an orientation between transmitter and representation apparatus and/or based on information transmitted by the transmitter.

14. Apparatus according to claim 1,
wherein the processing apparatus is configured to access data stored in a database.

15. Apparatus according to claim 1,
wherein the representation apparatus is configured to represent the signal distribution with a color coding or a grey-scale coding or with signal strength lines.

16. Apparatus according to claim 1,
wherein the signal distribution refers to a distribution of signal strengths of the received signals in space, and/or wherein the signal distribution includes a determined change of a signal strength in space.

17. Apparatus according to claim 1,
wherein the representation apparatus is configured to visualize representations of signals with visually invisible frequencies for a viewer.

18. Method for representing user information, the method comprising:
receiving signals of at least one transmitter in a scene with at least one different directional characteristic relating to spatially different receive sensitivities,
wherein one amplitude value each of a field strength of the received signals is determined,
wherein information about the position of the at least one transmitter is determined based on the directional characteristics and the amplitude values determined from the respectively allocated received signals,
wherein the received signals are processed with respect to the scene and representation data are determined,
wherein, based on the different directional characteristics and based on at least one of the received signals, a signal distribution of the transmitter is determined as the representation data, and wherein the signal distribution is represented in order to allow for a visualization of representations of the received signals,
and further comprising steps of:
sending out signals via a transmitting apparatus and receiving signals via a receiving apparatus, comparing the signals sent out by the transmitting apparatus to the signals received by the receiving apparatus and generating a comparison result, and determining, from the comparison result, at least whether an object is located between the transmitting apparatus and the receiving apparatus.

19. Method according to claim 18, wherein signals are transmitted into a scene with at least one directional characteristic and signals of at least one transmitter are received from the scene.

* * * * *